(12) United States Patent
Kosugi et al.

(10) Patent No.: US 11,936,441 B2
(45) Date of Patent: Mar. 19, 2024

(54) SIGNAL PROCESSING DEVICE, RADIO DEVICE, FRONT HAUL MULTIPLEXER, BEAM CONTROL METHOD, AND SIGNAL COMBINING METHOD

(71) Applicant: NTT DOCOMO, INC., Tokyo (JP)

(72) Inventors: Takashi Kosugi, Tokyo (JP); Tatsuro Yajima, Tokyo (JP); Takuto Arai, Tokyo (JP); Yuta Sagae, Tokyo (JP); Akihito Hanaki, Tokyo (JP); Hidekazu Shimodaira, Tokyo (JP); Masahiro Fujii, Tokyo (JP); Yoshiaki Ofuji, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 430 days.

(21) Appl. No.: 17/291,907

(22) PCT Filed: Nov. 9, 2018

(86) PCT No.: PCT/JP2018/041767
§ 371 (c)(1),
(2) Date: May 6, 2021

(87) PCT Pub. No.: WO2020/095460
PCT Pub. Date: May 14, 2020

(65) Prior Publication Data
US 2022/0014236 A1 Jan. 13, 2022

(51) Int. Cl.
*H04B 7/022* (2017.01)
*H04W 16/24* (2009.01)
(Continued)

(52) U.S. Cl.
CPC ............ *H04B 7/022* (2013.01); *H04W 16/24* (2013.01); *H04W 24/02* (2013.01); *H04W 72/23* (2023.01)

(58) Field of Classification Search
None
See application file for complete search history.

(56) References Cited

U.S. PATENT DOCUMENTS

2006/0068698 A1* 3/2006 Sandhu ............... H04L 27/2607
455/1
2010/0080121 A1 4/2010 Shimada et al.
(Continued)

FOREIGN PATENT DOCUMENTS

| JP | 2016510587 A | 4/2016 |
|---|---|---|
| JP | 2017038187 A | 2/2017 |
| WO | 2008152693 A1 | 12/2008 |

OTHER PUBLICATIONS

"Base-Station Equipment with the Aim of Introducing 3.5-GHz band TD-LTE" by Fujii M. et al. (Apr. 2016) https://www.docomo.ne.jp/english/binary/pdf/corporate/technology/rd/technical_journal/bn/vol18_2/vol18_2_003en.pdf.*

(Continued)

*Primary Examiner* — Xavier S Wong
(74) *Attorney, Agent, or Firm* — Osha Bergman Watanabe & Burton LLP

(57) ABSTRACT

A FrontHaul Multiplexer (FHM) for relaying communications between a signal processing device and a plurality of radio devices includes a storage unit that stores a table in which device identification information of each of the plurality of radio devices is associated with beam identification information assigned to the radio device; a scheduling information reception unit that receives, from the signal processing device, scheduling information of a user terminal performing radio communications with the plurality of radio devices; a determination unit that acquires from the table the device identification information associated with the beam identification information of uplink included in the scheduling information and then determines from the acquired (Continued)

device identification information the radio device in charge of the user terminal; and a transmission unit that transmits to the signal processing device an uplink signal transmitted from the determined radio device.

2 Claims, 33 Drawing Sheets

(51) Int. Cl.
*H04W 24/02* (2009.01)
*H04W 72/23* (2023.01)

(56) References Cited

U.S. PATENT DOCUMENTS

| | | |
|---|---|---|
| 2013/0329825 A1 | 12/2013 | Oren et al. |
| 2015/0372539 A1 | 12/2015 | Livadaras et al. |
| 2017/0338866 A1* | 11/2017 | Van Cai .............. H04L 5/0058 |
| 2018/0034669 A1 | 2/2018 | Barbieri et al. |
| 2018/0234875 A1* | 8/2018 | Leroudier ............. H04W 24/00 |
| 2018/0242349 A1 | 8/2018 | Noh et al. |

OTHER PUBLICATIONS

International Search Report issued in PCT/JP2018/041767, dated Feb. 5, 2019 (5 pages).
Written Opinion of the International Searching Authority issued in PCT/JP2018/041767, dated Feb. 5, 2019 (4 pages).
Fujii, M. et al.; "Base-station Equipment with the Aim of Introducing 3.5-GHz band TD-LTE"; NTT Docomo Technical Journal, vol. 18, No. 2; Oct. 2016, pp. 8-13 (6 pages).
Office Action issued in Japanese Application No. 2020-556466; dated Jun. 7, 2022 (8 pages).
Extended European Search Report issued in European Application No. 18939563.5, dated Jun. 9, 2022 (11 pages).
Office Action in the counterpart Chinese Application No. 201880099338.3, dated Jun. 6, 2023 (16 pages).

* cited by examiner

SIGNAL PROCESSING DEVICE, RADIO DEVICE, FRONT HAUL MULTIPLEXER, BEAM CONTROL METHOD, AND SIGNAL COMBINING METHOD

TECHNICAL FIELD

The present invention relates to a signal processing apparatus, a radio apparatus, a fronthaul multiplexer, a beam control method, and a signal combining method.

BACKGROUND ART

A Centralized Radio Access Network (C-RAN) has been developed for high-speed communication with higher reliability and stability in radio network systems. The C-RAN divides a radio base station into a radio apparatus that performs radio communication with user terminals and a signal processing apparatus that controls the radio apparatus, and integrates functions such as performing base band signal processing to the signal processing apparatus (see, for example, Patent Literatures 1 and 2).

An advanced C-RAN has also been developed by enhancing the C-RAN. The advanced C-RAN constructs a narrower service area in a small cell while constructing a broader service area in a macro cell. Further, the advanced C-RAN provides a Component Carrier (CC) within an area of the small cell besides a CC in a macro cell, and achieves a broader bandwidth by Carrier Aggregation (CA) of the CC in the macro cell and the CC in the small cell.

A FrontHaul Multiplexer (FHM) that multiplexes fronthaul circuits has also been developed so that a single signal processing apparatus accommodates more radio apparatuses (see, for example, Non-Patent Literature 1). The FHM is connected between the signal processing apparatus and a plurality of the radio apparatuses. The FHM, for example, copies a downlink signal in a cell unit and distributes the copied signals to the plurality of radio apparatuses. The FHM also combines uplink signals from the plurality of radio apparatuses, for example, and transmits the combined signal to the signal processing apparatus.

CITATION LIST

Patent Literature

PTL 1
 Japanese Patent Application Laid-Open No. 2017-38187
PTL 2
 Japanese Unexamined Patent Application Publication (Translation of PCT Application) No. 2016-510587

Non-Patent Literature

NPL 1
 Masahiro FUJII, Shingo SUWA, Rintarou TOBA, and Teruaki TOEDA "Base-station Equipment with the Aim of Introducing 3.5-GHz band TD-LTE" NTT DOCOMO Technical Journal, October 2016, vol. 18 No. 2, pp. 8-13.

SUMMARY OF INVENTION

Technical Problem

In a radio communication system using the FHM, Beam Forming (BF) is considered to be employed. In this case, it is assumed that the signal processing apparatus transmits a Beam Forming Indicator (BMI) for identifying a beam direction to the FHM, and the FHM transmits the BMI to each of the radio apparatuses. Since the BMI is copied in the FHM and transmitted to each radio apparatus, the radio apparatuses subordinate to the FHM control the beam directions based on the same BMI.

The above-described case where the plurality of radio apparatuses control the beam directions based on the same BMI transmitted from the FHM, causes a problem in that the beam direction of each radio apparatus cannot be controlled individually (independently).

Incidentally, when a radio network system is built using the FHM, traffic in each cell assumed during planning is different at times from the traffic in each cell when the radio network system is actually built. In such a case, changing the cell size by changing the number of radio apparatuses forming the cell, for example, enables to provide an appropriate radio network system corresponding to the actual traffic.

In a cell with heavy traffic, for example, the cell is narrowed by reducing the number of radio apparatuses forming the cell to reduce the traffic in the cell (traffic of a base band processing apparatus performing base band processing on signals in the cell). This enables the radio network system to provide a radio communication service suitable for the actual traffic.

However, to change a cell formed by a plurality of radio apparatuses, connection relations among the signal processing apparatus, the FHM, and the radio apparatuses need to be changed, and to change the connection relations, wires among the signal processing apparatus, the FHM, and the radio apparatuses need to be inserted and removed, which takes time and labor.

Incidentally, the FHM transmits, to the signal processing apparatus, noise transmitted from a radio apparatus as an uplink signal with an uplink signal transmitted from another radio apparatus in some cases.

An object of the present invention is to provide a technology enabling to individually control a beam direction of each of radio apparatuses subordinate to an FHM.

Another object of the present invention is to provide a technology enabling to easily change a cell formed by a plurality of radio apparatuses.

Still another object of the present invention is to provide a technology not to transmit noise transmitted from a radio apparatus to a signal processing apparatus.

Solution to Problem

A signal processing apparatus of the present invention communicates, via a fronthaul multiplexer, with a plurality of radio apparatuses each performing radio communication with a user terminal, and includes: a storage section that stores beam information in which apparatus identification information of the plurality of radio apparatuses and beam identification information are associated with each other, the beam identification information being assigned to each beam so as to be different among the beams respectively formed by the plurality of radio apparatuses; a transmission section that transmits the beam information to the plurality of radio apparatuses via the fronthaul multiplexer; and a reception section that receives, from the plurality of radio terminals via the fronthaul multiplexer, the beam identification information assigned to beams with best communication quality respectively received by the plurality of radio terminals from the user terminals.

A radio apparatus of the present invention communicates with a signal processing apparatus via a fronthaul multiplexer and performs radio communication with a user terminal. The radio apparatus includes: a beam information reception section that receives, from the signal processing apparatus via the fronthaul multiplexer, beam information in which apparatus identification information of a plurality of the radio apparatuses and beam identification information are associated with each other, the beam identification information being assigned to each beam so as to be different among the beams respectively formed by the plurality of radio apparatuses; an acquisition section that acquires the beam identification information corresponding to the apparatus identification information of its own apparatus from the beam information; a sweep section that performs beam sweeping using beams identified by the acquired beam identification information, and transmits the beam identification information to the user terminal; a beam identification information reception section that receives, from the user terminal, the beam identification information assigned to a beam with best communication quality; and a beam identification information transmission section that transmits the received beam identification information to the signal processing apparatus via the fronthaul multiplexer.

A fronthaul multiplexer of the present invention relays communication between a signal processing apparatus and a plurality of radio apparatuses, and includes: a beam information reception section that receives, from the signal processing apparatus, beam information in which apparatus identification information of a plurality of the radio apparatuses and beam identification information are associated with each other, the beam identification information being assigned to each beam so as to be different among the beams respectively formed by the plurality of radio apparatuses; a scheduling information reception section that receives, from the signal processing apparatus, scheduling information for user terminals performing radio communication with the plurality of radio apparatuses; an identification section that acquires, from the beam information, the apparatus identification information corresponding to the beam identification information of uplink included in the scheduling information, and identifies at least one of the plurality of radio apparatuses having the user terminals as subordinates from the acquired apparatus identification information; a combining section that combines uplink signals transmitted from the at least one of the plurality of radio apparatuses identified; and a transmission section that transmits the combined uplink signals to the signal processing apparatus.

A fronthaul multiplexer of the present invention relays communication between a plurality of base band processing apparatuses respectively performing base band processing of signals in cells different from each other and a plurality of radio apparatuses each performing radio communication with a user terminal. The fronthaul multiplexer includes: an acquisition section that acquires information for connecting each of the plurality of radio apparatuses with any one of the plurality of base band processing apparatuses; and a switch section that connects each of the plurality of radio apparatuses with any one of the plurality of base band processing apparatuses based on the information.

A radio communication system of the present invention includes a fronthaul multiplexer; and a plurality of base band processing apparatuses that communicates, via the fronthaul multiplexer, with a plurality of radio apparatuses each performing radio communication with a user terminal. The fronthaul multiplexer includes: an acquisition section that acquires information for connecting each of the plurality of radio apparatuses with any one of the plurality of base band processing apparatuses; and a switch section that connects the plurality of radio apparatuses to the plurality of base band processing apparatuses based on the information. Each of the plurality of base band processing apparatuses includes: a storage section that stores beam information in which apparatus identification information of the plurality of radio apparatuses and beam identification information are associated with each other, the beam identification information being assigned to each beam so as to be different among the beams respectively formed by the plurality of radio apparatuses; a beam information transmission section that transmits the beam information to the plurality of radio apparatuses via the fronthaul multiplexer; a reception section that receives, from the plurality of radio apparatuses via the fronthaul multiplexer, the beam identification information assigned to beams with best communication quality respectively received by the plurality of radio apparatuses from the user terminals; a measurement section that measures traffic of each of the plurality of radio apparatuses by totaling traffic of the user terminals belonging to each of the plurality of radio apparatuses, based on the beam identification information received from the user terminals and the beam information stored in the storage section; and a traffic transmission section that transmits information on the traffic to the fronthaul multiplexer.

A fronthaul multiplexer of the present invention relays communication between a signal processing apparatus and a plurality of radio apparatuses, and includes: a storage section that stores a table in which apparatus identification information of the plurality of radio apparatuses and beam identification information assigned to each of the plurality of radio apparatuses are associated with each other; a scheduling information reception section that receives, from the signal processing apparatus, scheduling information for user terminals performing radio communication with the plurality of radio apparatuses; an identification section that acquires, from the table, the apparatus identification information corresponding to the beam identification information of uplink included in the scheduling information, and identifies at least one of the plurality of radio apparatuses having the user terminals as subordinates from the acquired apparatus identification information; and a transmission section that transmits, to the signal processing apparatus, an uplink signal transmitted from the at least one of the plurality of radio apparatuses identified.

Advantageous Effects of Invention

According to the present invention, it is possible to individually control a beam direction of each radio apparatus when a BMI is transmitted to each radio apparatus via an FHM.

According to the present invention, it is possible to easily change a cell formed by a plurality of radio apparatuses.

According to the present invention, it is possible to prevent transmission of noise transmitted from a radio apparatus to a signal processing apparatus.

DESCRIPTION OF EMBODIMENTS

Hereinafter, an embodiment of the present invention will be described with reference to the accompanying drawings.

Embodiment 1

Figure 1:
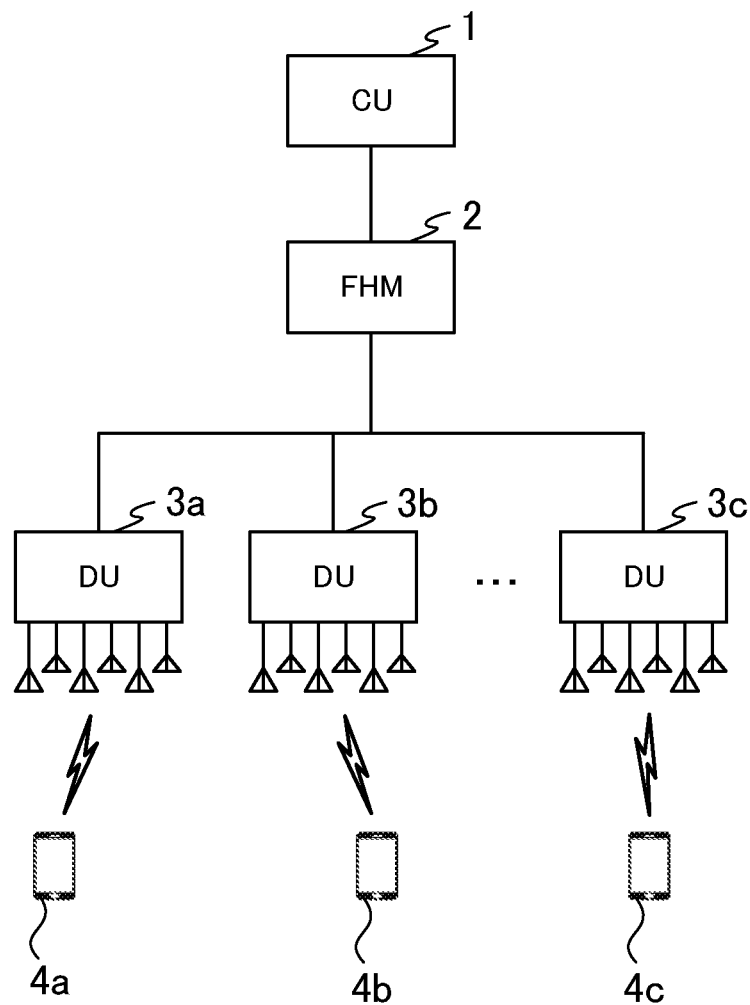
FIG. 1 illustrates an exemplary configuration of a radio base station according to Embodiment 1.

FIG. 1 illustrates an exemplary configuration of a radio base station according to Embodiment 1. As illustrated in FIG. 1, the radio base station includes Centralized Unit (CU) 1, FHM 2, and Distributed Units (DUs) 3a to 3c. FIG. 1 also illustrates user terminals 4a to 4c that respectively perform radio communication with DUs 3a to 3c. The radio base station illustrated in FIG. 1 forms, for example, an advanced C-RAN.

CU 1 and FHM 2 are connected by, for example, an optical fiber. FHM 2 and DUs 3a to 3c are connected by, for example, optical fibers.

CU 1 is connected to a core network (not illustrated). CU 1 transmits a signal (data) received from the core network to FHM 2. CU 1 also transmits a signal received from FHM 2 to the core network. CU 1 performs, for example, base band processing on signals and maintenance monitoring processing on DUs 3a to 3c.

FHM 2 multiplexes fronthaul circuits between CU 1 and the plurality of DUs 3a to 3c. For example, FHM 2 copies the signal received from CU 1 and transmits the copied signals to DUs 3a to 3c. FHM 2 also combines signals received from DUs 3a to 3cc and transmits the combined signal to CU 1.

DUs 3a to 3c transmit the signals received from CU 1 via FHM 2 to user terminals 4a to 4c. DUs 3a to 3c also transmit signals received from user terminals 4a to 4bc to CU 1 via FHM 2.

DUs 3a to 3c include several tens to several hundreds of antennas, for example, and respectively perform radio communication with user terminals 4a to 4c. DUs 3a to 3c transmit and receive the signals using the plurality of antennas by controlling the amplitude and phases of the signals and forming beams having directivity to respective user terminals 4a to 4c. DUs 3a to 3c can form the beams in various directions.

Although the radio base station in FIG. 1 forms the advanced C-RAN, the radio base station may also form a C-RAN. In addition, although only a single FHM 2 is connected subordinate to CU 1 in FIG. 1, a plurality of FHMs 2 may also be connected.

CU 1 may also be referred to as, for example, Base station Digital processing Equipment (BDE), a Base Band Unit (BBU), a radio control apparatus, a master station, or a signal processing apparatus. Further, DUs 3a to 3c may also be referred to as Remote Radio Heads (RRHs), slave stations, or radio apparatuses, for example.

Figure 2:
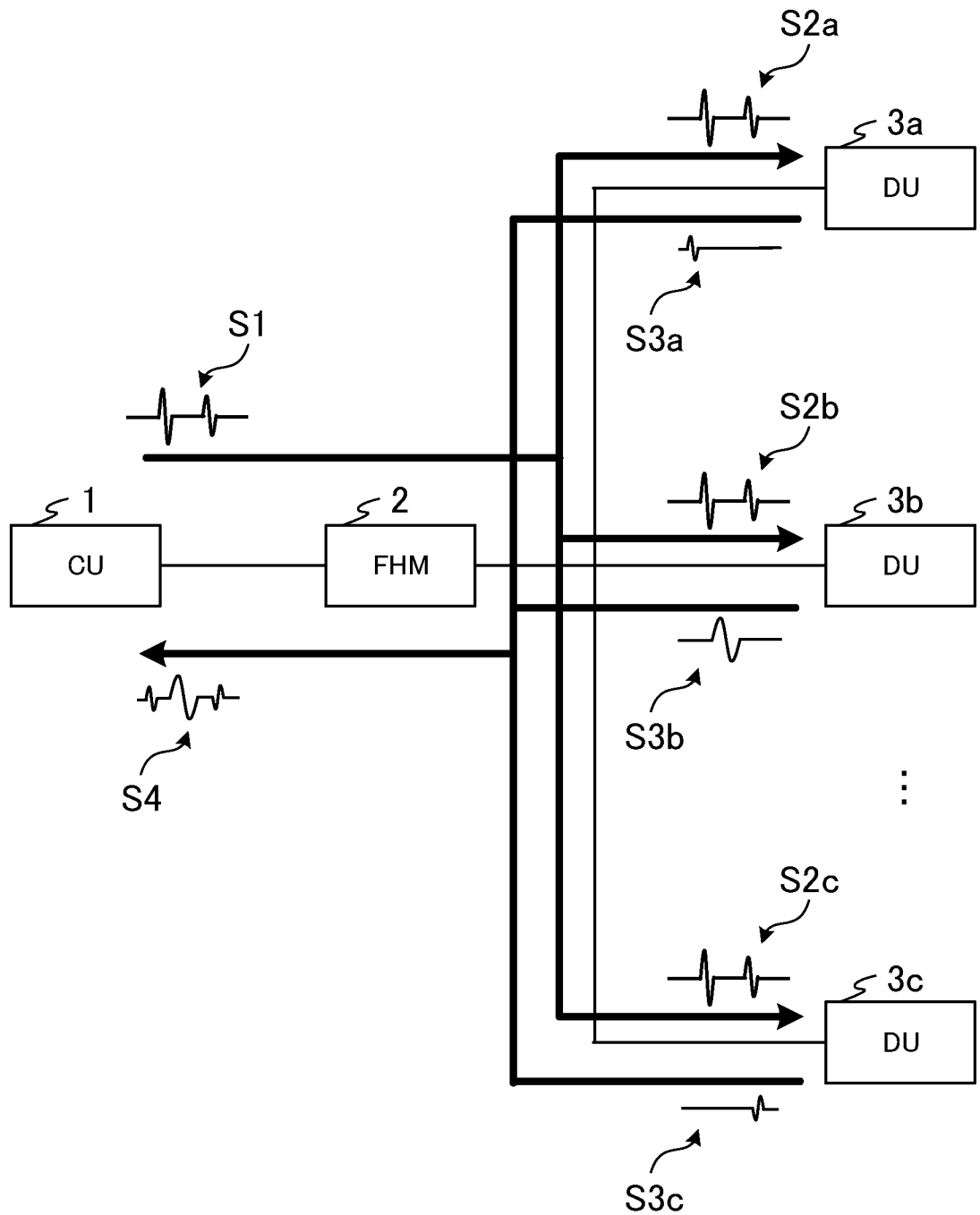
FIG. 2 illustrates a general operation of an FHM.

FIG. 2 illustrates a general operation of FHM 2. In FIG. 2, the same components as those in FIG. 1 are denoted by the same reference signs.

Signal S1 illustrated in FIG. 2 represents a Down Link (DL) signal transmitted from CU 1 to DUs 3a to 3c. Signal S1 is copied by FHM 2 and transmitted to DUs 3a to 3c, as represented by Signals S2a to S2c.

Signals S3s to S3c illustrated in FIG. 2 represent Up Link (UL) signals transmitted from DUs 3a to 3c to CU 1. Signals S3a to S3c are combined by FHM 2 and transmitted to CU 1, as represented by Signal S4.

As described above, FHM 2 copies the DL signal transmitted from CU 1 to DUs 3a to 3c. FHM 2 also combines the UL signals transmitted from DUs 3a to 3c to CU 1. This enables CU 1 to accommodate the plurality of DUs 3a to 3c as a single cell.

Figure 3:
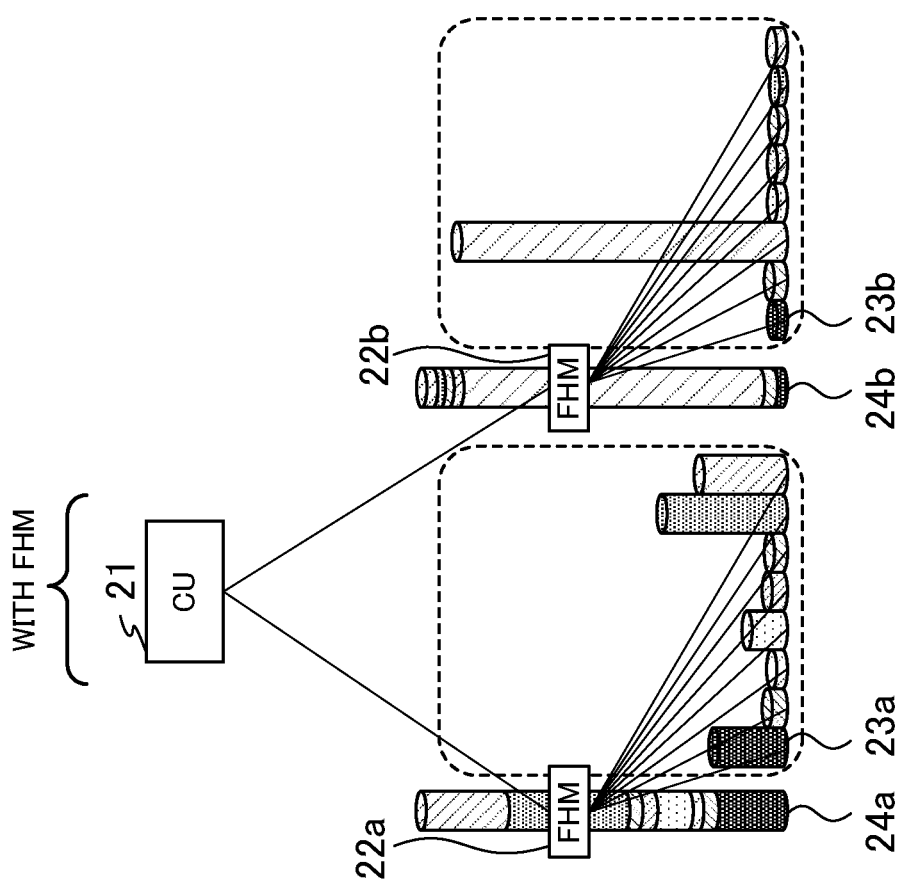
FIG. 3 illustrates examples of throughput without the FHM connected between a CU and DUs and throughput with the FHM connected between the CU and the DUs.
Figure 3:
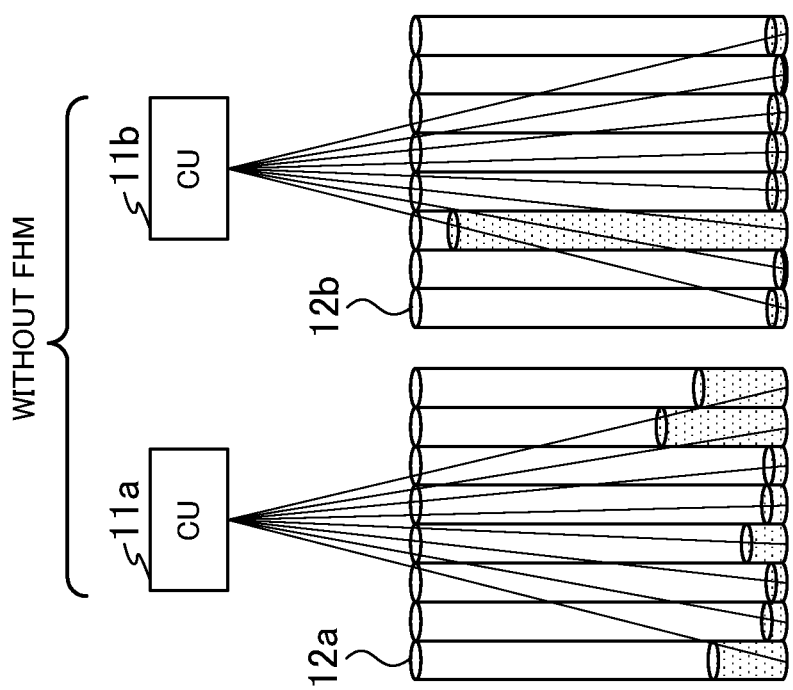

FIG. 3 illustrates examples of throughput without the FHM connected between the CU and the DUs and throughput with the FHM connected between the CU and the DUs.

FIG. 3 illustrates CUs 11a and 11b. CU 11a is considered to be connected to 8 DUs (not illustrated) without the FHM. CU 11b is also considered to be connected to 8 DUs (not illustrated) without the FHM.

Additionally, FIG. 3 illustrates CU 21, and FHMs 22a and 22b. FHM 22a is considered to be connected to 8 DUs (not illustrated). FHM 22b is also considered to be connected to 8 DUs (not illustrated).

Throughput 12a (8 cylinders) represents the peak throughput in a specification between CU 11a and the 8 DUs. The hatched portions in throughput 12a represent the instantaneous throughput (the throughput at a certain time) between CU 11a and the 8 DUs.

Throughput 12b (8 cylinders) represents the peak throughput in a specification between CU 11b and the 8 DUs. The hatched portions in throughput 12b represent the instantaneous throughput between CU 11b and the 8 DUs.

Throughput 23a (8 cylinders) represents the instantaneous throughput between FHM 22a and the 8 DUs. Throughput 24a represents the instantaneous throughput between CU 21 and FHM 22a. As described in FIG. 2, FHM 22a copies the DL signal and combines the UL signals, and thus the instantaneous throughput between CU 21 and FHM 22a is the sum of throughput 23a (8 cylinders), as represented by throughput 24a.

Throughput 23b (8 cylinders) represents the instantaneous throughput between FHM 22b and the 8 DUs. Throughput 24b represents the instantaneous throughput between CU 21 and FHM 22b. As described in FIG. 2, FHM 22b copies the DL signal and combines the UL signals, and thus the instantaneous throughput between CU 21 and FHM 22b is the sum of throughput 23b (8 cylinders), as represented by throughput 24b.

When the FHM is not connected between the CU and the DUs, the CU and the DUs may have room for the peak throughput, as represented by throughputs 12a and 12b in FIG. 3, and may not efficiently use the resource in some cases. Meanwhile, when the FHM is connected between the CU and the DUs, the CU and the DUs can efficiently use the resource, as represented by throughputs 24a and 24b in FIG. 3.

Studies have been carried out that a radio communication system in the next generation (e.g., 5G) uses a high frequency band from a few GHz to a few tens of GHz, for example, as the radio frequency. Radio waves have increased rectilinearity with the high frequency, and building shadows, for example, make it harder for the radio waves to reach user terminals. Thus, studies have been carried out on performing radio communication with beam forming by increasing the number of DUs and making areas smaller, in the next-generation radio communication system.

With regard to such increase of the DUs, utilizing the FHMs enables the radio base station to accommodate more DUs in a single CU when the areas are made to be smaller in a place with small required radio capacity. In the example of CU 21 using FHMs 22a and 22b in FIG. 3, for example, 16 DUs are accommodated in single CU 21. That is, the radio base station can increase the number of DUs with a smaller investment by using the FHMs. For example, 5G areas can be expanded with a smaller investment. Note that, by using FHMs, 64 DUs can be accommodated subordinate to a single FHM in the example of FIG. 3.

Figure 4:
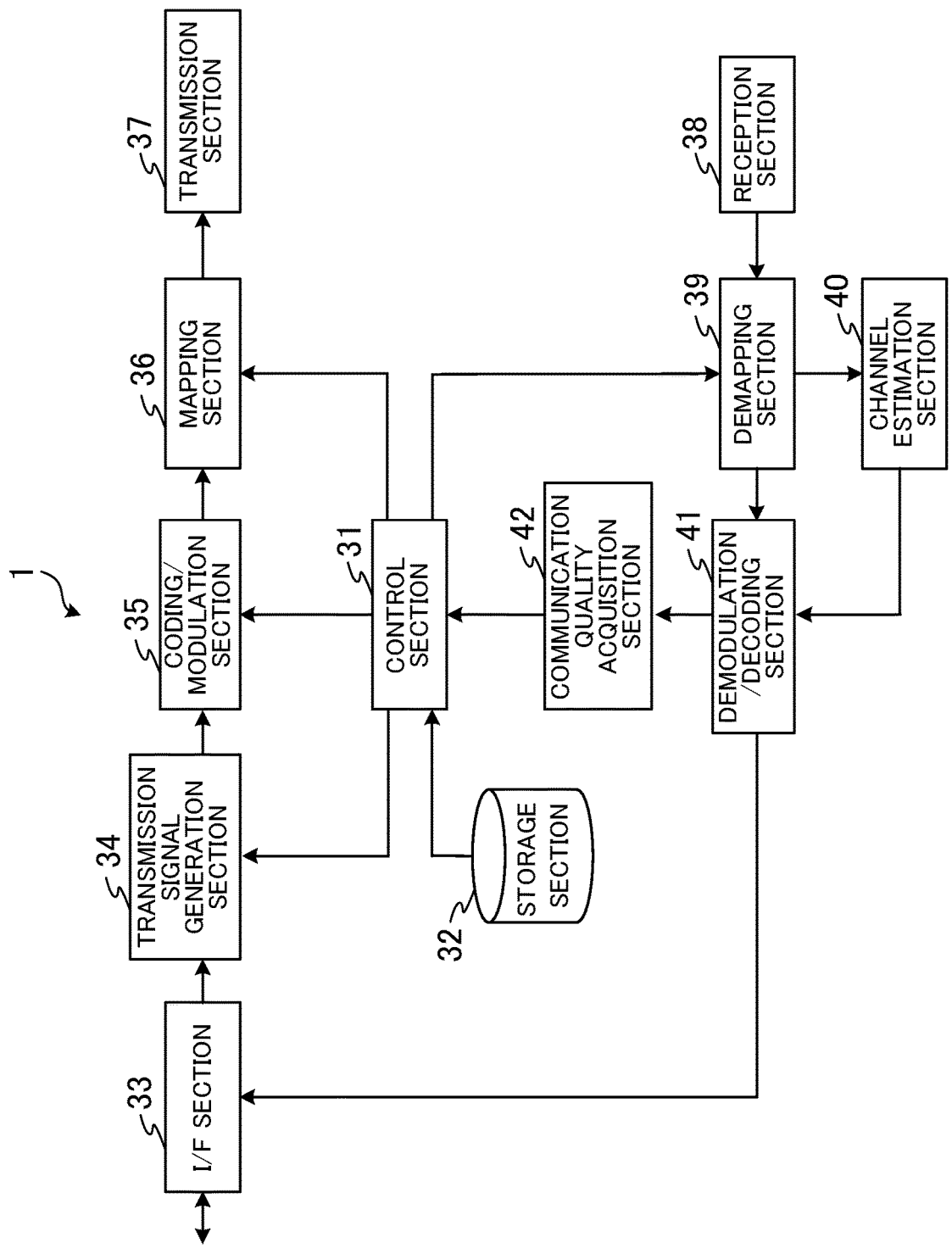
FIG. 4 illustrates exemplary blocks of the CU in FIG. 1.

FIG. 4 illustrates exemplary blocks of CU 1 in FIG. 1. As illustrated in FIG. 4, CU 1 includes control section 31, storage section 32, I/F section 33, transmission signal generation section 34, coding/modulation section 35, mapping section 36, transmission section 37, reception section 38, demapping section 39, channel estimation section 40, demodulation/decoding section 41, and communication quality acquisition section 42.

Control section 31 performs scheduling for the DL signal based on the communication quality between DUs 3a to 3c and user terminals 4a to 4c outputted from communication quality acquisition section 42. The DL signal includes a DL data signal and a DL control signal. The DL data signal is transmitted using, for example, a Physical Downlink Shared Channel (PDSCH). The DL control signal is transmitted using, for example, a Physical Downlink Control Channel (PDCCH).

Control section 31 also performs scheduling for the UL signals based on the communication quality between DUs 3a to 3c and user terminals 4a to 4c outputted from communication quality acquisition section 42. The UL signals include UL data signals and UL control signals. The UL data signals are transmitted using, for example, a Physical Uplink Shared Channel (PUSCH). The UL control signals are transmitted using, for example, a Physical Uplink Control Channel (PUCCH).

In addition, control section 31 determines, for example, Modulation and Coding Schemes (MCSs) for the DL data signal and the UL data signals based on the communication quality between DUs 3a to 3c and user terminals 4a to 4c outputted from communication quality acquisition section 42. Note that the MCS is not limited to be configured by CU 1, and may be configured by user terminals 4a to 4c. When user terminals 4a to 4c configure the MCS, CU 1 only needs to receive MCS information from user terminals 4a to 4c.

Further, control section 31 transmits beam information stored in storage section 32, which will be described below, to DUs 3a to 3c via FHM 2. For example, control section 31 includes beam information 51 stored in storage section 32 in the DL control signal and transmits the DL control signal to DUs 3a to 3c. Alternatively, control section 31 includes beam information 51 stored in storage section 32, for example, in a signal to maintain or monitor DUs 3a to 3c, and transmits the signal to DUs 3a to 3c.

Control section 31 outputs the generated scheduling information for the DL signal and the UL signals to transmission signal generation section 34 and mapping section 36. Control section 31 also outputs the generated MCS information to transmission signal generation section 34 and coding/modulation section 35.

Storage section 32 stores the beam information for identifying directions of beams formed by DUs 3a to 3c. The beam information is stored, for example, in advance in storage section 32. The beam information is updated when, for example, a new DU is connected to FHM 2 or a DU is changed (replaced). The beam information may be transmitted from a host apparatus, for example, and stored in storage section 32.

Figure 5:
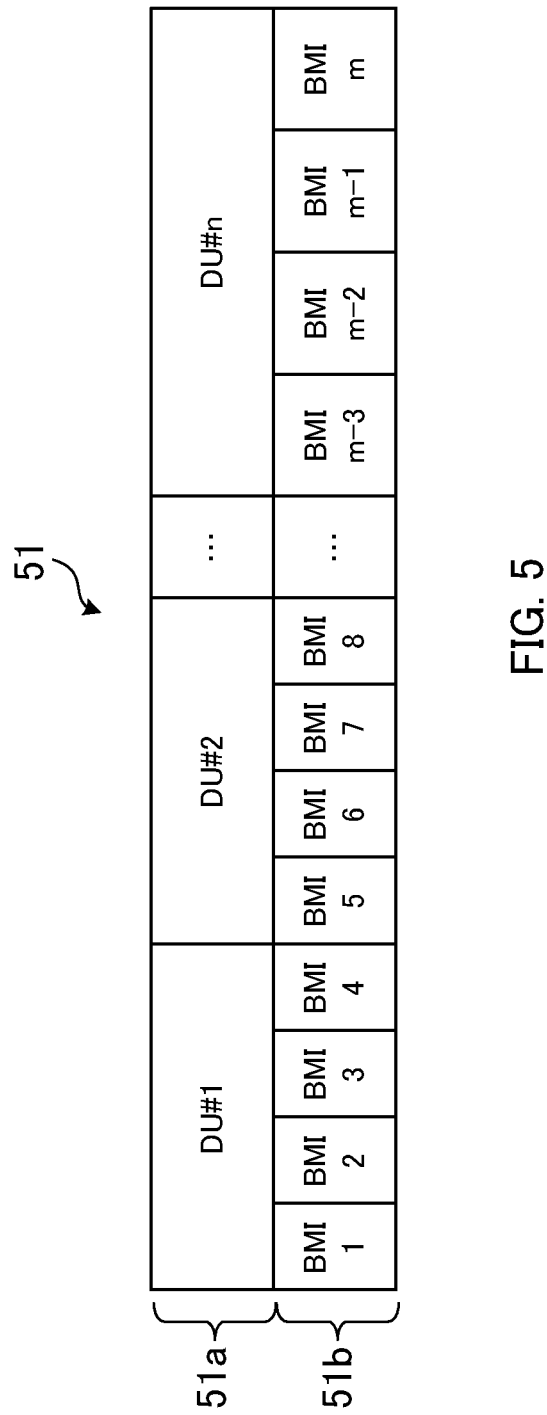
FIG. 5 illustrates an exemplary data configuration of beam information stored in a storage section.

FIG. 5 illustrates an exemplary data configuration of the beam information stored in storage section 32. As illustrated in FIG. 5, beam information 51 includes DU identification information 51a and beam identification information 51b.

DU identification information 51a is unique identification information for identifying the plurality of DUs 3a to 3c. For example, "DU #1" illustrated in FIG. 5 is an identifier assigned to DU 3a illustrated in FIG. 1, and "DU #2" is an identifier assigned to DU 3b. In addition, "DU #n" illustrated in FIG. 5 is, for example, an identifier assigned to DU 3c.

Figure 8:
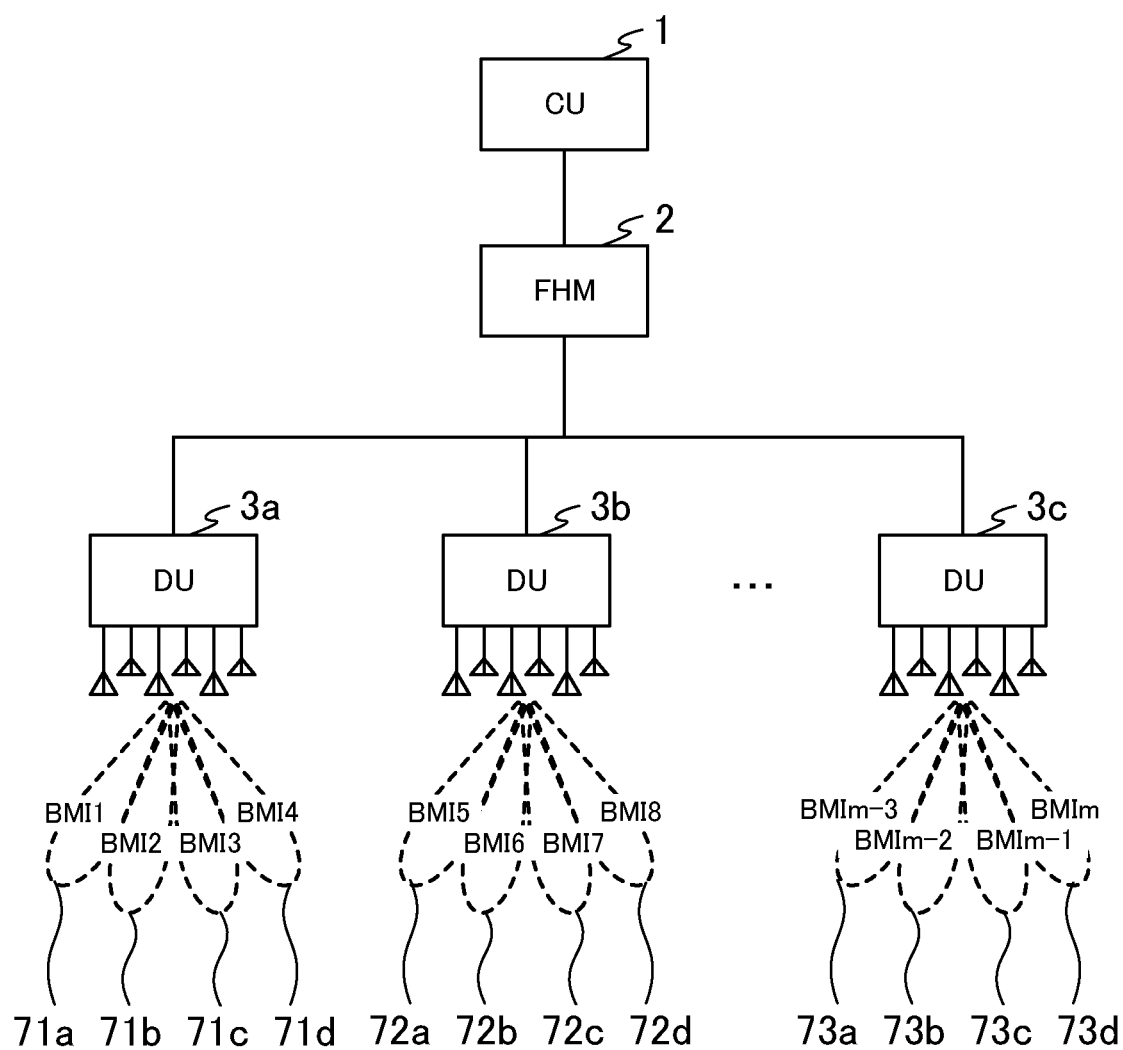
FIG. 8 illustrates beam sweeping.

Beam identification information 51b is identification information for identifying beam directions and is assigned to each beam so as to vary among the beams formed by DUs 3a to 3c (e.g., beam identification information 51b is assigned to beams 71a to 71d, 72a to 72d, and 73a to 73d illustrated in FIG. 8 so as to vary among the beams). In other words, beam identification information 51*b* is unique information over the plurality of DUs 3*a* to 3*c* (DU identification information 51*a*). At least one piece of beam identification information 51*b* is associated with each piece of DU identification information 51*a* and pieces of beam identification information 51*b* is stored in storage section 32.

For example, "BMI1 to BMI4" of beam identification information 51*b* illustrated in FIG. 5 are associated with "DU #1" of DU identification information 51*a*, and "BMI5 to BMI8" of beam identification information 51*b* are associated with "DU #2" of DU identification information 51*a*. Additionally, "BMIm-3 to BMIm" of beam identification information 51*b* illustrated in FIG. 5 are associated with "DU #n" of DU identification information 51*a*, for example. Thus, "BMI1, BMI2, BMIm-1, BMIm" of beam identification information 51*b* are unique information over "DU #1 to DU #n" of DU identification information 51*a*.

Note that, in FIG. 5, four pieces of beam identification information 51*b* are associated with each piece of DU identification information 51*a*, but the present disclosure is not limited thereto. For example, the number of pieces of beam identification information 51*b* associated with DU identification information 51*a* may depend on the number of directions of the beams that DUs 3*a* to 3*c* can form.

Returning to the explanation of FIG. 4, I/F section 33 communicates with the host apparatus connected to the core network. For example, I/F section 33 receives data from the host apparatus and outputs the data to transmission signal generation section 34. I/F section 33 also transmits the data outputted from demodulation/decoding section 41 to the host apparatus. I/F section 33 performs processing related to a layer higher than a physical layer or a MAC layer, for example.

Transmission signal generation section 34 generates the DL signal including a DL data signal and a DL control signal, and outputs the DL signal to coding/modulation section 35. The DL data signal includes, for example, data (user data) received by I/F section 33. The DL control signal includes the scheduling information, generated by control section 31, including radio resource allocation information for the DL data signal and radio resource allocation information for the UL data signal. The DL control signal also includes Downlink Control Information (DCI) including the MCS information generated by control section 31.

Coding/modulation section 35 performs coding processing and modulation processing on the DL signal outputted from transmission signal generation section 34, based on the MCS information generated by control section 31. Coding/modulation section 35 outputs the DL signal obtained by the coding processing and the modulation processing to mapping section 36.

Mapping section 36 maps the DL signal outputted from coding/modulation section 35 to a predetermined radio resource (DL resource) based on the scheduling information generated by control section 31. Mapping section 36 outputs the DL signal mapped to the radio resource to transmission section 37.

Transmission section 37 performs electric-to-optical conversion on the DL signal outputted from mapping section 36, and outputs the converted signal to an optical fiber (transmits the signal to FHM 2).

Reception section 38 performs optical-to-electric conversion on the optical signal received from the optical fiber (from FHM 2), and outputs the converted signal to demapping section 39.

Demapping section 39 demultiplexes (demaps) the UL data signals and the UL control signals of user terminals 4*a* to 4*c* from the UL signal outputted from reception section 38, based on the scheduling information (UL radio resource allocation information) generated by control section 31. Demapping section 39 outputs the demapped UL control signals to channel estimation section 40. Demapping section 39 also outputs the demapped UL data signals and the UL control signals to demodulation/decoding section 41.

Channel estimation section 40 estimates an UL channel state based on reference signals included in the UL control signals outputted from demapping section 39.

Demodulation/decoding section 41 demodulates and decodes the UL control signals and the UL data signals outputted from demapping section 39, based on the channel state estimated by channel estimation section 40. Demodulation/decoding section 41 outputs the demodulated and decoded UL control signals to communication quality acquisition section 42. Demodulation/decoding section 41 also outputs the demodulated and decoded UL data signals to I/F section 33.

Communication quality acquisition section 42 acquires the communication quality of the DL between DUs 3*a* to 3*c* and user terminals 4*a* to 4*c*, from the UL control signals outputted from demodulation/decoding section 41. Communication quality acquisition section 42 outputs the acquired communication quality to control section 31.

Note that a description is omitted in FIG. 4 of a configuration section for performing multiple-input and multiple-output (MIMO) processing, such as a precoding section and a pre-filtering section. CU 1 performs precoding on the signal outputted from coding/modulation section 35, for example. CU 1 also performs pre-filtering processing on the signals outputted from demapping section 39, for example.

Figure 6:
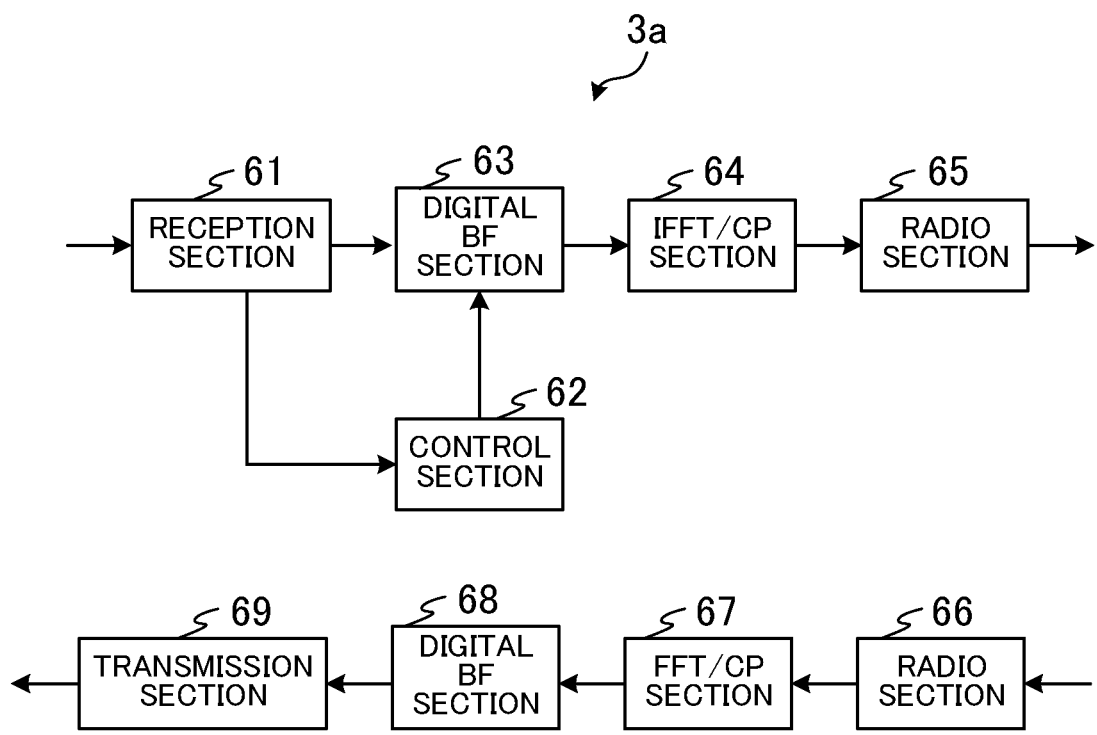
FIG. 6 illustrates exemplary blocks of the DU in FIG. 1.

FIG. 6 illustrates exemplary blocks of DU 3*a* in FIG. 1. As illustrated in FIG. 6, DU 3*a* includes reception section 61, control section 62, Digital Beam Forming (BF) sections 63 and 68, Inverse Fast Fourier Transform (IFFT)/Cyclic Prefix (CP) section 64, radio sections 65 and 66, Fast Fourier Transform (FFT)/CP section 67, and transmission section 69.

Note that DUs 3*b* and 3*c* have similar blocks to those of DU 3*a* and descriptions thereof are thus omitted. Further, digital BF section 63 is provided between reception section 61 and IFFT/CP section 64 in FIG. 6, but an analog BF may be provided in the subsequent stage of IFFT/CP section 64.

Reception section 61 receives an optical signal transmitted from FHM 2, performs optical-to-electric conversion, and outputs the converted signal to control section 62 and digital BF section 63. The signal received by reception section 61 includes the DL signal. The signal received by reception section 61 also includes beam information 51.

As described below in detail, control section 62 refers to beam information 51 received by reception section 61, and acquires beam identification information 51*b* corresponding to the DU identification information of the own unit based on the DU identification information assigned to the own unit. Control section 62 then controls digital BF section 63 and sweeps the beams to be outputted from the antennas.

Digital BF section 63 multiplies the signal received by reception section 61 by a BF weight corresponding to beam identification information 51*b* (BMI) fed back from user terminals 4*a* to 4*c*. Digital BF section 63 outputs the signal obtained by multiplying the BF weight to IFFT/CP section 64. The feedback of beam identification information 51*b* will be described later in detail.

IFFT/CP section 64 performs IFFT processing on the signal outputted from digital BF section 63, and adds a CP.

IFFT/CP section 64 outputs the signal obtained by applying IFFT processing and adding the CP to radio section 65.

Radio section 65 performs radio transmission processing, such as D/A conversion, up-conversion, and signal amplification, on the signal outputted from IFFT/CP section 64. Radio section 65 outputs the signal obtained by the radio transmission processing to the antennas (not illustrated).

Radio section 66 performs radio reception processing, such as signal amplification, down-conversion, and A/D conversion, on the signals received by the antennas (not illustrated). Radio section 66 outputs the signals obtained by the radio reception processing to FFT/CP section 67.

FFT/CP section 67 performs FFT processing on the signals outputted from radio section 66, and removes the CPs. FFT/CP section 67 outputs the signals obtained by applying the FFT processing and removing the CPs to digital BF section 68.

Digital BF section 68 multiplies the signals outputted from FFT/CP section 68 by BF weights corresponding to beam identification information 51*b* (BMIs) fed back from user terminals 4*a* to 4*c*. Digital BF section 68 outputs the signals obtained by multiplying the BF weights to transmission section 69.

Transmission section 69 performs electric-to-optical conversion on the signals outputted from digital BF section 68 and transmits the converted signals to CU 1 via FHM 2.

A description will be given of acquisition of beam identification information 51*b* in DUs 3*a* to 3*c*.

Figure 7:
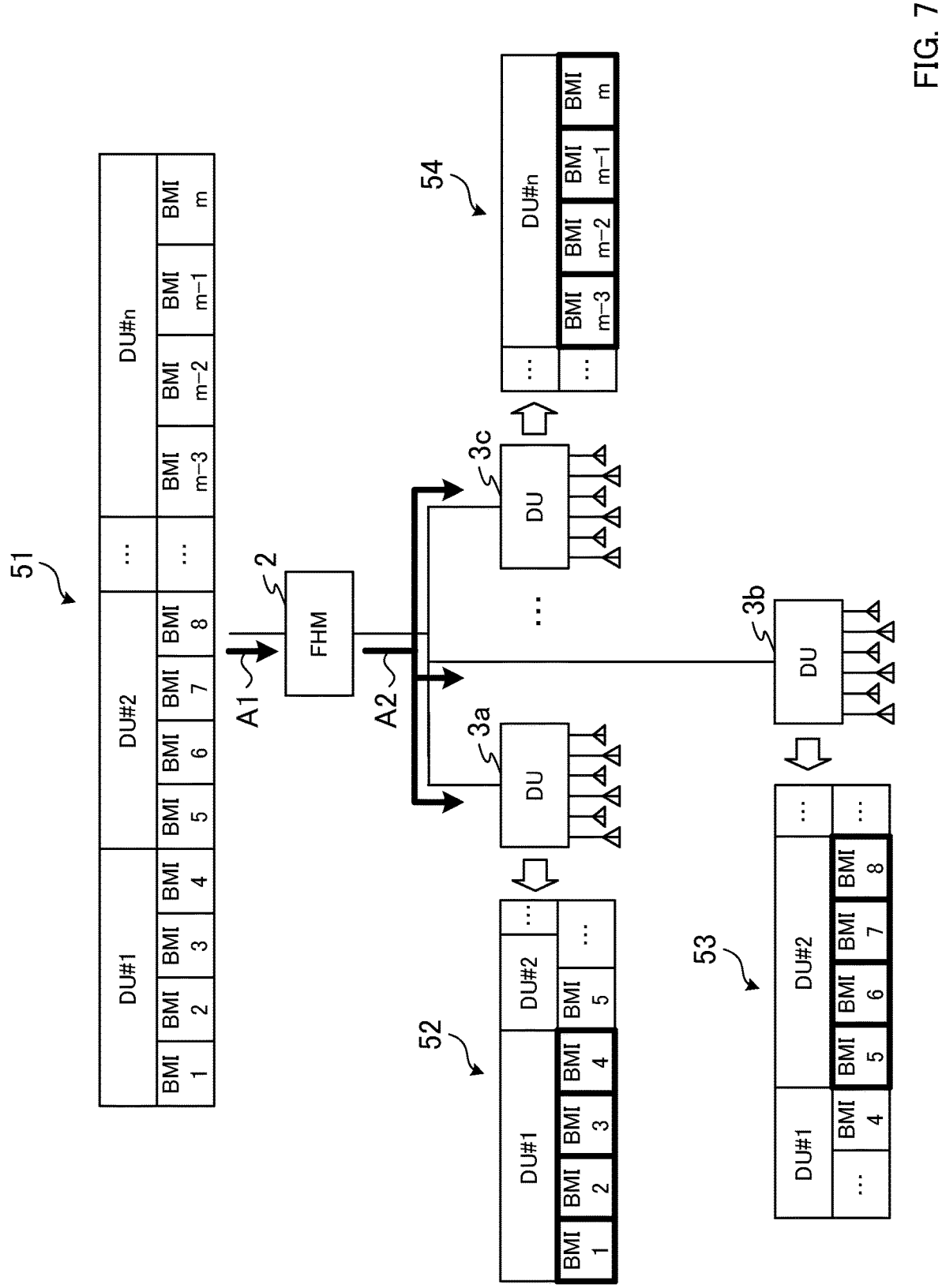
FIG. 7 is a diagram describing acquisition of beam identification information in the DUs.

FIG. 7 is a diagram describing the acquisition of beam identification information 51*b* in DUs 3*a* to 3*c*. FIG. 7 illustrates FHM 2 and DUs 3*a* to 3*b* illustrated in FIG. 1. FIG. 7 also illustrates beam information 51 illustrated in FIG. 5.

Beam information 51 is transmitted from CU 1 (not illustrated in FIG. 7) to FHM 2, as indicated by arrow A1 in FIG. 7. Beam information 51 is then copied in FHM 2 and transmitted to DUs 3*a* to 3*c*, as indicated by arrow A2 in FIG. 7.

DUs 3*a* to 3*c* have stored the DU identification information respectively assigned to the own units in their own storage sections (not illustrated in FIG. 6). For example, DU 3*a* has stored DU identification information "DU #1" of the own unit in the storage section. DU 3*b* has stored DU identification information "DU #2" of the own unit in the storage section. DU 3*c* has stored DU identification information "DU #n" of the own unit in the storage section.

DUs 3*a* to 3*c* refer to beam information 51 received from FHM 2, and acquire the respective beam identification information corresponding to the DU identification information of the own units based on the DU identification information of their own.

For example, beam information 52 illustrated in FIG. 7 represents a part of beam information 51 received by DU 3*a* from FHM 2. Since the DU identification information of DU 3*a* is "DU #1", control section 62 of DU 3*a* acquires beam identification information "BMI1, BMI2, BMI3, and BMI4" illustrated in thick frames of beam information 52.

Further, beam information 53 illustrated in FIG. 7 represents a part of beam information 51 received by DU 3*b* from FHM 2, for example. Since the DU identification information of DU 3*b* is "DU #2", DU 3*b* acquires beam identification information "BMI5, BMI6, BMI7, and BMI8" illustrated in thick frames of beam information 53.

Furthermore, beam information 54 illustrated in FIG. 7 represents a part of beam information 51 received by DU 3*c* from FHM 2, for example. Since the DU identification information of DU 3*c* is "DU #n", DU 3*c* acquires beam identification information "BMIm-3, BMIm-2, BMIm-1, and BMIm" illustrated in thick frames of beam information 54. As described above, DUs 3*a* to 3*b* acquire the unique beam identification information respectively assigned to the own units. Note that DUs 3*a* to 3*b* store beam information 51 transmitted from CU 1 in the respective storage sections (not illustrated in FIG. 6).

DUs 3*a* to 3*c* sweep the beams in various directions to search for optimal beams directed to user terminals 4*a* to 4*c*. At this time, DUs 3*a* to 3*c* include the beam identification information respectively assigned to the own units, which is acquired from beam information 51, in the beams subject to sweeping (hereinafter, referred to as "sweeping beam(s)").

FIG. 8 illustrates the beam sweeping. In FIG. 8, the same components as those in FIG. 1 are denoted by the same reference signs.

DUs 3*a* to 3*c* form the beams in various directions as illustrated in FIG. 8 when searching for the optimal beams directed to user terminals 4*a* to 4*c*. For example, beams 71*a* to 71*d* illustrated in FIG. 8 represent the beams formed by DU 3*a*. Beams 72*a* to 72*d* represent the beams formed by DU 3*b*. Beams 73*a* to 73*d* represent the beams formed by DU 3*c*.

When sweeping the beams, DU 3*a* to 3*c* include the beam identification information respectively assigned to the own units in the beams.

For example, DU 3*a* is assigned beam identification information "BMI1, BMI2, BMI3, and BMI4". Thus, control section 62 of DU 3*a* respectively includes "BMI1, BMI2, BMI3, and BMI4" in sweeping beams 71*a* to 71*d*. For example, DU 3*a* respectively multiplies "BMI1, BMI2, BMI3, and BMI4" by BF weights respectively forming beams 71*a* to 71*d*.

Further, DU 3*b* is assigned beam identification information "BMI5, BMI6, BMI7, and BMI8", for example. Thus, DU 3*b* respectively includes "BMI5, BMI6, BMI7, and BMI8" in sweeping beams 72*a* to 72*d*. For example, DU 3*b* respectively multiplies "BMI5, BMI6, BMI7, and BMI8" by BF weights respectively forming beams 71*a* to 71*d*.

Furthermore, DU 3*c* is assigned beam identification information "BMIm-3, BMIm-2, BMIm-1, and BMIm", for example. Thus, DU 3*c* respectively includes "BMIm-3, BMIm-2, BMIm-1, and BMIm" in sweeping beams 73*a* to 73*d*. For example, DU 3*b* respectively multiplies "BMIm-3, BMIm-2, BMIm-1, and BMIm" by BF weights respectively forming beams 71*a* to 71*d*. As described above, DUs 3*a* to 3*c* sweep the beams including the beam identification information.

User terminals 4*a* to 4*c* respectively receive the swept beams outputted from DUs 3*a* to 3*c*. User terminals 4*a* to 4*c* feed back, to CU 1, the beam identification information (BMIs) of the beams with the best communication quality among the received beams.

Figure 9:
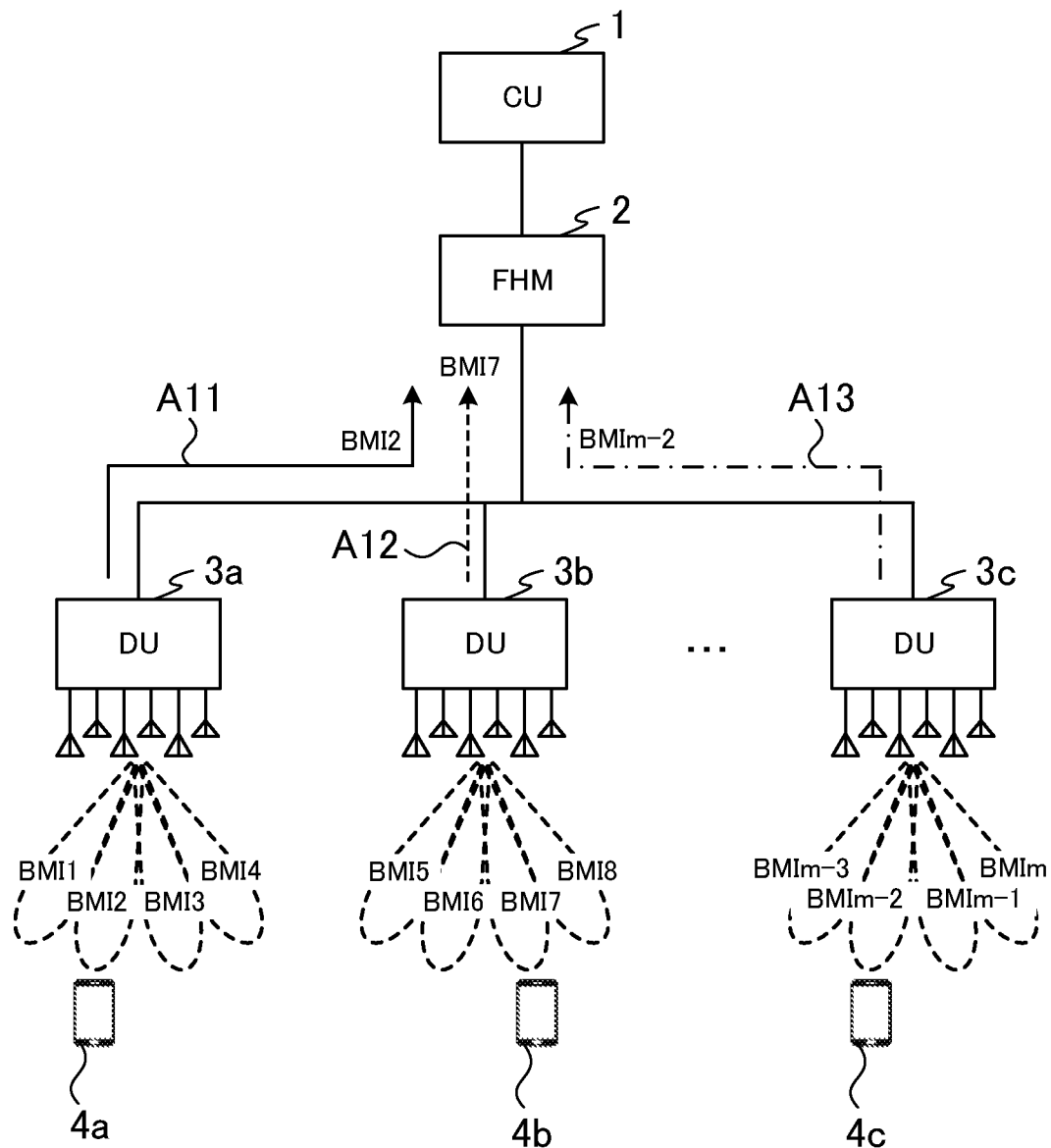
FIG. 9 illustrates feedback of the beam identification information.

FIG. 9 illustrates the feedback of the beam identification information. In FIG. 9, the same components as those in FIG. 8 are denoted by the same reference signs.

User terminal 4*a* receives the swept beams outputted from DU 3*a*. It is assumed that the beam including beam identification information "BMI2" has the best reception level among the beams received by user terminal 4*a*. In this case, user terminal 4*a* feeds back beam identification information "BMI2" to CU 1 via DU 3*a* and FHM 2, as indicated by arrow A11 in FIG. 9. To be more specific, user terminal 4*a* radio-transmits beam identification information "BMI2" to DU 3*a*. Radio section 66 of DU 3*a* receives beam identification information "BMI2" radio-transmitted from user terminal 4*a*. Transmission section 69 of DU 3*a* transmits received beam identification information "BMI2" to FHM 2. FHM 2 transmits beam identification information "BMI2" received from DU 3*a* to CU 1.

Likewise, user terminal 4*b* receives the swept beams outputted from DU 3*b*. It is assumed that the beam including beam identification information "BMI7" has the best reception level among the beams received by user terminal 4*b*. In this case, user terminal 4*a* feeds back beam identification information "BMI7" to CU 1 via DU 3*b* and FHM 2, as indicated by arrow A12 in FIG. 9.

Similarly, user terminal 4*c* receives the swept beams outputted from DU 3*c*. It is assumed that the beam including beam identification information "BMIm-2" has the best reception level among the beams received by user terminal 4*c*. In this case, user terminal 4*a* feeds back beam identification information "BMIm-2" to CU 1 via DU 3*c* and FHM 2, as indicated by arrow A13 in FIG. 9. User terminals 4*a* to 4*b* feed back the beam identification information to CU 1 in this manner.

Beam sweep timings of DU 3*a* to DU 3*c* will be described.

Figure 10:
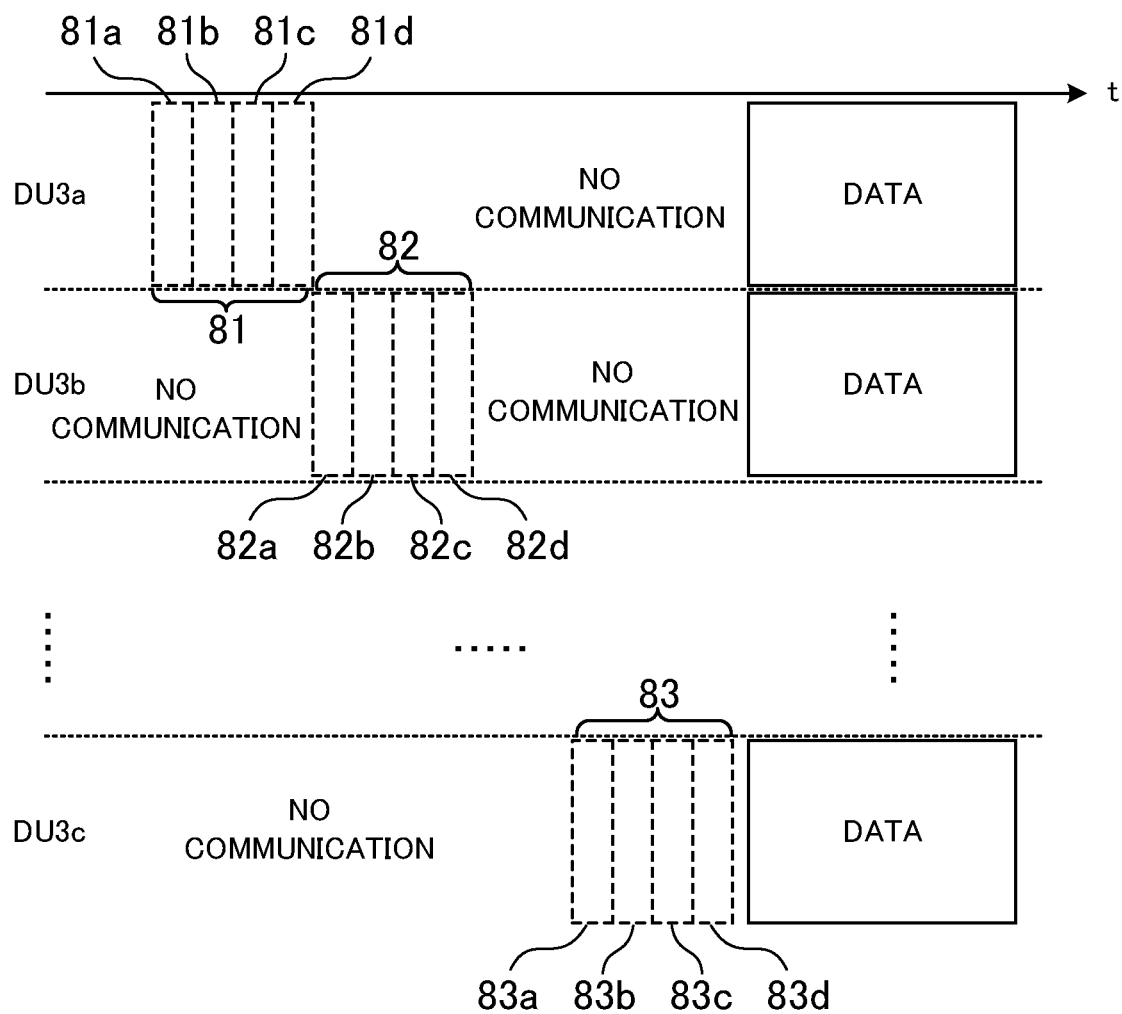
FIG. 10 illustrates exemplary beam sweep timings.

FIG. 10 illustrates exemplary beam sweep timings. DU 3*a* to DU 3*c* sweep the beams so that the beam sweep timings do not overlap with each other.

For example, transmission timing 81 illustrated in FIG. 10 indicates beam sweep timings of DU 3*a*. Transmission timing 82 indicates beam sweep timings of DU 3*b*. Transmission timing 83 indicates beam sweep timings of DU 3*c*.

DU 3*a* outputs the beam including beam identification information "BMI1" at beam sweep timing 81*a* of transmission timing 81. DU 3*a* also outputs the beam including beam identification information "BMI2" at beam sweep timing 81*b* of transmission timing 81. Additionally, DU 3*a* outputs the beam including beam identification information "BMI3" at beam sweep timing 81*c* of transmission timing 81. Further, DU 3*a* outputs the beam including beam identification information "BMI4" at beam sweep timing 81*d* of transmission timing 81.

Likewise, DU 3*b* outputs beams respectively including beam identification information "BMI5, BMI6, BMI7, and BMI8" at respective beam sweep timings 82*a* to 82*d* of transmission timing 82.

DU 3*c* also similarly outputs beams respectively including beam identification information "BMIm-3, BMIm-2, BMIm-1, and BMIm" at respective beam sweep timings 83*a* to 83*d* of transmission timing 83. DUs 3*a* to 3*c* sweep the beams in this manner.

Note that user terminals 4*a* to 4*c* feed back the beam identification information to CU 1, as described in FIG. 9. User terminals 4*a* to 4*c* feed back the beam identification information to CU 1 at different timings from transmission timings 81 to 83 illustrated in FIG. 10. For example, when DUs 3*a* to 3*c* sweep the beams, the beam sweep timing is different for each BMI. Thus, user terminals 4*a* to 4*c* can feed back the BMIs with good communication quality depending on the timings of accessing (e.g., random access) DUs 3*a* to 3*c* (CU 1), when DUs 3*a* to 3*c* sweep the beams.

Incidentally, beam information 51 stored in storage section 32 is transmitted to DUs 3*a* to 3*c* when, for example, DUs 3*a* to 3*c* sweep the beams. For example, beam information 51 is transmitted at beam sweep timings 81*a*, 82*a*, and 83*a* illustrated in FIG. 10.

Data transmission (transmission of DL data signals) from CU 1 to user terminals 4*a* to 4*c* will be described. When transmitting data to user terminals 4*a* to 4*c* subordinate to DUs 3*a* to 3*c*, CU 1 respectively includes the beam identification information fed back from user terminals 4*a* to 4*c* in the transmission data. Since the beam identification information is uniquely assigned over DUs 3*a* to 3*c* as illustrated in FIG. 5, DUs 3*a* to 3*c* subordinate to FHM 2 can individually perform beam forming to transmit the data to user terminals 4*a* to 4*c*.

Figure 11:
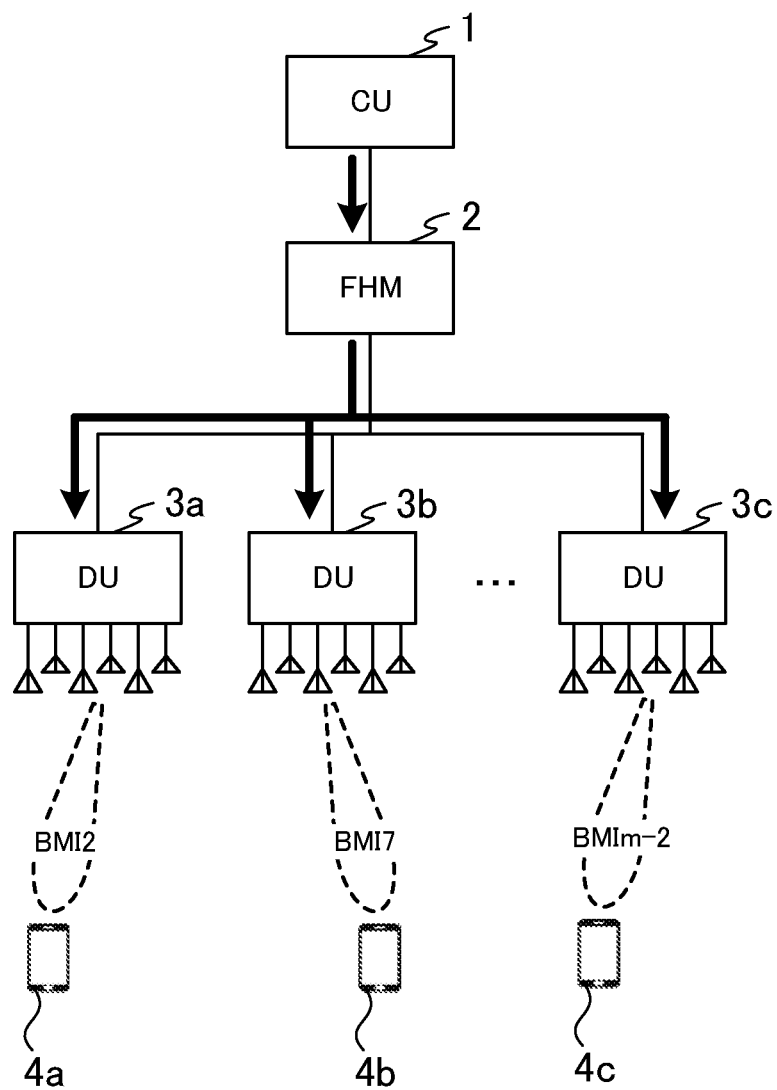
FIG. 11 illustrates exemplary data transmission to user terminals.

FIG. 11 illustrates exemplary data transmission to user terminals 4*a* to 4*c*. In FIG. 11, the same components as those in FIG. 1 are denoted by the same reference signs.

When transmitting data to user terminals 4*a* to 4*c*, control section 31 of CU 1 includes the beam identification information fed back from user terminals 4*a* to 4*c* in respective headers of the data, and transmits the data to FHM 2.

For example, the beam identification information fed back from user terminal 4*a* to CU 1 is assumed to be "BMI2". The beam identification information fed back from user terminal 4*b* to CU 1 is assumed to be "BMI7". The beam identification information fed back from user terminal 4*c* to CU 1 is assumed to be "BMIm-2". In this case, control section 31 of CU 1 includes beam identification information "BMI2" in the header of transmission data to user terminal 4*a*, and transmits the data to FHM 2. In addition, control section 31 of CU 1 includes beam identification information "BMI7" in the header of transmission data to user terminal 4*b*, and transmits the data to FHM 2. Further, control section 31 of CU 1 includes beam identification information "BMIm-2" in the header of transmission data to user terminal 4*c*, and transmits the data to FHM 2.

The data transmitted to FHM 2 is copied by FHM 2, and transmitted to DUs 3*a* to 3*c*. Since DUs 3*a* to 3*c* have received (stored) beam information 51 transmitted from CU 1, when the header of the received data includes beam identification information 51*b* assigned to the own unit, DUs 3*a* to 3*c* can respectively form the beams corresponding to beam identification information 51*b* and transmit the data to user terminals 4*a* to 4*c*.

For example, DU 3*a* can form the beam in a direction corresponding to "BMI2" from data identification information "BMI2" included in the header of the data, and transmit the data to user terminal 4*a*. In addition, DU 3*b* can form the beam in a direction corresponding to "BMI7" from data identification information "BMI7" included in the header of the data, and transmit the data to user terminal 4*b*. Further, DU 3*c* can form the beam in a direction corresponding to "BMIm-2" from data identification information "BMIm-2" included in the header of the data, and transmit the data to user terminal 4*c*. This way, DUs 3*a* to 3*c* can individually control the beam direction by unique beam identification information 51*b* associated with DU identification information 51*a*.

As described above, CU 1 that communicates, via FHM 2, with DUs 3*a* to 3*c* performing radio communication with user terminals 4*a* to 4*c* includes storage section 32 that stores beam information 51. Beam information 51 is information in which DU identification information 51*a* of DUs 3*a* to 3*c* and beam identification information 51*b* assigned to each beam so as to be different among the beams respectively formed by DUs 3*a* to 3*c* are associated with each other. Further, transmission section 37 of CU 1 transmits, to DUs 3*a* to 3*c* via FHM 2, beam information 51 stored in storage section 51, and reception section 38 receives, from DUs 3*a* to 3*c* via FHM 2, beam identification information 51*b* assigned to the beams with the best communication quality received by DUs 3*a* to 3*c* from user terminals 4*a* to 4*c*. This allows CU 1 to individually control the beam directions of DUs 3*a* to 3*c* subordinate to FHM 2. Since CU 1 can individually control the beam directions of DUs 3*a* to 3*c* subordinate to FHM 2, it is also possible to perform flexible scheduling for user terminals 4a to 4c subordinate to DUs 3a to 3c respectively.

Meanwhile, reception section 61 of DU 3a (3b, and 3c) that communicates with CU 1 via FHM 2 and performs radio communication with user terminals 4a to 4c, receives beam information 51 from CU 1 via FHM 2. Control section 62 of DU 3a acquires beam identification information 51b corresponding to the DU identification information of the own unit from the beam information received by reception section 61. Control section 62 also performs beam sweeping using the beams identified by acquired beam identification information 51b, and transmits beam identification information 51b to user terminals 4a to 4c. Then, radio section 66 of DU 3a receives beam identification information 51b assigned to the beam with the best communication quality from user terminals 4a to 4c, and transmission section 69 transmits beam identification information 61b received by radio section 66 to CU 1 via FHM 2. This allows DUs 3a to 3c subordinate to FHM 2 to individually control the beam direction.

In the above, CU 1 transmits beam information 51 stored in storage section 32 to DUs 3a to 3c when DUs 3a to 3c sweep the beams, but the present disclosure is not limited thereto. For example, CU 1 may transmit beam information 51 to DUs 3a to 3c when beam information 51 is stored in storage section 32 or beam information 51 stored in storage section 32 is updated. In this case, DUs 3a to 3c store beam information 51 transmitted from CU 1 in the own storage sections. Then, DUs 3a to 3c may acquire in advance beam identification information 51b respectively assigned to the own units from beam information 51 stored in the storage sections, and include beam identification information 51b acquired in advance in the beams when sweeping the beams.

Embodiment 2

In Embodiment 2, an FHM sorts out UL signals and noises using beam information. For example, the FHM transmits a signal to a CU by combining the signals transmitted from DUs having user terminal subordinates while not combining the signal (i.e., noise) transmitted from a DU having no user terminal subordinate.

Figure 12:
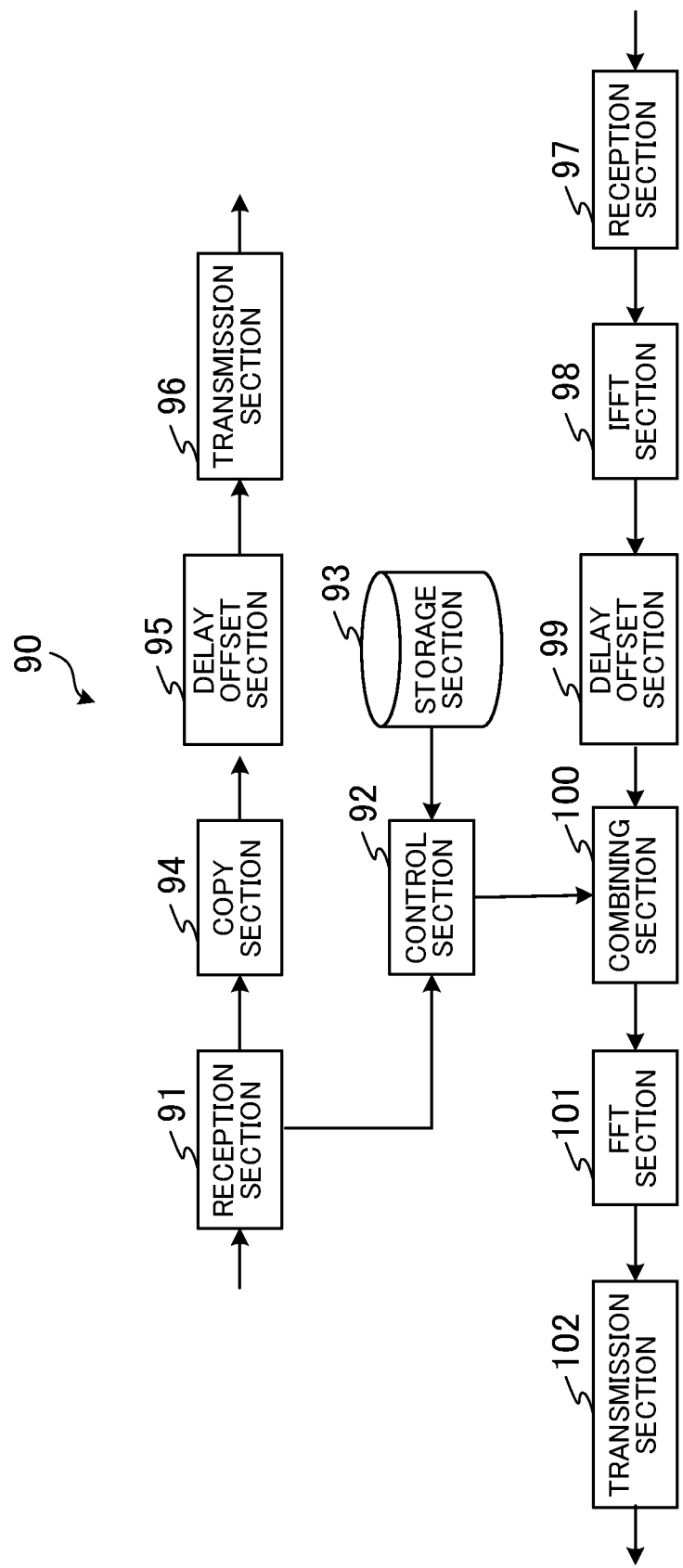
FIG. 12 illustrates exemplary blocks of an FHM according to Embodiment 2.

FIG. 12 illustrates exemplary blocks of FHM 90 according to Embodiment 2. As illustrated in FIG. 12, FHM 90 includes reception sections 91 and 97, control section 92, storage section 93, copy section 94, delay offset sections 95 and 99, transmission sections 96 and 102, IFFT section 98, combining section 100, and FFT section 101. FHM 90 is connected, for example, between CU 1 and DUs 3a to 3c illustrated in FIG. 1.

Reception section 91 receives an optical signal transmitted from CU 1, performs optical-to-electric conversion, and outputs the converted signal to control section 92 and copy section 94.

Control section 92 stores beam information (transmitted from CU 1) received by reception section 91 in storage section 93. As described below in detail, control section 92 acquires DU identification information by referring to the beam information stored in storage section 93 and using UL beam identification information included in scheduling information for user terminals 4a to 4c (transmitted from CU 1) received by reception section 91. Control section 92 then determines which of DUs 3a to 3c user terminals 4a to 4c are each subordinate to, based on the acquired DU identification information. Subsequently, control section 92 controls combining section 100 which UL signals transmitted from DUs 3a to 3c to combine, based on the determination result of which of DUs 3a to 3c user terminals 4a to 4c are each subordinate to.

Copy section 94 copies the signal received by reception section 91. For example, copy section 94 copies the received signal for DUs 3a to 3c. Copy section 94 outputs the copied signals to delay offset section 95.

Delay offset section 95 adjusts delay times of the signals copied in copy section 94. For example, the distance between DUs 3a to 3c and FHM 2 varies depending on the installation locations of DUs 3a to 3c, so that the delay time (the arrival time) of a signal varies. Delay offset section 95 thus adjusts transmission timings of the signals so as to reduce the difference in delay times of the signals. Delay offset section 95 outputs the signals with adjusted delay times to transmission section 96.

Transmission section 96 performs electric-to-optical conversion on the signals with the delay times adjusted by delay offset section 95, and transmits the converted signals to DUs 3a to 3c.

Reception section 97 receives optical signals transmitted from DUs 3a to 3c, performs optical-to-electric conversion, and outputs the converted signals to IFFT section 98.

IFFT section 98 performs IFFT processing on the signals outputted from reception section 97. IFFT section 98 outputs the signal obtained by the IFFT processing to delay offset section 99.

Delay offset section 99 adjusts delay times of the signals outputted from IFFT section 98. For example, the distance between DUs 3a to 3c and FHM 2 varies depending on the installation locations of DUs 3a to 3c, so that the delay time of a signal varies. Delay offset section 99 thus adjusts reception timings of the signals so as to eliminate the difference in the delay times of the signals. Delay offset section 99 outputs the signals with adjusted delay times to combining section 100.

Combining section 100 combines the signals of DUs 3a to 3c with the delay times adjusted by delay offset section 99. At this time, combining section 100 determines signals to combine according to the control of control section 92. Combining section 100 outputs the combined signal to FFT section 101.

FFT section 101 performs FFT processing on the signal outputted from combining section 100. FFT section 101 outputs the signal obtained by the FFT processing to transmission section 102.

Transmission section 102 performs electric-to-optical conversion on the signal subjected to the FFT processing of FFT section 101, and transmits the converted signal to CU 1.

Figure 13:
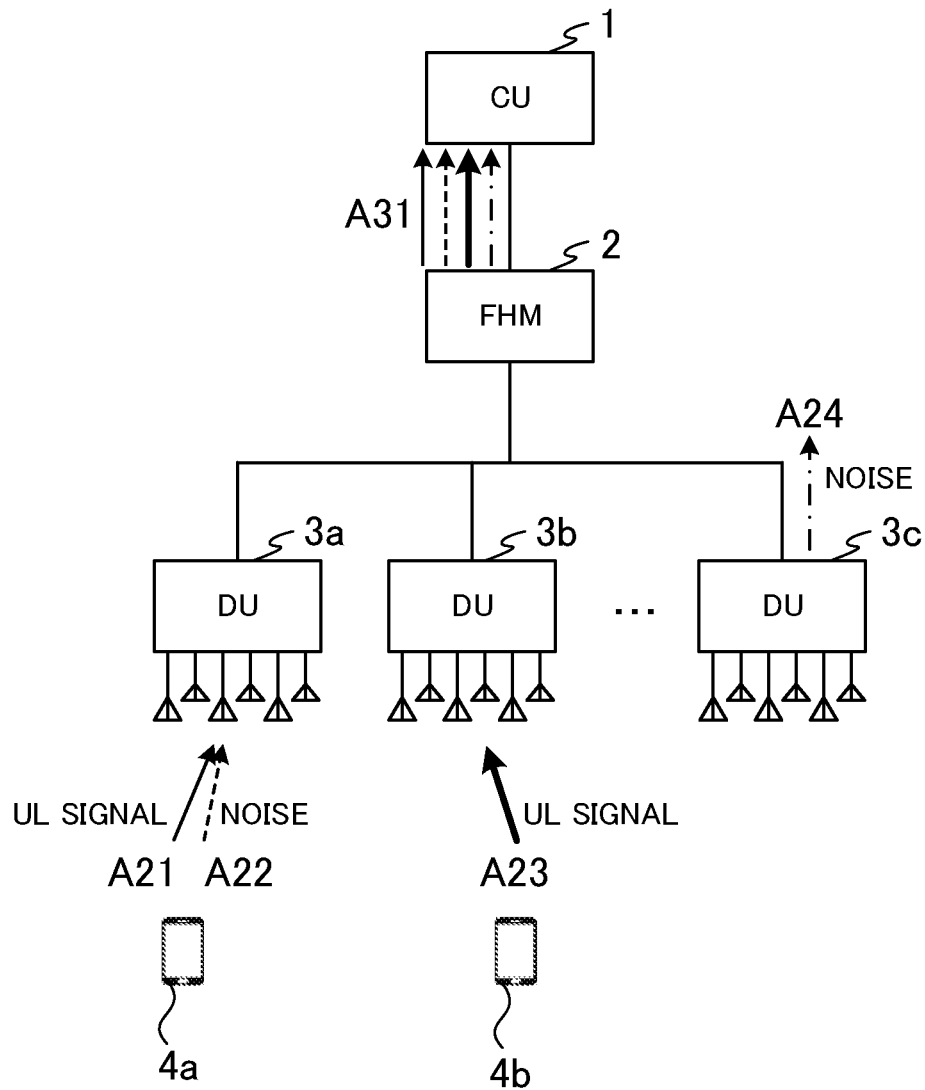
FIG. 13 illustrates an example of combining signals in the FHM.

FIG. 13 illustrates an example of combining the signals in FHM 2. In FIG. 13, the same components as those in FIG. 1 are denoted by the same reference signs.

In the example of FIG. 13, DU 3a receives a UL signal indicated by arrow A21 and a noise indicated by arrow A22 from user terminal 4a. DU 3b receives a UL signal indicated by arrow A23 from user terminal 4b. DU 3c receives a noise indicated by arrow A24. The noise indicated by arrow A24 is, for example, a thermal noise of DU 3c. Alternatively, the noise indicated by arrow A24 is, for example, an interference noise of user terminal 4b.

The UL signals and the noises received by DU 3a to DU 3c are transmitted to FHM 2. FHM 2 combines the UL signals and the noises received from DU 3a to DU 3c and transmits the combined signal to CU 1.

For example, four arrows A31 illustrated between FHM 2 and CU 1 in FIG. 13 respectively correspond to arrows A21 to A24 illustrated under DUs 3a to 3c. FHM 2 combines the UL signals and the noises as indicated by arrows A31, and transmits the combined signal to CU 1.

In a radio base station in FIG. 13, increasing DUs 3a to 3c possibly increases the UL noises transmitted to CU 1. Thus, for the radio base station in FIG. 13, increasing DUs 3a to 3c possibly degenerates a UL area.

Figure 14:
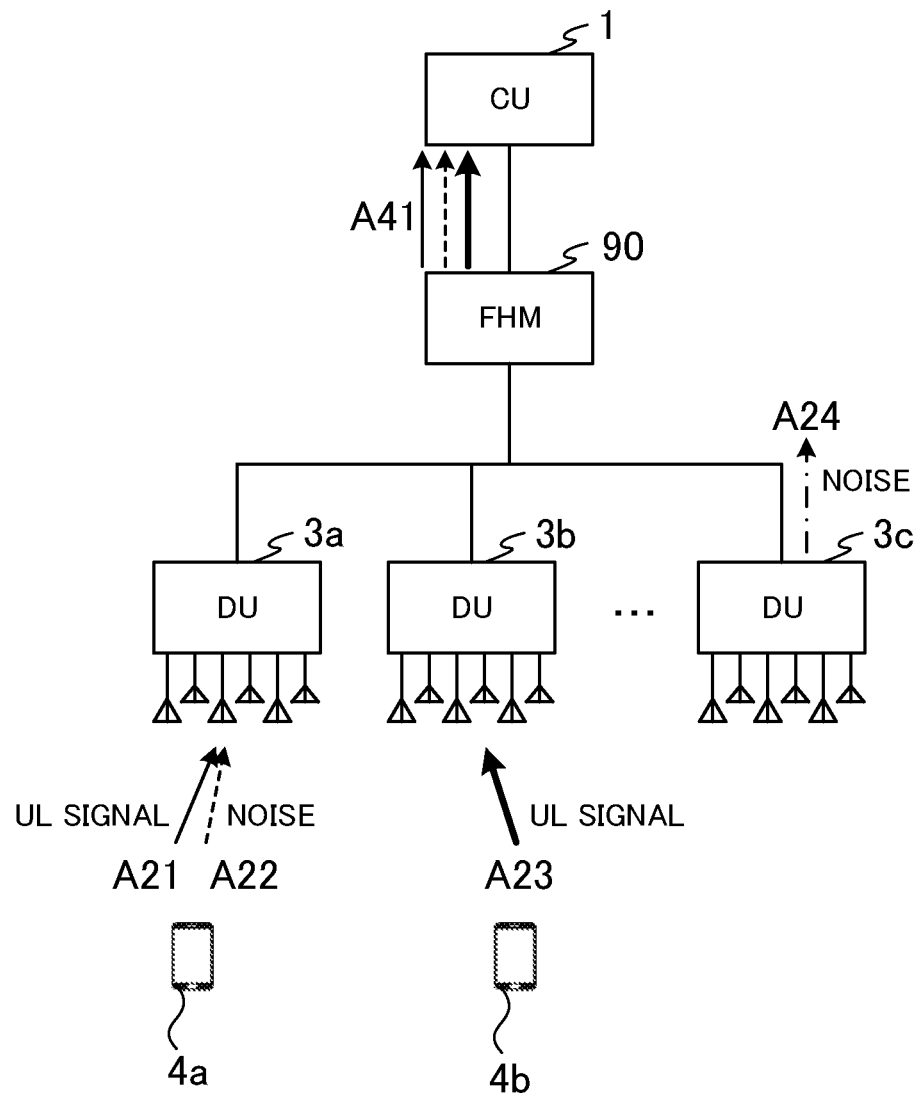
FIG. 14 illustrates another example of combining signals in the FHM.

FIG. 14 illustrates an example of combining the signals in FHM 90. In FIG. 14, the same components as those in FIG. 13 are denoted by the same reference signs. In contrast to FIG. 13, FHM 90 described in FIG. 12 is connected between CU 1 and DUs 3a to 3c in FIG. 14.

FHM 90 combines the signals transmitted from DUs 3a and 3b respectively having user terminal subordinates 4a and 4b, and does not combine the signal transmitted from DU 3c having no user terminal subordinate. As indicated by three arrows A41 between FHM 90 and CU 1, FHM 90 combines, for example, the signals of user terminal 4a received from DU 3a (the UL signal indicated by arrow A21, and the noise indicated by arrow A22) and the signal of user terminal 4b received from DU 3b (the UL signal indicated by arrow A23), and does not combine the signal received from DU 3c having no user terminal subordinate (the noise indicated by arrow A24).

The above operation will be described in detail. Reception section 91 of FHM 90 receives beam information 51 transmitted from CU 1 to DUs 3a to 3c. Control section 92 stores beam information 51 received by reception section 91 in storage section 93.

Reception section 91 of FHM 90 also receives scheduling information transmitted from CU 1 to user terminals 4a and 4b. The scheduling information includes scheduling information for the UL signals of user terminals 4a and 4b. The scheduling information for the UL signals includes beam identification information 51b for user terminals 4a and 4b to transmit the UL signals.

Beam information 51 is stored in storage section 93 of FHM 90. Control section 92 of FHM 90 can thus specify which of DUs 3a to 3c user terminals 4a and 4b are each subordinate to, by referring to beam identification information 51b of beam information 51 stored in storage section 93 based on beam identification information 51b included in the UL signal scheduling information.

For example, it is assumed that beam information 51 illustrated in FIG. 5 is stored in storage section 93 of FHM 90, and beam identification information 51b included in the UL signal scheduling information is "BMI2 and BMI7".

In this case, control section 92 refers to beam information 51 (see FIG. 5) stored in storage section 93 based on "BMI2 and BMI7", and acquires DU identification information "DU #1" corresponding to "BMI2" and DU identification information "DU #2" corresponding to "BMI7". This enables control section 92 to specify that user terminals are subordinate to DU 3a with DU identification information "DU #1" and DU 3b with DU identification information "DU #2".

Combining section 100 of FHM 90 combines the signals transmitted from DUs 3a to 3c. At this time, control section 92 controls combining section 100 so as to combine the signals transmitted from DUs 3a and 3b which have been specified to have user terminal subordinates, and not to combine the signal transmitted from DU 3c which has been specified to have no user terminal subordinate. This allows FHM 90, even when receiving a signal (noise) from DU 3c, not to combine the signal of DU 3c and transmit the signal to CU 1, for example.

Note that CU 1 can perform scheduling by frequency for user terminals 4a and 4b. FHM 90 sorts signals of the user terminals scheduled by frequency, and thus noise on a signal of another user terminal is not added together.

As described above, reception section 91 of FHM 2 that relays communication between CU 1 and DUs 3a to 3c receives beam information 51 from CU 1. Additionally, reception section 91 receives, from CU 1, scheduling information for user terminals 4a to 4c that respectively perform radio communication with DUs 3a to 3c. Control section 92 acquires, from beam information 51 received by reception section 91, DU identification information 51a corresponding to UL beam identification information 51b included in the scheduling information, and specifies DUs 3a to 3c having user terminal subordinates 4a to 4c from acquired DU identification information 51a. Then, combining section 100 combines the UL signals transmitted from specified DUs 3a to 3c, and transmission section 102 transmits the UL signal combined in combining section 100 to CU 1. This enables FHM 90 to reduce the noise of the UL signal transmitted to CU 1. This further enables FHM 90 to prevent degeneration of a UL area even when DUs 3a to 3c increase.

Embodiment 3

Figure 15:
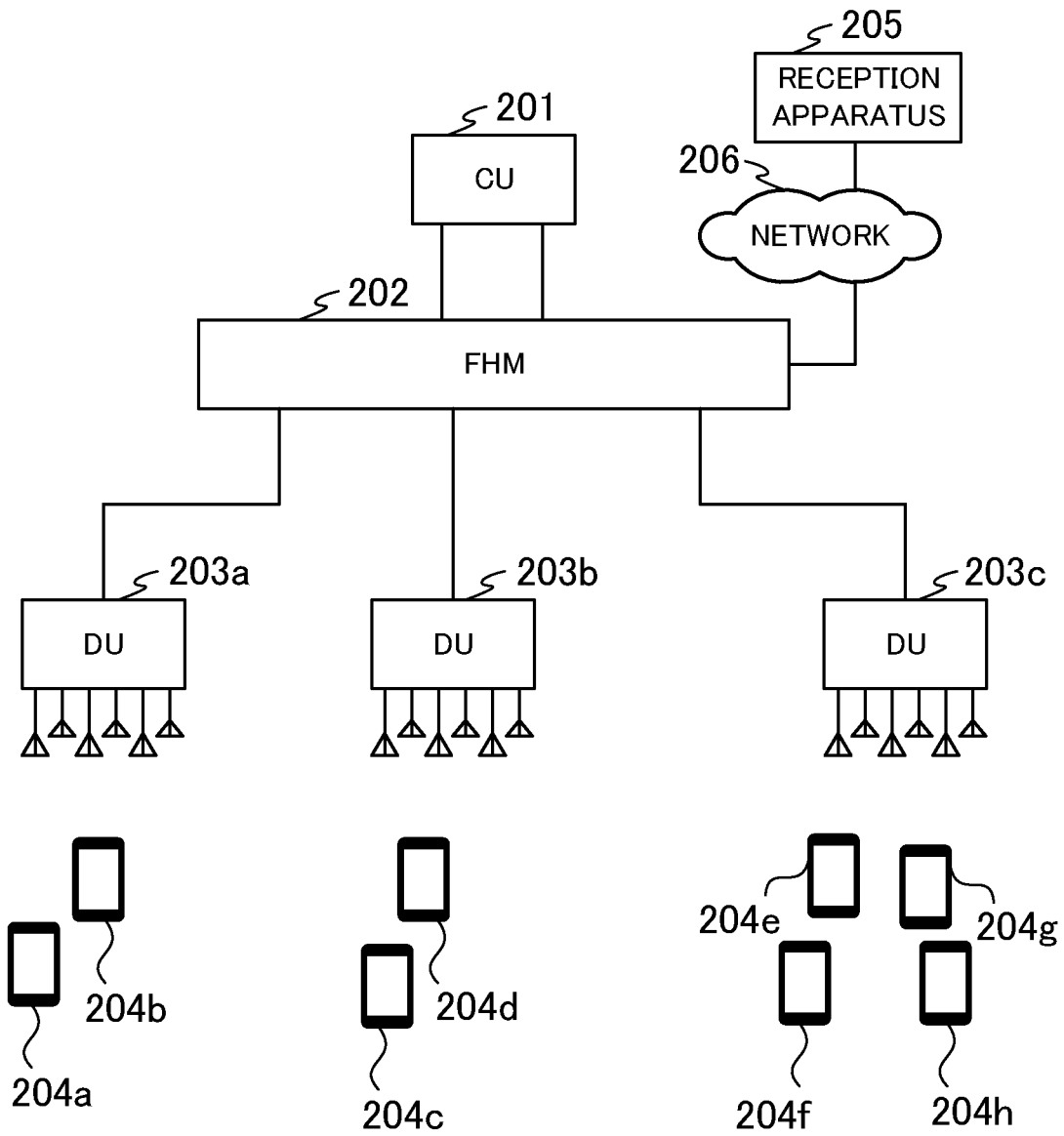
FIG. 15 illustrates an exemplary configuration of a radio base station according to Embodiment 3.

FIG. 15 illustrates an exemplary configuration of a radio base station according to Embodiment 3. As illustrated in FIG. 15, the radio base station includes Centralized Unit (CU) 1, FHM 2, and Distributed Units (DUs) 203a to 203c. FIG. 15 also illustrates user terminals 204a to 204h that perform radio communication with DUs 203a to 203c. Further, reception apparatus 205 and network 206 are illustrated in FIG. 15. The radio base station illustrated in FIG. 15 forms, for example, an advanced C-RAN.

CU 201 and FHM 202 are connected by, for example, an optical fiber. FHM 202 and DUs 203a to 203c are connected by, for example, optical fibers.

CU 201 is connected to a core network (not illustrated). CU 201 transmits a signal (data) received from the core network to FHM 202. CU 201 also transmits a signal received from FHM 202 to the core network. CU 201 performs, for example, base band (hereinafter, may be referred to as BB) processing on signals and maintenance monitoring processing on DUs 203a to 203c.

FHM 202 multiplexes fronthaul circuits between CU 201 and the plurality of DUs 203a to 203c. For example, FHM 202 copies the signal received from CU 201 and transmits the copied signals to DUs 203a to 203c. FHM 202 also combines signals received from DUs 203a to 203c and transmits the combined signal to CU 201.

As described below in detail, FHM 202 includes a switch. The switch switches connections between a plurality of BB processing apparatuses included in CU 201 (see, for example, FIG. 18 and FIG. 19) and DUs 203a to 203c (see, for example, broken lines in FHMs 202 illustrated in FIG. 18 and FIG. 19).

DUs 203a to 203c transmit the signals received from CU 201 via FHM 202 to user terminals 204a to 204h. DUs 203a to 203c also transmit signals received from user terminals 204a to 204h to CU 201 via FHM 202.

DUs 203a to 203c include several tens to several hundreds of antennas, for example, and perform radio communication with user terminals 204a to 204h. DUs 203a to 203c transmit and receive the signals using the plurality of antennas by controlling the amplitude and phases of the signals and forming beams having directivity to user terminals 204*a* to 204*h*. DUs 203*a* to 203*c* can form the beams in various directions.

Reception apparatus 205 receives connection indication information on how the plurality of BB processing apparatuses included in CU 201 are connected to DUs 203*a* to 203*c*, for example, from an operator performing maintenance of the radio base station and the like. Reception apparatus 205 transmits the connection indication information received from the operator to FHM 202 via network 206. The switch of FHM 202 connects the plurality of BB processing apparatuses in CU 201 to DUs 203*a* to 203*c* based on the received connection indication information.

Reception apparatus 205 is, for example, a terminal device such as a personal computer. Network 206 is, for example, a network such as a Local Area Network (LAN) or the internet.

Although the radio base station in FIG. 15 forms the advanced C-RAN, the radio base station may also form a C-RAN. In addition, although only a single FHM 202 is connected subordinate to CU 201 in FIG. 15, a plurality of FHMs 202 may also be connected.

CU 201 may also be referred to as, for example, Base station Digital processing Equipment (BDE), a Base Band Unit (BBU), a radio control apparatus, a master station, or a signal processing apparatus. Further, DUs 203*a* to 203*c* may also be referred to as Low power Small optical remote Radio Equipment (SRE), Remote Radio Equipment (RRE), Remote Radio Heads (RRHs), slave stations, or radio apparatuses, for example.

When a radio network system is built, traffic in each cell assumed during planning is different at times from the traffic in each cell when the radio network system is actually built. Examples will be described below with reference to FIGS. 16 and 17.

Figure 16:
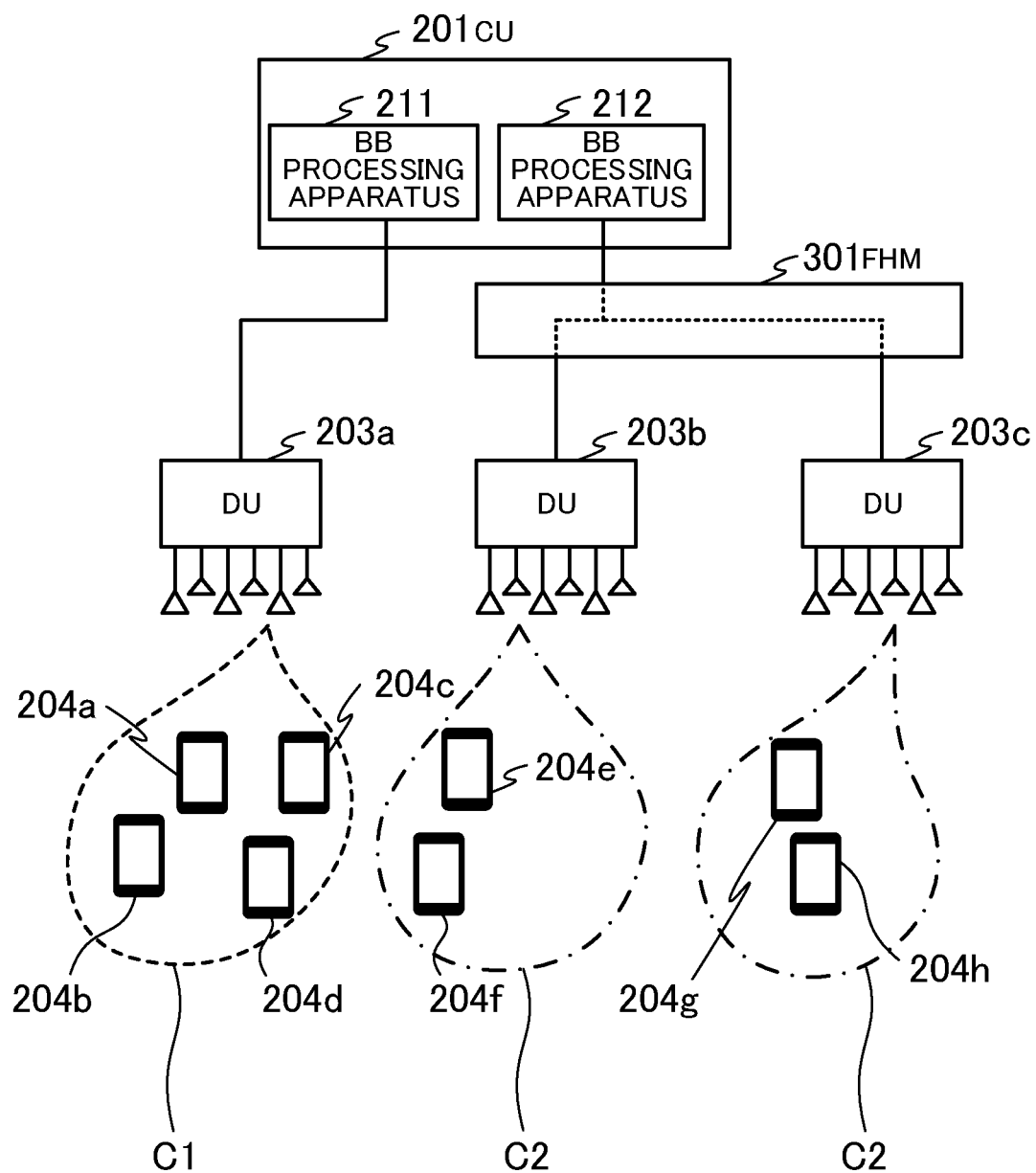
FIG. 16 is the first diagram describing exemplary traffic in cells.

FIG. 16 is the first diagram describing exemplary traffic in cells. In FIG. 16, the same components as those in FIG. 15 are denoted by the same reference signs. Note that FHM 301 is connected between CU 201 and DUs 203*b* and 203*c* in FIG. 16. In addition, DU 203*a* forms cell C1, and DUs 203*b* and 203*c* form cell C2 in FIG. 16.

CU 201 includes BB processing apparatuses 211 and 212. BB processing apparatuses 211 and 212 respectively perform base band processing of different cells. For example, BB processing apparatus 211 performs the base band processing of cell C1, and BB processing apparatus 212 performs the base band processing of cell C2.

DU 203*a* is connected to BB processing apparatus 211. DUs 203*b* and 203*c* are connected to BB processing apparatus 212 via FHM 301.

FHM 301 copies a Down Link (DL) signal outputted from BB processing apparatus 212, and transmits the copied signals to DUs 203*b* and 203*c*. FHM 301 also multiplexes Up Link (UL) signals outputted from DUs 203*b* and 203*c*, and transmits the multiplexed signal to BB processing apparatus 212. This enables BB processing apparatus 212 of CU 201 to accommodate the plurality of DUs 203*b* and 203*c* as a single cell (cell C2). Note that FHM 301 extracts signals including UL signals from the signals transmitted from DUs 203*b* and 203*c*, and transmits the signals to BB processing apparatus 212.

When radio network system is built, for example, traffic in each area is simulated during planning. It is assumed, for example, that the traffic in an area of DU 203*a* is heavy, and the traffic in each area of DUs 203*b* and 203*c* is light as a result of the simulation.

In this case, DUs 203*b* and 203*c* with light traffic are held by FHM 301, as illustrated in FIG. 16, and two areas of DUs 203*b* and 203*c* are covered in single cell C2. In other words, the two light-traffic areas of DUs 203*b* and 203*c* are covered by single BB processing apparatus 212, and one heavy-traffic area of DU 203*a* is covered by single BB processing apparatus 211. This enables to level (distribute) the traffic of BB processing apparatuses 211 and 212.

Note that studies have been carried out that a radio network system in the next generation (e.g., 5G) uses, for example, a high frequency band from a few GHz to a few tens of GHz as the radio frequency. Radio waves have increased rectilinearity by the high frequency, and building shadows, for example, make it harder for the radio waves to reach user terminals. Thus, studies have been carried out on performing radio communication by beam forming in the next-generation radio network system while increasing the number of DUs and making the areas smaller.

With regard to such increase of the DUs, utilizing the FHM enables the radio base station to accommodate more DUs in a single BB processing apparatus when the areas are made to be smaller in a place with small required radio capacity. For example, the radio base station can accommodate DUs 203*b* and 203*c* in single BB processing apparatus 212 by using FHM 301, and thus 5G areas can be expanded with a smaller investment.

Figure 17:
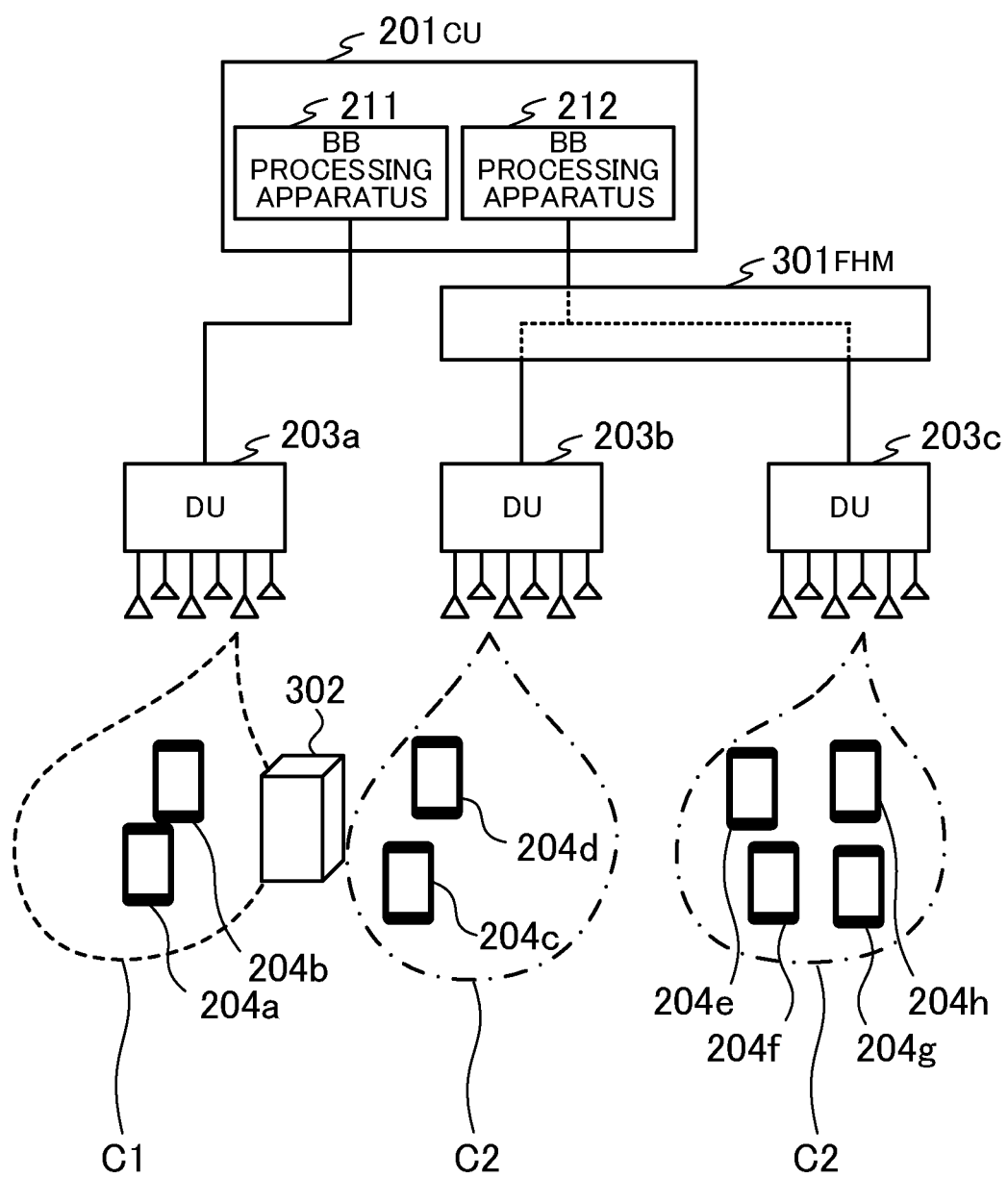
FIG. 17 is the second diagram describing exemplary traffic in the cells.

FIG. 17 is the second diagram describing exemplary traffic in the cells. In FIG. 17, the same components as those in FIG. 16 are denoted by the same reference signs.

The traffic in each cell in the simulation is different at times from the traffic in each cell when the radio network system is actually built. For example, the traffic in each cell in the simulation is different at times from the traffic in each cell when the radio network system is actually built, due to a propagation environment change caused by a building not present in the simulation or an actual number of belonging user terminals.

As illustrated in FIG. 17, the traffic of BB processing apparatus 212 increases, for example, when building 302 that did not exist during the simulation is constructed, or the number of user terminals 204*e* to 204*h* belonging to DU 203*c* is greater than the number expected in the simulation. Note that four user terminals 204*e* to 204*h* belong to DU 203*c* illustrated in FIG. 17, while two user terminals 204*g* and 204*h* belong to DU 203*c* in FIG. 16. Additionally, two user terminals 204*a* and 204*b* belong to DU 203*a* illustrated in FIG. 17, while four user terminals 204*a* to 204*d* belong to DU 203*a* in FIG. 16.

When the traffic in each cell in the simulations is different from the traffic in each cell when the radio network system is actually built, as described above, connection relations among CU 201, FHM 301 and DUs 203*a* to 203*c* are changed. The traffic of BB processing apparatus 211 and the traffic of BB processing device 212 are then leveled.

For example, two DUs 203*a* and 203*b*, the actual traffic of which is light, are connected to BB processing apparatus 211 via FHM 301. That is, two DUs 203*a* and 203*b* are held by FHM 301 and connected to BB processing apparatus 211. In addition, single DU 203*c*, the actual traffic of which is heavy, is directly connected to BB processing apparatus 212. This enables to level the traffic of BB processing apparatus 211 and the traffic of BB processing apparatus 212.

In order to change the connection relations among CU 201, FHM 301, and DUs 203*a* to 203*c*, however, wires need to be inserted and removed, which takes time and labor. Thus, FHM 202 illustrated in FIG. 15 includes a switch for switching the connections between BB processing apparatuses 211 and 212 and DUs 203a to 203c.

Figure 18:
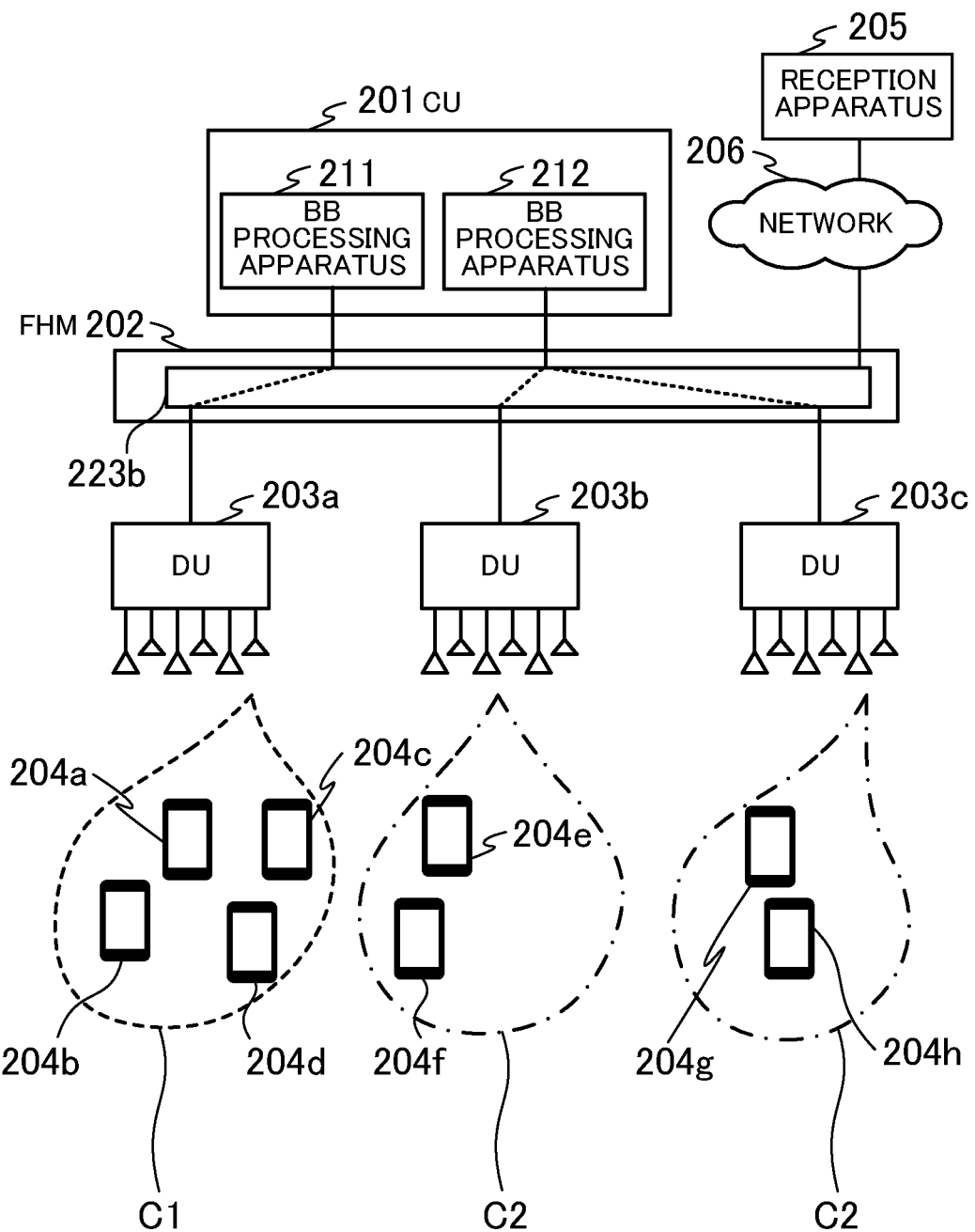
FIG. 18 illustrates an exemplary configuration of the radio base station in which a switch of the FHM is configured based on traffic assumed during planning.

FIG. 18 illustrates an exemplary configuration of the radio base station in which switch 223b of FHM 202 is configured based on traffic assumed during planning. In FIG. 18, the same components as those in FIG. 17 are denoted by the same reference signs. Note that, in FIG. 18, FHM 301 in FIG. 17 is changed to FHM 202 illustrated in FIG. 15. Further, FIG. 18 illustrates reception apparatus 205 and network 206, which are illustrated in FIG. 15.

It is assumed that the traffic in the area of DU 203a is heavy, and the traffic in each area of DUs 203b and 203c is light in the simulation before building the radio network system.

In this case, switch 223b of FHM 202 connects BB processing apparatus 211 and DU 203a, and connects BB processing apparatus 212 and DUs 203b and 203c, as indicated by broken lines in switch 223b, so as to level the traffic of BB processing apparatus 211 and 212. That is, the radio network system is built such that switch 223b of FHM 202 connects DUs 203b and 203c with two areas where the traffic is simulated to be light to BB processing apparatus 212, and connects DU 203a with an area where the traffic is simulated to be heavy to BB processing apparatus 211.

However, traffic in a simulation is different from the actual traffic in some cases, as described above. For example, the area of DU 203a may have light traffic and the area of DU 203c may have heavy traffic in the actual radio network system.

Thus, switch 223b of FHM 202 switches the connection between BB processing apparatuses 211 and 212 and DUs 203a to 203c based on connection indication information from reception apparatus 205, and changes the cells formed by DUs 203a to 203c. Switch 223b then levels the traffic of BB processing apparatuses 211 and 212.

Figure 19:
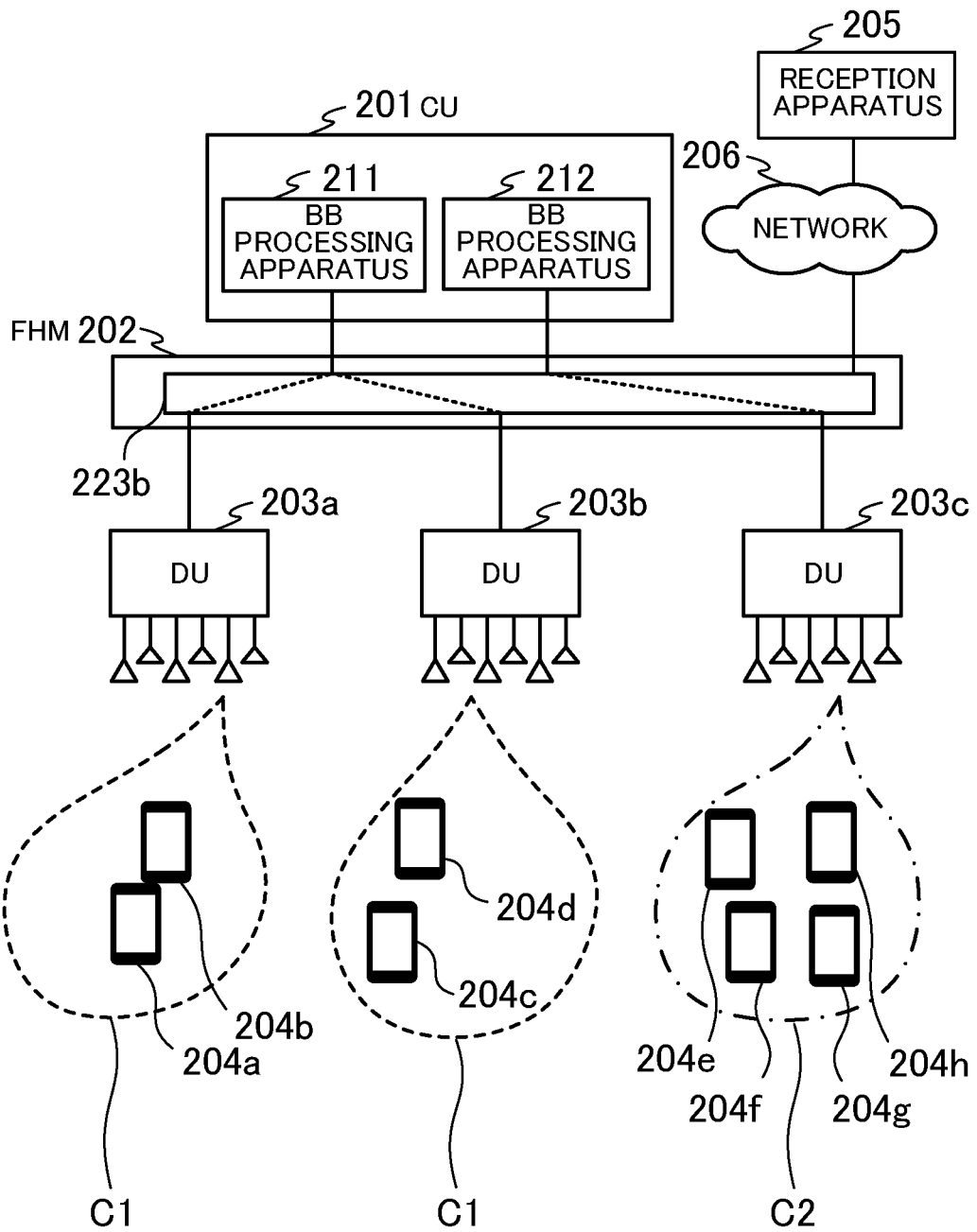
FIG. 19 illustrates an exemplary configuration of the radio base station in which connections in the switch of the FHM are changed.

FIG. 19 illustrates an exemplary configuration of the radio base station in which connections in switch 223b of FHM 202 are changed. In FIG. 19, the same components as those in FIG. 18 are denoted by the same reference signs.

It is assumed that the area of DU 203a has light traffic and the area of DU 203c has heavy traffic in the actual radio network system, as described above. In this case, an operator transmits connection indication information to FHM 202 using reception apparatus 205 so that BB processing apparatus 211 and DUs 203a and 203b are connected. The operator also transmits connection indication information to FHM 202 so that BB processing apparatus 212 and DU 203c are connected.

This allows two DUs 203a and 203b with light traffic to connect to BB processing apparatus 211 as indicated by broken lines in switch 223b in FIG. 19. Single DU 203c with heavy traffic is connected to BB processing apparatus 212. The traffic of BB processing apparatuses 211 and 212 is leveled in this manner.

Figure 20:
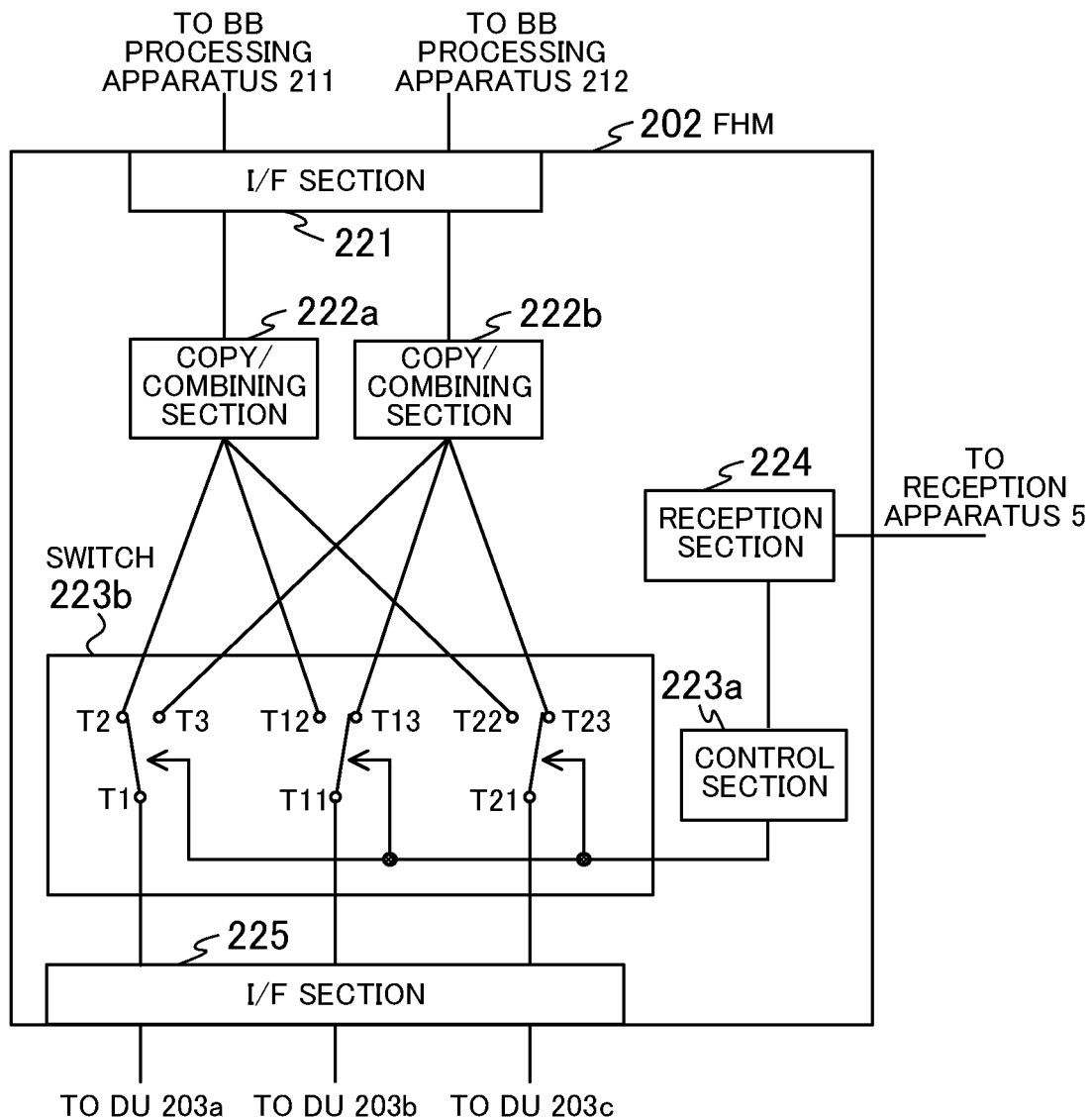
FIG. 20 illustrates an exemplary block configuration of the FHM.

FIG. 20 illustrates an exemplary block configuration of FHM 202. As illustrated in FIG. 20, FHM 202 includes I/F sections 221 and 225, copy/combining sections 222a and 222b, control section 223a, switch 223b, and reception section 224.

I/F section 221 is, for example, a connector such as an optical connector. I/F section 221 is connected to BB processing apparatuses 211 and 212 of CU 201, for example, via optical fibers.

A signal (DL signal) outputted from BB processing apparatus 211 is inputted to copy/combining section 222a via I/F section 221. Copy/combining section 222a copies the signal outputted from BB processing apparatus 211, and outputs the copied signals to terminals T2, T12, and T22 of switch 223b.

Signals (UL signals) outputted from DUs 203a to 203c are inputted to copy/combining section 222a via switch 223b. Copy/combining section 222a combines (multiplexes) the signals outputted from terminal T2, T12, and T22 of switch 223b and outputs the combined signal to I/F section 221.

A signal (DL signal) outputted from BB processing apparatus 212 is inputted to copy/combining section 222b via I/F section 221. Copy/combining section 222b copies the signal outputted from BB processing apparatus 212, and outputs the copied signals to terminals T3, T13, and T23 of switch 223b.

Signals (UL signals) outputted from DUs 203a to 203c are inputted to copy/combining section 222b via switch 223b. Copy/combining section 222b combines (multiplexes) the signals outputted from terminal T3, T13, and T23 of switch 223b and outputs the combined signal to I/F section 221.

Control section 223a determines a connection destination of each of DUs 203a to 203c to either one of BB processing apparatuses 211 or 212. For example, control section 223a determines the connection destination of each of DUs 203a to 203c to either one of BB processing apparatuses 211 and 212, based on connection destination indication information received by reception section 224, which will be described later.

Switch 223b includes terminals T1 to T3, T11 to T13, and T21 to T23. Terminal T1 is connected to DU 203a via I/F section 225. Terminal T11 is connected to DU 203b via I/F section 225. Terminal T21 is connected to DU 203c via I/F section 225.

Terminal T2 is connected to copy/combining section 222a. Terminal T3 is connected to copy/combining section 222b. Terminal T12 is connected to copy/combining section 222a. Terminal T13 is connected to copy/combining section 222b. Terminal T22 is connected to copy/combining section 222a. Terminal T23 is connected to copy/combining section 222b.

Terminal T1 is connected to either one of terminals T2 or T3 according to the control of control section 223a. Additionally, terminal T11 is connected to either one of terminals T12 or T13 according to the control of control section 223a. Further, terminal T21 is connected to either one of terminals T22 or T23 according to the control of control section 223a. That is, switch 223b connects each of DUs 203a to 203c to either one of BB processing apparatuses 211 or 212 in a switchable manner according to the control of control section 223a.

Reception section 224 is connected to reception apparatus 205 via network 206. Reception section 224 receives the connection destination indication information transmitted from reception apparatus 205, and outputs the information to control section 223a.

The connection destination indication information is information indicating which of BB processing apparatuses 211 or 212 DUs 203a to 203c are each connected to. For example, it is assumed that the connection destination indication information is information indicating that DU 203a is connected to BB processing apparatus 211, DU 203b is connected to BB processing apparatus 212, and DU 203c is connected to BB processing apparatus 212. In this case, switch 223b connects terminals T1 to T3 to terminals T11 to T13 and T21 to T23 as illustrated in FIG. 20.

I/F section 225 is, for example, a connector such as an optical connector. I/F section 225 is connected to DUs 203a to 203c via, for example, optical fibers.

Although not illustrated in FIG. 20, FHM 202 includes, for example, a conversion section that converts an optical signal into an electric signal, and a conversion section that converts an electric signal into an optical signal. FHM 202 also includes a delay offset section that adjusts a signal transmission time between FHM 202 and each of DUs 203a to 203c, for example.

An exemplary operation of FHM 202 will be described. In the simulation at the time of planning the radio network system, it is assumed that the area of DU 203a has heavy traffic and the areas of DUs 203b and 203c have light traffic. In this case, the radio network system is built such that terminal T1 of switch 223b is connected to terminal T2, terminal T11 is connected to terminal T13, and terminal T21 is connected to terminal T23. Note that the connections in switch 223b for building the radio network system may be controlled by reception apparatus 205.

The above-described connections in switch 223b allows BB processing apparatus 211 to connect to DU 203a, and BB processing apparatus 212 to connect to DUs 203b and 203c. Thus, BB processing apparatus 211 accommodates single DU 203a simulated to have heavy traffic, and BB processing apparatus 212 accommodates two DUs 203b and 203c simulated to have light traffic.

When the radio network system is actually operated, the traffic in the respective areas of DUs 203a and 203b is light and the traffic in the area of DU 203c is heavy, for example, unlike the simulation result.

In this case, the operator operates reception apparatus 205, and inputs connection destination indication information so that DU 203b is connected to BB processing apparatus 211. The connection destination indication information inputted to reception apparatus 205 is transmitted to control section 223a of FHM 202.

Control section 223a controls the connection destinations of terminals T1, T11, and T21 based on the connection destination indication information transmitted from reception apparatus 205. In the above example, control section 223a connects terminal T11 to terminal T12.

The above-described connections in switch 223b allows BB processing apparatus 211 to connect to DUs 203a and 203b, and BB processing apparatus 212 to connect to DU 203c. Thus, BB processing apparatus 211 accommodates two DUs 203a and 203b with light traffic, and BB processing apparatus 212 accommodates single DU 203c with heavy traffic. This enables to level the traffic of BB processing apparatuses 211 and 212.

As described above, I/F section 221 of FHM 202 is connected to the plurality of BB processing apparatuses 211 and 212 that respectively perform base band processing of different cells C1 and C2. I/F section 225 is connected to the plurality of DUs 203a to 203c that perform radio communication with user terminals 204a to 204h. Control section 223a determines a connection destination of each of DUs 203a to 203c connected to I/F section 225 to either one of BB processing apparatuses 211 or 212 connected to I/F section 221. Switch 223b connects DUs 203a to 203c to BB processing apparatuses 211 or 212 based on the determination of control section 223a. This enables the radio base station to easily change cells C1 and C2 formed by the plurality of radio apparatuses without inserting and removing wires.

In addition, FHM 202 includes reception section 224 that receives, via network 206, connection destination indication information from reception apparatus 205 receiving connection destination indication for DUs 203a to 203c. Control section 223a determines the connection destinations so that each of DUs 203a to 203c connects to either one of BB processing apparatuses 211 or 212, based on the connection destination indication information received by reception section 224. This allows an operator to easily change the cells formed by DUs 203a to 203c by remote control.

Since cells C1 and C2 formed by the plurality of radio apparatuses can be easily changed, the traffic of BB processing apparatuses 211 and 212 can be easily leveled.

Although single CU 201 includes two BB processing apparatuses 211 and 212 in the above description, two CUs may each include a single BB processing apparatus. For example, one of the CUs may include BB processing apparatus 211 and the other one of the CUs may include BB processing apparatus 212. The number of the BB processing apparatuses is also not limited to the above-described example (two BB processing apparatuses). There may be three or more BB processing apparatuses. In addition, only three DUs 203a to 203c are illustrated, but four or more may be present.

Further, reception apparatus 205 receives connection destination indication information in the above description, but FHM 202 may include a reception device that receives the connection destination indication information. For example, FHM 202 may include a key input device that receives the connection destination indication information.

Functions of copy/combining sections 222a and 222b are also not limited to the functions described above. Copy/combining sections 222a and 222b only need to copy a DL signal and combine UL signals with respect to DUs 203a to 203c connected to BB processing apparatuses 211 and 212. For example, when DUs 203a and 203b are connected to BB processing apparatus 211, copy/combining section 222a only needs to output the copied DL signals to terminals T2 and T12. Copy/combining section 222a also only needs to combine the UL signals from terminals T2 and T12.

Furthermore, reception apparatus 205 communicates with FHM 202 via network 206 in the above description, but may communicate with FHM 202 via CU 201. For example, reception apparatus 205 may transmit the connection destination indication information to FHM 202 via CU 201.

Embodiment 4

In Embodiment 3, control section 223a switches the connections between BB processing apparatuses 211 and 212 and DUs 203a to 203c based on the connection destination indication information received by reception apparatus 205. In Embodiment 4, a control section switches the connections between the BB processing apparatuses and the DUs based on traffic of each DU. Hereinafter, a description will be given of portions different from Embodiment 3.

Figure 21:
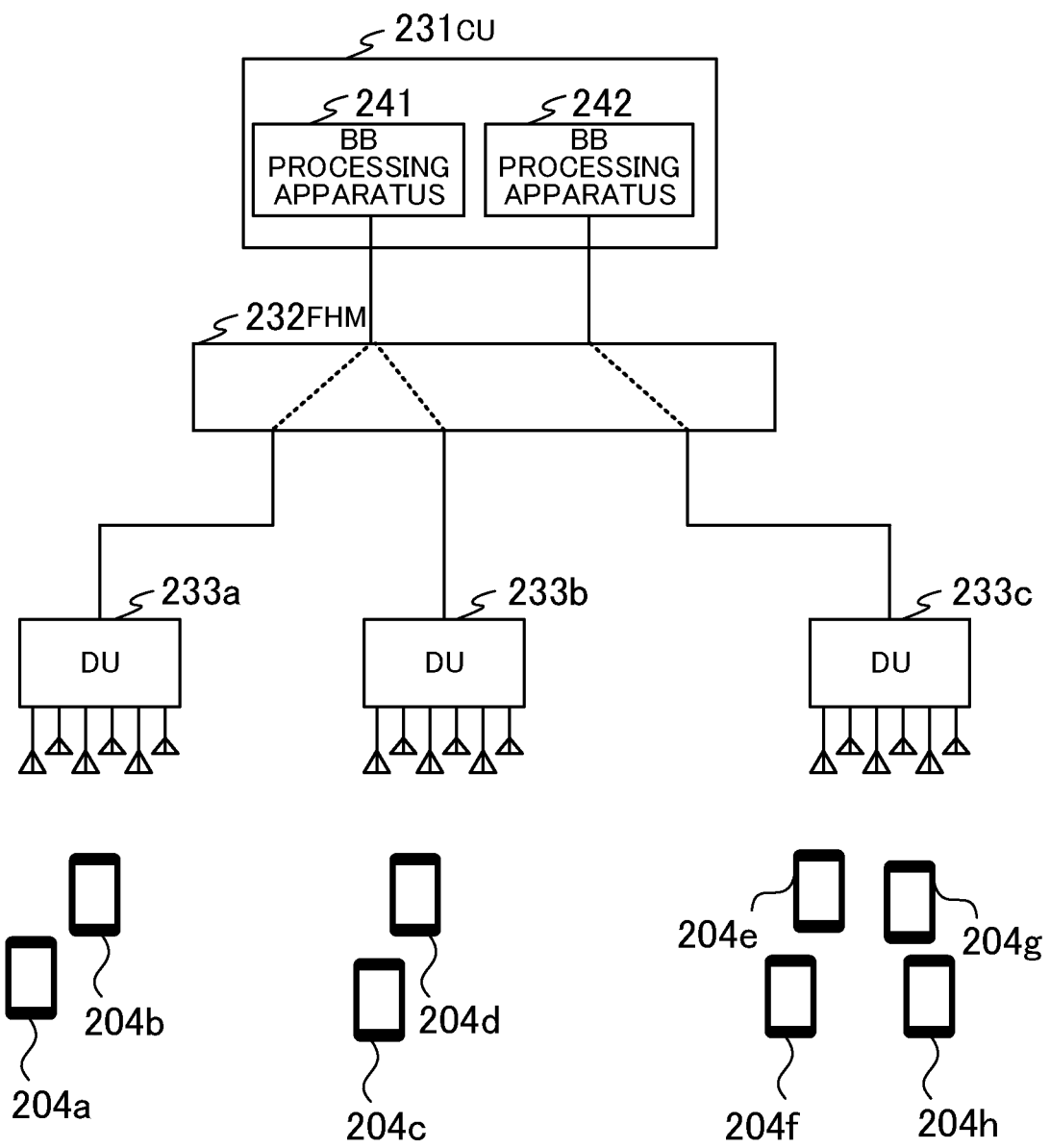
FIG. 21 illustrates an exemplary configuration of a radio base station according to Embodiment 4.

FIG. 21 illustrates an exemplary configuration of a radio base station according to Embodiment 4. As illustrated in FIG. 21, the radio base station includes CU 231, FHM 232, and DUs 233a to 233c. FIG. 21 also illustrates user terminals 204a to 204g.

CU 231 includes BB processing apparatuses 241 and 242 that respectively perform baseband processing of cells different from each other. BB processing apparatuses 241 and 242 measure the traffic of each DU connected via FHM 232.

For example, it is assumed that BB processing apparatus 241 is connected to DUs 233a and 233b as indicated by broken lines in FHM 232, and BB processing apparatus 242 is connected to DU 233c as indicated by a broken line in FHM 232. In this case, BB processing apparatus 241 measures the traffic of each of DUs 233a and 233b. BB processing apparatus 242 measures the traffic of DU 233c.

BB processing apparatuses 241 and 242 transmit the traffic of each of DUs 233a to 233c to FHM 232. FHM 232 switches the connections between BB processing apparatuses 241 and 242 and DUs 233a to 233c based on the traffic of each of DUs 233a to 233c transmitted from BB processing apparatuses 241 and 242.

For example, it is assumed that DU 233a has heavier traffic. In this case, BB processing apparatus 241 connected to two DUs 233a and 233b receives a heavier load. FHM 232 then switches the connection such that DU 233b connects to BB processing apparatus 242. Cells formed by DUs 233a and 233c are changed accordingly, and the traffic of BB processing apparatus 241 and 242 is leveled.

Figure 22:
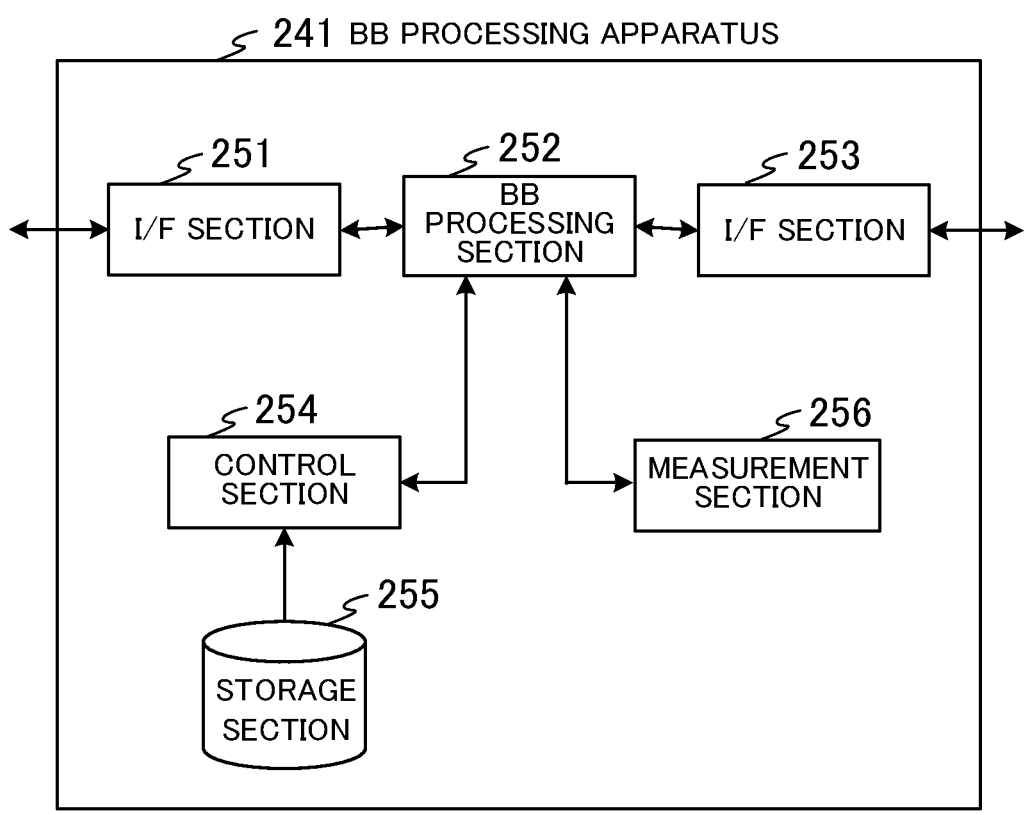
FIG. 22 illustrates an exemplary block configuration of a BB processing apparatus of a CU.

FIG. 22 illustrates an exemplary block configuration of BB processing apparatus 241 of CU 231. As illustrated in FIG. 22, BB processing apparatus 241 includes I/F sections 251 and 253, BB processing section 252, control section 254, storage section 255, and measurement section 256.

I/F section 251 communicates with a host apparatus (not illustrated in FIG. 21) connected to a core network. For example, I/F section 251 receives data from the host apparatus and outputs the data to BB processing section 252. I/F section 251 also transmits the data outputted from BB processing section 252 to the host apparatus.

BB processing section 252 performs BB processing on the signal (DL signal) outputted from I/F section 251. For example, BB processing section 252 performs encoding, modulation, precoding, scheduling, mapping, and the like, on the signal outputted from I/F section 251. BB processing section 252 outputs the DL signal obtained by the BB processing to I/F section 253.

BB processing section 252 also performs BB processing on the signal (UL signal) outputted from I/F section 253. For example, BB processing section 252 performs demapping, channel estimation, demodulation, decoding, and the like, on the signal outputted from I/F section 253. BB processing section 252 outputs the UL signal obtained by the BB processing to I/F section 251.

In addition, BB processing section 252 transmits beam information, which will be described below, outputted from control section 254 to FHM 232 via I/F section 253. For example, BB processing section 252 includes the beam information outputted from control section 254 in the DL signal to transmit the information to FHM 232. Alternatively, BB processing section 252 includes the beam information outputted from control section 254 in a signal to maintain or monitor the DUs, for example, to transmit the information to FHM 232. Note that beam information transmitted to FHM 232 is transmitted to the DUs connected to BB processing apparatus 241.

Further, BB processing section 252 transmits the traffic outputted from measurement section 256, which will be described below, to FHM 232 via I/F section 253. For example, BB processing section 252 includes the traffic outputted from measurement section 256 in the DL signal to transmit the traffic to FHM 232. Alternatively, BB processing section 252 includes the beam information outputted from measurement section 256 in a signal to maintain or monitor the DUs, for example, to transmit the information to FHM 232.

I/F section 253 performs electric-to-optical conversion on the signal outputted from BB processing section 252, and outputs the converted signal to an optical fiber (transmits the signal to FHM 232). I/F section 253 also performs optical-to-electric conversion on an optical signal received from the optical fiber (from FHM 232), and outputs the converted signal to BB processing section 252.

Control section 254 outputs the beam information stored in storage section 255 to BB processing section 252.

Storage section 255 stores the beam information for identifying directions of beams formed by DUs 233a to 233c. The beam information is stored, for example, in advance in storage section 255. The beam information is updated when, for example, a new DU is connected to FHM 232 or a DU is replaced. The beam information may be transmitted from the host apparatus, for example, and stored in storage section 255.

Figure 23:
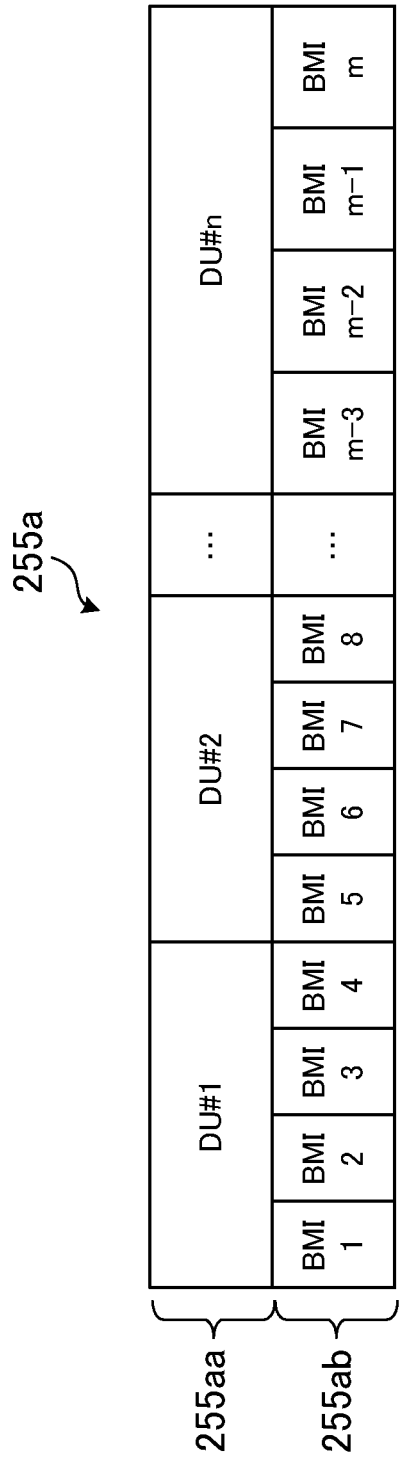
FIG. 23 illustrates an exemplary data configuration of beam information stored in a storage section.

FIG. 23 illustrates an exemplary data configuration of beam information 255a stored in storage section 255. As illustrated in FIG. 23, beam information 255a includes DU identification information 255aa and beam identification information 255ab.

DU identification information 255aa is unique identification information for identifying DUs 233a to 233c connected to FHM 232. For example, "DU #1" illustrated in FIG. 23 is an identifier assigned to DU 233a illustrated in FIG. 21, and "DU #2" is an identifier assigned to DU 233b. In addition, "DU #n" illustrated in FIG. 23 is, for example, an identifier assigned to DU 233c. Note that only three DUs are illustrated in the example of FIG. 21. Storage section 255 thus stores three pieces of DU identification information "DU #1", "DU #2", and "DU #n" in this case.

Beam identification information 255ab is identification information for identifying directions of beams respectively formed by DUs 233a to 233c, and is assigned to each beam so as to vary among the beams formed by DUs 3a to 3c. In other words, beam identification information 255ab is unique information over the plurality of DUs 233a to 233c (DU identification information 255aa). At least one piece of beam identification information 255ab is associated with each piece of DU identification information 255aa, and beam identification information 255ab is stored in storage section 255.

For example, "BMI1 to BMI4" of beam identification information 255ab illustrated in FIG. 23 are associated with "DU #1" of DU identification information 255aa, and "BMI5 to BMI8" of beam identification information 255ab are associated with "DU #2" of DU identification information 255aa. Additionally, "BMIm-3 to BMIm" of beam identification information 255ab illustrated in FIG. 23 are associated with "DU #n" of DU identification information 255aa, for example. Thus, "BMI1, BMI2, BMIm-1, BMIm" of beam identification information 255ab are unique information over "DU #1 to DU #n" of DU identification information 255aa.

Note that, in FIG. 23, four pieces of beam identification information 255ab are associated with each piece of DU identification information 255aa, but the present disclosure is not limited thereto. For example, the number of pieces of beam identification information 255ab associated with DU identification information 255aa may depend on the number of directions of the beams that DUs 233a to 233c can form.

Returning to the explanation of FIG. 22, measurement section 256 measures traffic of DL signals subjected to the BB processing in BB processing section 252, for each DU. For example, when DUs 233a and 233b are connected to BB processing apparatus 241, as indicated by broken lines in FHM 232 in FIG. 21, measurement section 256 measures traffic of DU 233a and traffic of DU 233b. Measurement section 256 is described in detail below.

Note that BB processing apparatus 242 has similar blocks to those illustrated in FIG. 22. A measurement section of BB processing apparatus 242 measures the traffic of each DU connected to BB processing apparatus 242. For example, when DU 233c is connected to BB processing apparatus 242, as indicated by a broken line in FHM 232 in FIG. 21, the measurement section of BB processing apparatus 242 measures traffic of DU 233c.

In addition, a storage section of BB processing apparatus 242 stores beam information similar to that in storage section 255 of BB processing apparatus 241 (beam information 255a in FIG. 23). That is, the storage section of BB processing apparatus 242 stores, in association with each other, DU identification information of DUs 233a to 233c connected to FHM 232 and unique beam identification information for identifying the directions of the beams formed by DUs 233a to 233c.

Figure 24:
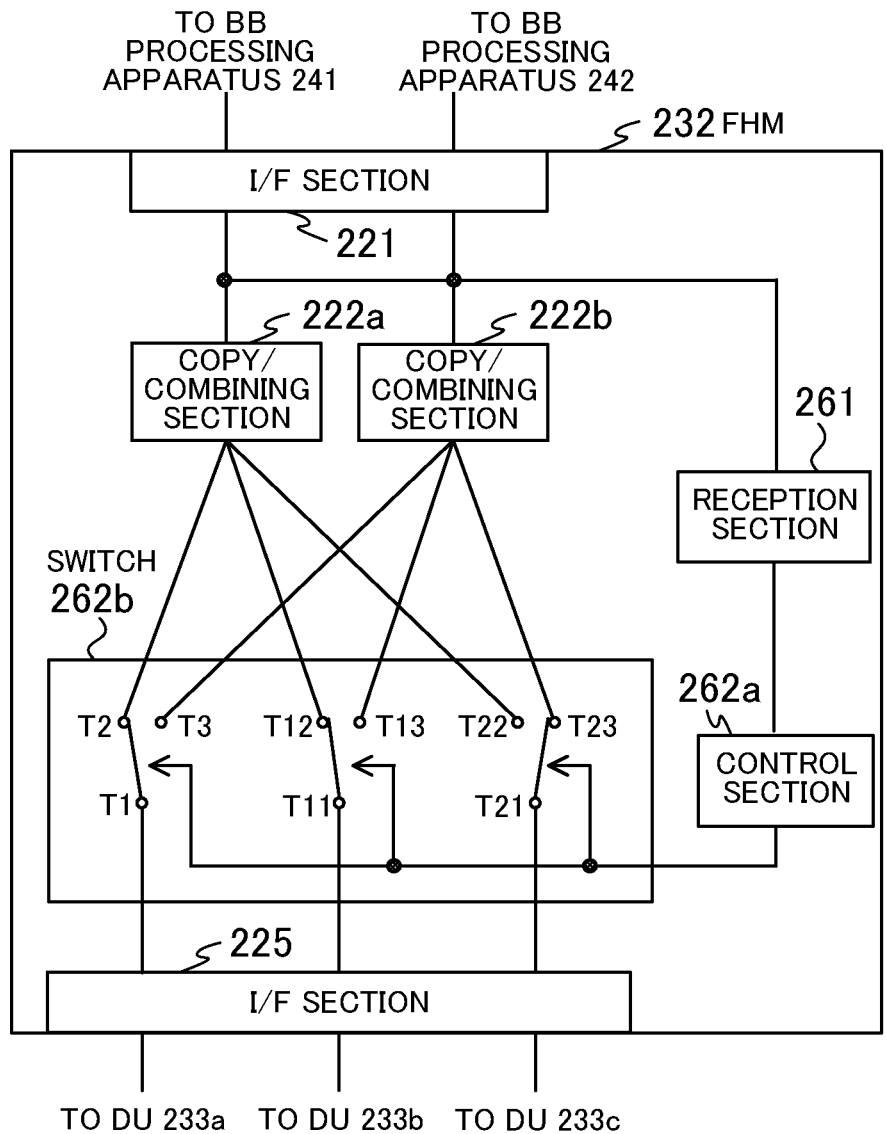
FIG. 24 illustrates an exemplary block configuration of an FHM.

FIG. 24 illustrates an exemplary block configuration of FHM 232. In FIG. 24, the same components as those in FIG. 20 are denoted by the same reference signs. In contrast to FIG. 20, reception section 261, control section 262a, and switch 262b are included in FIG. 24.

Reception section 261 receives the traffic of each of DUs 233a to 233c transmitted from BB processing apparatuses 241 and 242. Reception section 261 outputs the received traffic of each of DUs 233a to 233c to control section 262a.

Control section 262a determines a connection destination of each of DUs 233a to 233c to either one of BB processing apparatuses 241 or 242 based on the traffic of each of DUs 233a to 233c.

Measurement section 256 of BB processing apparatus 241 in FIG. 22 will be described in detail. First, data communication by beam forming using the BMIs will be described with reference to FIGS. 25 to 28, and then, measurement of the traffic of each DU by measurement section 256 will be described with reference to FIG. 29.

Figure 25:
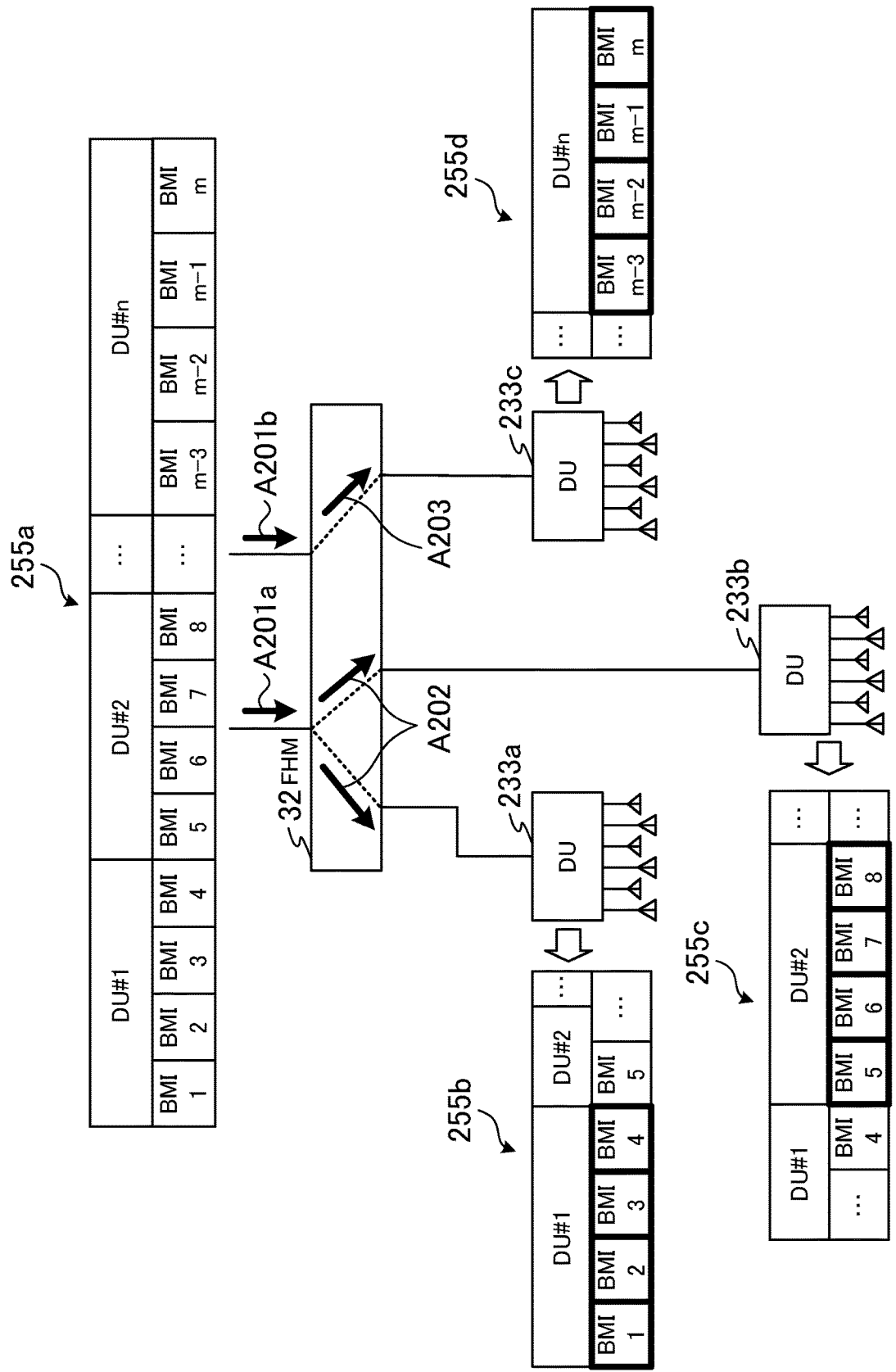
FIG. 25 is a diagram describing acquisition of beam identification information in the FHM and DUs.

FIG. 25 is a diagram describing acquisition of beam identification information 255ab in FHM 232 and DUs 233a to 233c. FIG. 25 illustrates FHM 232 and DUs 233a to 233c illustrated in FIG. 21. FIG. 25 also illustrates beam information 255a illustrated in FIG. 23, which is included in BB processing apparatuses 241 and 242.

Beam information 255a is transmitted from BB processing apparatus 241 to FHM 232, as indicated by arrow A201a in FIG. 25. Beam information 255a transmitted to FHM 232 is copied in FHM 232 and transmitted to DUs 233a and 233b, as indicated by arrow A202 in FIG. 25.

In addition, beam information 255a is transmitted from BB processing apparatus 242 to FHM 232, as indicated by arrow A201b in FIG. 25. Beam information 255a transmitted to FHM 232 is transmitted to DU 233c via FHM 232, as indicated by arrow A203 in FIG. 25.

DUs 233a to 233c have stored the DU identification information respectively assigned to the own units in their own storage sections. For example, DU 233a has stored DU identification information "DU #1" of the own unit in the storage section. DU 233b has stored DU identification information "DU #2" of the own unit in the storage section. DU 233c has stored DU identification information "DU #n" of the own unit in the storage section.

DUs 233a to 233c refer to beam information 255a received from FHM 232, and acquire the respective beam identification information corresponding to the DU identification information of the own units based on the DU identification information of their own.

For example, beam information 255b illustrated in FIG. 25 represents a part of beam information 255a received by DU 233a from FHM 232. Since the DU identification information of DU 233a is "DU #1", DU 233a acquires beam identification information "BMI1, BMI2, BMI3, and BMI4" illustrated in thick frames of beam information 255b.

Further, beam information 255c illustrated in FIG. 25 represents a part of beam information 255a received by DU 233b from FHM 232, for example. Since the DU identification information of DU 233b is "DU #2", DU 233b acquires beam identification information "BMI5, BMI6, BMI7, and BMI8" illustrated in thick frames of beam information 255c.

Furthermore, beam information 255d illustrated in FIG. 25 represents a part of beam information 255a received by DU 233c from FHM 202, for example. Since the DU identification information of DU 233c is "DU #n", DU 233c acquires beam identification information "BMIm-3, BMIm-2, BMIm-1, and BMIm" illustrated in thick frames of beam information 255d. As described above, DUs 233a to 233c acquire the unique beam identification information assigned to the own units. Note that DUs 233a to 233c store beam information 255a transmitted from BB processing apparatuses 241 and 242 in the respective storage sections.

DUs 233a to 233c sweep the beams in various directions to search for optimal beams directed to user terminals 204a to 204h. At this time, DUs 233a to 233c include the beam identification information respectively assigned to the own units, which is acquired from beam information 255a, in the sweeping beams.

Figure 26:
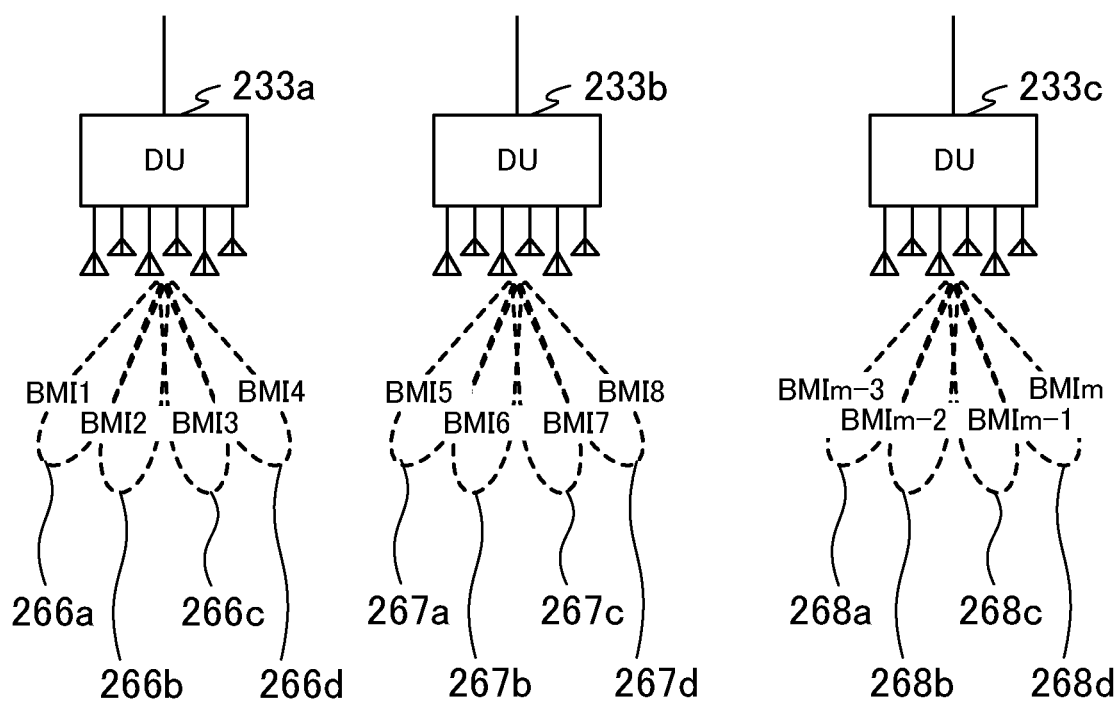
FIG. 26 illustrates beam sweeping.

FIG. 26 illustrates the beam sweeping. In FIG. 26, the same components as those in FIG. 21 are denoted by the same reference signs.

DUs 233a to 233c form the beams in various directions as illustrated in FIG. 26, when searching for the optimal beams directed to user terminals 204a to 204h. For example, beams 266a to 266d illustrated in FIG. 26 represent the beams formed by DU 233a. Beams 267a to 267d represent the beams formed by DU 233b. Beams 268a to 268d represent the beams formed by DU 233c.

When sweeping the beams, DU 233a to 233c include the beam identification information respectively assigned to the own units in the beams.

For example, DU 233a is assigned beam identification information "BMI1, BMI2, BMI3, and BMI4" (see beam information 255b in FIG. 25). Thus, DU 233a respectively includes "BMI1, BMI2, BMI3, and BMI4" in sweeping beams 266a to 266d. For example, DU 233a respectively multiplies "BMI1, BMI2, BMI3, and BMI4" by BF weights respectively forming beams 266a to 266d.

Further, DU 233b is assigned beam identification information "BMI5, BMI6, BMI7, and BMI8", for example (see beam information 255c of FIG. 25). Thus, DU 233b respectively includes "BMI5, BMI6, BMI7, and BMI8" in sweeping beams 267a to 267d. For example, DU 233b respectively multiplies "BMI5, BMI6, BMI7, and BMI8" by BF weights respectively forming beams 267a to 267d.

Further, DU 233c is assigned beam identification information "BMIm-3, BMIm-2, BMIm-1, and BMIm", for example (see beam information 255d in FIG. 25). Thus, DU 233c respectively includes "BMIm-3, BMIm-2, BMIm-1, and BMIm" in sweeping beams 268a to 268d. For example, DU 233c respectively multiplies "BMIm-3, BMIm-2, BMIm-1, and BMIm" by BF weights respectively forming beams 268a to 268d. As described above, DUs 233a to 233c sweep the beams including the beam identification information.

User terminals 204a to 204h receive the swept beams outputted from DUs 233a to 233c. User terminals 204a to 204h feed back, to BB processing apparatuses 241 and 242, the beam identification information (BMIs) of the beams with the best communication quality among the received beams.

Figure 27:
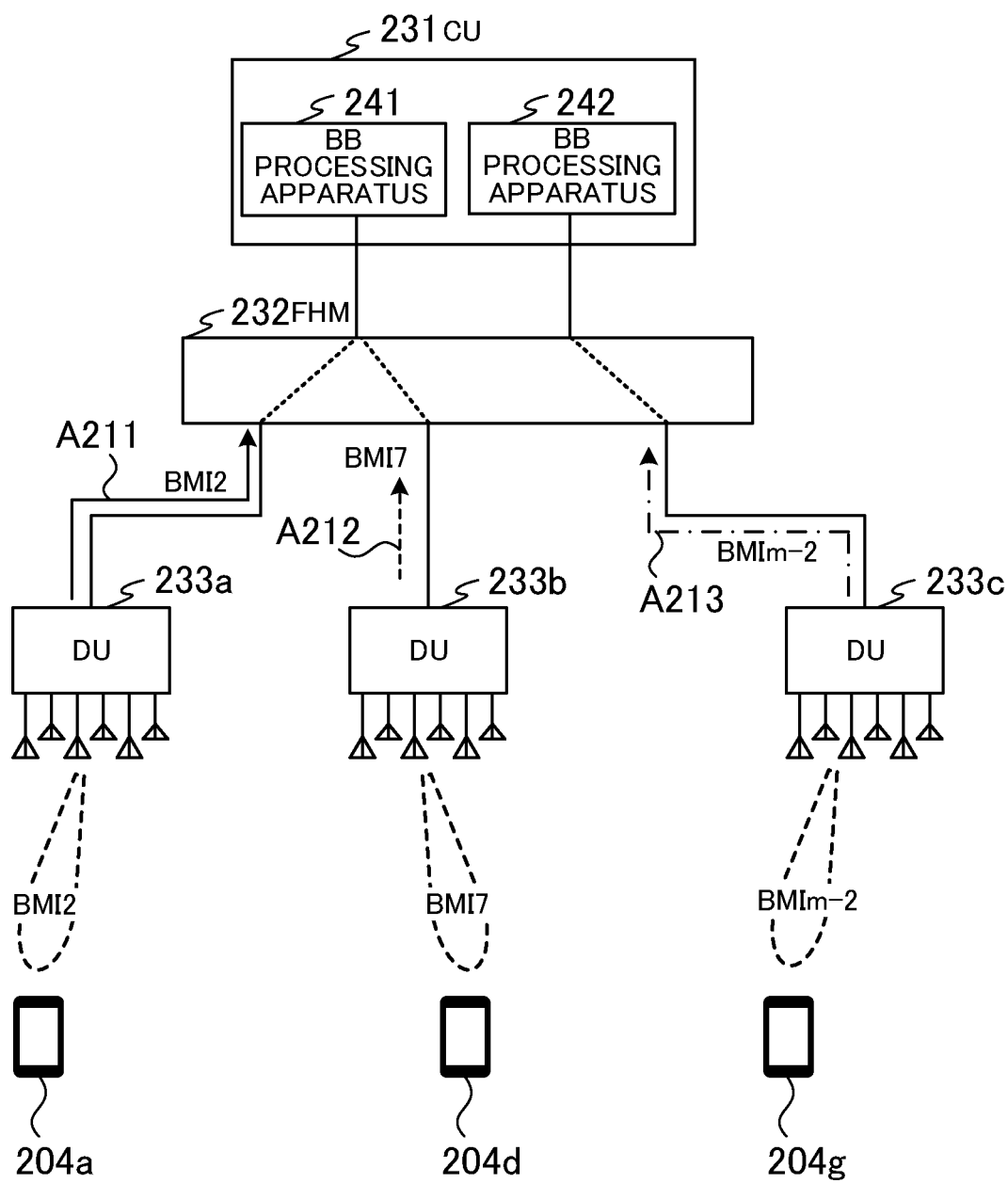
FIG. 27 illustrates feedback of the beam identification information.

FIG. 27 illustrates the feedback of the beam identification information. In FIG. 27, the same components as those in FIG. 21 are denoted by the same reference signs. Note that FIG. 27 illustrates only a part of user terminals 204a, 204d, and 204g to simplify the description.

User terminal 204a receives the swept beams outputted from DU 233a. It is assumed that the beam including beam identification information "BMI2" has the best reception level among the beams received by user terminal 204a. In this case, user terminal 204a feeds back beam identification information "BMI2" to BB processing apparatus 241 via DU 233a and FHM 232, as indicated by arrow A211 in FIG. 27.

Likewise, user terminal 204d receives the swept beams outputted from DU 233b. It is assumed that the beam including beam identification information "BMI7" has the best reception level among the beams received by user terminal 204d. In this case, user terminal 204d feeds back beam identification information "BMI7" to BB processing apparatus 241 via DU 233b and FHM 232, as indicated by arrow A212 in FIG. 27.

Similarly, user terminal 204g receives the swept beams outputted from DU 233c. It is assumed that the beam including beam identification information "BMIm-2" has the best reception level among the beams received by user terminal 204g. In this case, user terminal 204g feeds back beam identification information "BMIm-2" to BB processing apparatus 242 via DU 233c and FHM 232, as indicated by arrow A213 in FIG. 27. User terminals 204a, 204d, and 204g feed back the beam identification information to BB processing apparatuses 241 and 242 in this manner.

When transmitting data to user terminals 204a to 204h subordinate to DUs 233a to 233c, BB processing apparatuses 241 and 242 include the beam identification information fed back from user terminals 204a to 204h in the transmission data. Since the beam identification information is uniquely assigned over DUs 233a to 233c as illustrated in FIG. 23, DUs 233a to 233c subordinate to FHM 232 can individually perform beam forming to transmit the data to user terminals 204a to 204h.

Figure 28:
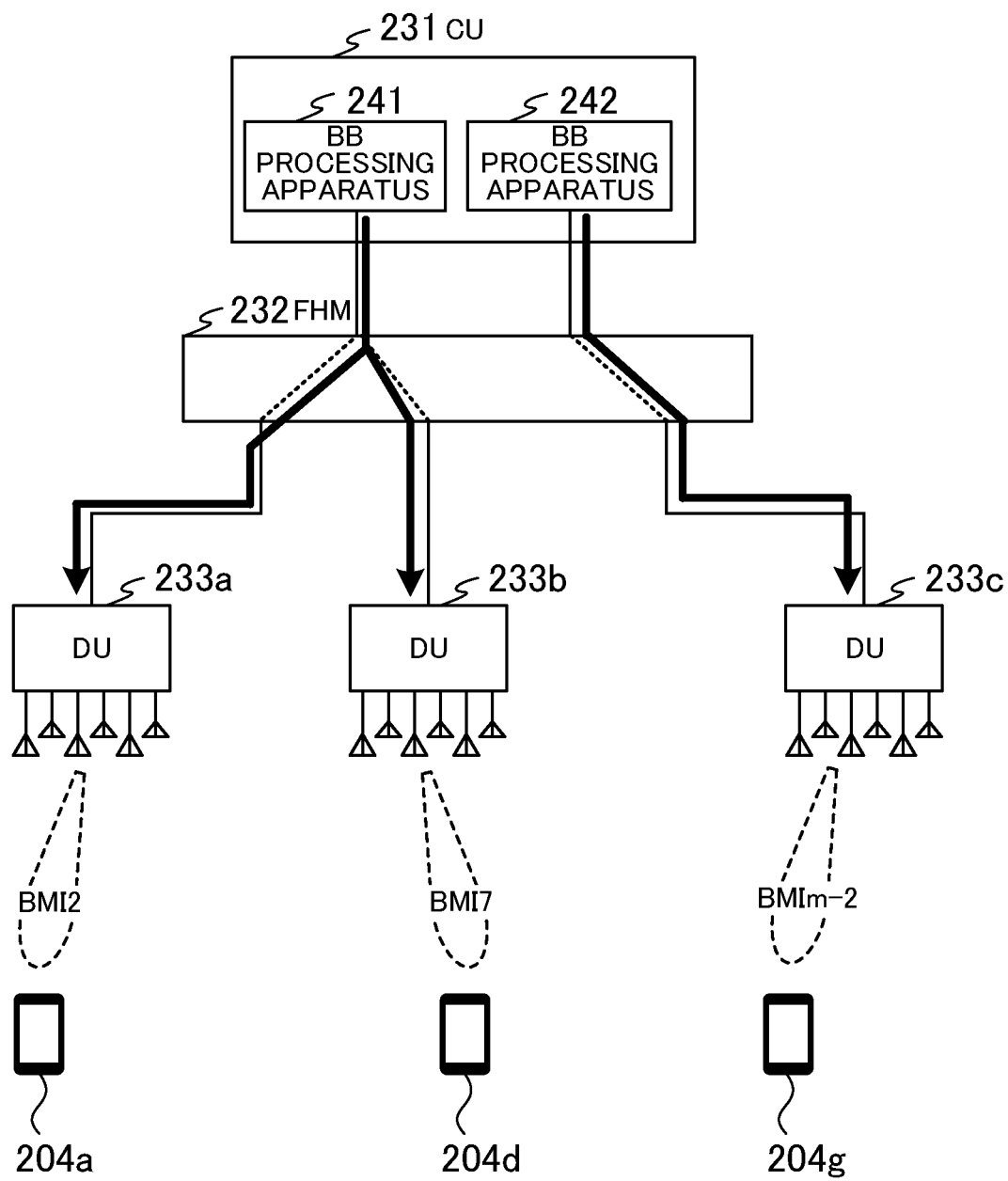
FIG. 28 illustrates exemplary data transmission to user terminals.

FIG. 28 illustrates exemplary data transmission to the user terminals. In FIG. 28, the same components as those in FIG. 27 are denoted by the same reference signs.

When transmitting data (DL signals) to user terminals 204a and 204d, BB processing apparatus 241 includes the beam identification information fed back from user terminals 204a and 204d in respective headers of the data, and transmits the data to FHM 232.

For example, it is assumed that the beam identification information fed back from user terminal 204a to BB processing apparatus 241 is "BMI2", and the beam identification information fed back from user terminal 204d to BB processing apparatus 241 is "BMI7". In this case, BB processing apparatus 241 includes the beam identification information "BMI2" in the header of the transmission data to user terminal 204a, and transmits the data to FHM 232. In addition, BB processing apparatus 241 includes the beam identification information "BMI7" in the header of the transmission data to user terminal 204d, and transmits the data to FHM 232.

The data transmitted to FHM 232 is copied by FHM 232, and transmitted to DUs 233a and 233b. Since DUs 233a and 233b have received (stored) beam information 255a transmitted from BB processing apparatus 241, when the header of the received data includes beam identification information 255ab assigned to the own unit, DUs 233a and 233b can respectively form the beams corresponding to beam identification information 255ab and transmit the data to user terminals 204a and 204d.

For example, DU 233a can form the beam in a direction corresponding to "BMI2" from data identification information "BMI2" included in the header of the data, and transmit the data to user terminal 204a. In addition, DU 233b can form the beam in a direction corresponding to "BMI7" from data identification information "BMI7" included in the header of the data, and transmit the data to user terminal 204b.

Likewise, DU 233c can also form the beam in a direction corresponding to "BMIm-2" from data identification information "BMIm-2" included in the header of the data, and transmit the data to user terminal 204b. This way, DUs 233a to 233c can individually control the beam direction by unique beam identification information 255ab associated with DU identification information 255aa.

As described above, BB processing apparatuses 241 and 242 each include storage section 255 that stores beam information 255a, and can determine which of DUs 233a to 233c user terminals 204a to 204h each belong to. BB processing apparatuses 241 and 242 also include DL data buffers for each of user terminals 204a to 204h, and can acquire traffic of each of user terminals 204a to 204h. This enables BB processing apparatuses 241 and 242 to measure the traffic of each of DUs 233a to 233c.

Figure 29:
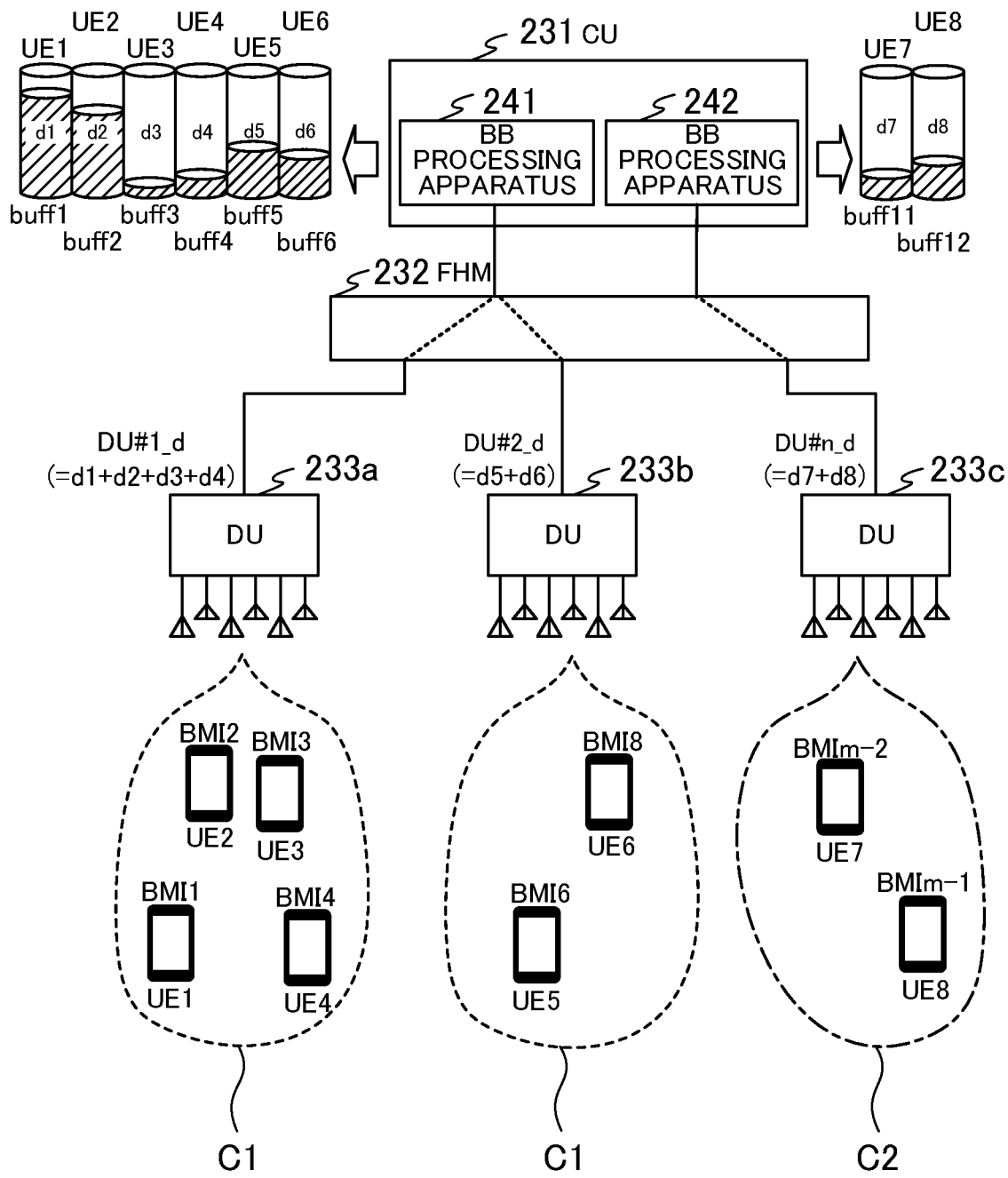
FIG. 29 is a diagram describing traffic measurement for each DU.

FIG. 29 is a diagram describing the traffic measurement for each of DUs 233a to 233c. In FIG. 29, the same components as those in FIG. 21 are denoted by the same reference signs. Note that user terminals UE 1 to UE 8 are illustrated in FIG. 29. User terminals UE 1 to UE 8 perform radio communication with DUs 233a to 233c by the beams with BMIs illustrated in FIG. 29.

User terminals UE 1 to UE 6 belong to cell C1 formed by BB processing apparatus 241. User terminals UE 1 to UE 4 belong to DU 233a, and user terminals UE 5 and UE 6 belong to DU 233b.

User terminals UE 7 and UE 8 belong to cell C2 formed by BB processing apparatus 242. User terminals UE 7 and UE 8 belong to DU 233c.

Data buffers buff 1 to buff 6 illustrated in FIG. 29 represent data buffers included in BB processing apparatus 241. DL signals to be transmitted to user terminals UE 1 to UE 6 are temporarily stored in data buffers buff 1 to buff 6 respectively. Amounts of data temporarily stored in data buffers buff 1 to buff 6 respectively correspond to traffic of user terminals UE 1 to UE 6. Note that oblique lines in data buffers buff 1 to buff 6 indicate DL signals temporarily stored in data buffers buff 1 to buff 6.

In addition, data buffers buff 11 and buff 12 illustrated in FIG. 29 represent data buffers included in BB processing apparatus 242. DL signals to be transmitted to user terminals UE 7 and UE 8 are temporarily stored in data buffers buff 11 and buff 12 respectively. Amounts of data temporarily stored in data buffers buff 11 and buff 12 respectively correspond to traffic of user terminals UE 7 and UE 8. Note that oblique lines in data buffers buff 11 and buff 12 indicate DL signals temporarily stored in data buffers buff 11 and buff 12.

Measurement section 256 of BB processing apparatus 241 refers to data buffers buff 1 to buff 6, and measures the traffic of the DL signals for user terminals UE 1 to UE 6.

For example, "d1 to d6" illustrated in data buffers buff 1 to buff 6 in FIG. 29 respectively represent the traffic of user terminals UE 1 to UE 6. In this case, measurement section 256 measures "d1" as the traffic of user terminal UE 1. Measurement section 256 measures "d2" as the traffic of user terminal UE 2. Likewise, measurement section 256 measures "d3", "d4", "d5", and "d6" as the traffic of user terminals UE 3 to UE 6 respectively. A measurement section of BB processing apparatus 242 also measures "d7" and "d8" as the traffic of user terminals UE 7 and UE 8 in the same manner as measurement section 256 does.

As described in FIG. 23, BB processing apparatus 241 includes storage section 255 that stores beam information 255*a*. BB processing apparatus 241 can thus determine which of DU 233*a* or DU 233*b* user terminals UE 1 to UE 6 each belong to, by referring to storage section 255 using BMIs of user terminals UE 1 to UE 6. Note that the BMIs of user terminals UE 1 to UE 6 are fed back to BB processing apparatus 241 as described in FIG. 27, and BB processing apparatus 241 can determine the BMIs of user terminals UE 1 to UE 6.

For example, measurement section 256 can determine that user terminal UE 1 with "BMI1" belongs to DU 233*a* with DU identification information "DU #1". Measurement section 256 can also determine that user terminal UE 6 with "BMI6" belongs to DU 233*b* with DU identification information "DU #2", for example.

As described above, measurement section 256 can measure the traffic of user terminals UE 1 to UE 6, and determine which of DUs 233*a* and 233*b* user terminals UE 1 to UE 6, the traffic of which has been measured, each belong to. This enables measurement section 256 to calculate the traffic of each of DUs 233*a* and DU 233*b*.

For example, user terminals UEs 1 to 4 belong to DU 233*a*. Measurement section 256 can thus calculate the traffic of DU 233*a* "DU #1_d=d1+d2+d3+d4" by adding traffic "d1", "d2", "d3", and "d4" of user terminals UE 1 to UE 4. Additionally, measurement section 256 can calculate the traffic of DU 233*b* "DU #2_d=d5+d6" by adding traffic "d5" and "d6" of user terminals UE 5 and UE 6.

The measurement section of BB processing apparatus 242 can similarly measure the traffic of each DU (although only a single DU is connected in the example of FIG. 29, the traffic of each DU can be measured). The traffic of DU 233*c* measured by the measurement section of BB processing apparatus 242 is "DU #n_d=d7+d8". As described above, measurement section 256 of BB processing apparatus 241 and the measurement section of the BB processing apparatus measure the traffic of each of DUs 233*a* to 233*c*.

A description will be given of exemplary switching of switch 262*b* in FIG. 24. The traffic of each of DUs 233*a* to 233*c* measured by the measurement sections of BB processing apparatuses 241 and 242 is transmitted to FHM 232. Reception section 261 of FHM 232 receives the traffic of each of DUs 233*a* to 233*c* transmitted from BB processing apparatuses 241 and 242.

Control section 262*a* switches switch 262*b* so as to level the traffic of BB processing apparatuses 241 and 242, based on the traffic of each of DUs 233*a* to 233*c* received by reception section 261.

For example, it is assumed that traffic "DU #1 d" of DU 233*a* connected to BB processing apparatus 241 exceeds a threshold. In this case, control section 262*a* switches switch 262*b* so as to connect DU 233*b*, which is the other DU connected to BB processing apparatus 241, to BB processing apparatus 242. For example, control section 262*a* switches switch 262*b* so that terminal T11 in FIG. 24 is connected to terminal T13. This lightens the traffic of BB processing apparatus 241, and the traffic of BB processing apparatuses 241 and 242 is leveled accordingly.

Note that, when control section 262*a* connects terminal T11 to terminal T13, user terminals belonging to DU 233*b* feed back the BMIs of the swept beams to BB processing apparatus 242. This enables BB processing apparatus 242 to determine which of DUs 233*b* and 233*c* the user terminals each belong to, based on the beam information stored in the storage section. That is, BB processing apparatus 242 can measure the traffic of each of DUs 233*b* and 233*c* even when switch 262*b* is switched.

As described above, reception section 261 of FHM 232 receives the traffic of each of radio apparatuses DUs 233*a* to 233*c* from BB processing apparatuses 241 and 242. Control section 262*a* determines a connection destination of each of DUs 233*a* to 233*c* to either one of BB processing apparatuses 241 or 242 based on the traffic of each of DUs 233*a* to 233*c* received by reception section 261. FHM 232 can thus connect BB processing apparatuses 241 and 242 and DUs 233*a* to 233*c* so as to level BB processing apparatuses 241 and 242.

[Variation 1]

It is assumed that traffic of certain DU #Y among a plurality (e.g., three or more) of DUs connected to certain BB processing apparatus X exceeds a threshold. In this case, a control section of an FHM may connect, to another BB processing apparatus, a DU with the heaviest traffic among the other DUs with traffic within the threshold connected to BB processing apparatus X. This makes it possible to greatly reduce traffic of BB processing apparatus X.

[Variation 2]

It is assumed that traffic of certain DU #Y among a plurality (e.g., three or more) of DUs connected to certain BB processing apparatus X exceeds a threshold. In this case, a control section of an FHM may connect DU #Z that is connected to BB processing apparatus X and has the second heaviest traffic after DU #Y, to a BB processing apparatus with the lightest traffic among BB processing apparatuses other than BB processing apparatus X. This makes it possible to further level the traffic.

[Variation 3]

When total traffic of certain BB processing apparatus X (a sum of traffic of all DUs connected to BB processing apparatus X) exceeds a threshold, a control section of an FHM may connect DUs connected to BB processing apparatus X to another BB processing apparatus. For example, the control section selects a DU with the lightest traffic among a plurality of DUs connected to BB processing apparatus X, and connects the selected DU to another BB processing apparatus. The control section repeats the selection of the DU with the lightest traffic and connects the selected DU to BB processing apparatus 242, until the traffic of BB processing apparatus X reaches less than or equal to the threshold.

[Variation 4]

Although cases of DL have been described above, a control section may switch connections between BB processing apparatuses and DUs based on UL signals. For example, a BB processing apparatus calculates a remaining data amount, which corresponds to traffic, of each user terminal based on Buffer Status Reports transmitted from user terminals. As is the case with the DL, the BB processing apparatus calculates the traffic of each DU based on UL traffic of the user terminal and BMIs assigned to the user terminal.

[Variation 5]

A control section may switch connections between BB processing apparatuses and DUs based on traffic of DL and UL. For example, the connections between the BB processing apparatuses and the DUs may be switched based on traffic obtained by adding the traffic of DL and the traffic of UL. At this time, the control section may apply weights on the traffic of DL and the traffic of UL.

For example, the control section may calculate "DL traffic×coefficient A1+UL traffic×coefficient A2" for each DU, and switch the connections between the BB processing apparatuses and the DUs. The coefficients are set to "coefficient A1>coefficient A2" when the connections between the BB processing apparatuses and the DUs are switched focusing on the DL traffic. On the contrary, the coefficients are set to "coefficient A1<coefficient A2" when the connections between the BB processing apparatuses and the DUs are switched focusing on the UL traffic.

[Variation 6]

Although a BB processing apparatus measures traffic in the above description, an FHM (e.g., a measurement section included in the FHM) may measure the traffic of each DU. Since the beam information is transmitted from the BB processing apparatus to the DUs via the FHM as described in FIG. 25, for example, the FHM can receive beam information 255a illustrated in FIG. 23, for example, and store the information in a storage section. In addition, the FHM receives data buffer information of each user terminal (traffic of each user terminal) from the BB processing apparatus. The FHM also receives BMIs fed back by the user terminals from the BB processing apparatus.

The FHM refers to the beam information stored in the storage section, and can determine which of DUs the user terminals each belong to, based on the BMIs of the user terminals received from the BB processing apparatus. This allows the FHM to measure the traffic of each DU by adding, for each DU, the traffic of the user terminals belonging to the DU.

[Variation 7]

A BB processing apparatus or an FHM which have measured traffic of each DU may transmit the measured traffic to reception apparatus 205 described in Embodiment 3. Reception device 205, for example, displays the received traffic on a display. This allows an operator to appropriately configure connections between the BB processing apparatuses and the DUs based on the traffic displayed on the display.

[Variation 8]

The beam identification information is unique over DUs 233a to 233c connected to FHM 232 in the above description, but the present disclosure is not limited thereto. The beam identification information may be unique for each of the DUs connected to BB processing apparatuses 241 and 242.

For example, DUs 233a and 233b are connected to BB processing apparatus 241 in FIG. 25. DU 233c is connected to BB processing apparatus 242. In this case, the beam identification information may be unique between DUs 233a and 233b, and unique for DU 233c. To be more specific, the beam identification information of DU 233a may be "BMI1, BMI2, BMI3, and BMI4", the beam identification information of DU 233b may be "BMI5, BMI6, BMI7, and BMI8", and the beam identification information of DU 233c may be "BMI1, BMI2, BMI3, and BMI4".

When the beam identification information is configured to be unique for each of the DUs connected to BB processing apparatuses 241 and 242 in this manner, BB processing apparatuses 241 and 242 reassign the beam identification information after the switch of FHM 232 is switched. BB processing apparatuses 241 and 242 reassign the beam identification information for the connected DUs after switching such that the information is unique one another.

For example, it is assumed in FIG. 25 that DU 233b is connected to BB processing apparatus 241 and DUs 233a and 233c are connected to BB processing apparatus 242 by the switching of the switch of FHM 232. In this case, BB processing apparatus 241 reconfigures the beam identification information of DU 233b to "BMI1, BMI2, BMI3, and BMI4". BB processing apparatus 242 reconfigures the beam identification information of DU 233a to "BMI1, BMI2, BMI3, and BMI4", and reconfigures the beam identification information of DU 233c to "BMI5, BMI6, BMI7, and BMI8".

Note that the above variations can be combined with each other.

Embodiment 5

In Embodiment 4, the FHM switches the connections between the BB processing apparatuses and the DUs based on the traffic of each DU. In Embodiment 5, the FHM switches the connections between the BB processing apparatuses and the DUs based on failure of the BB processing apparatuses. When a certain BB processing apparatus fails, for example, the FHM connects the DU that has been connected to the failed BB processing apparatus to a normal BB processing apparatus.

Figure 30:
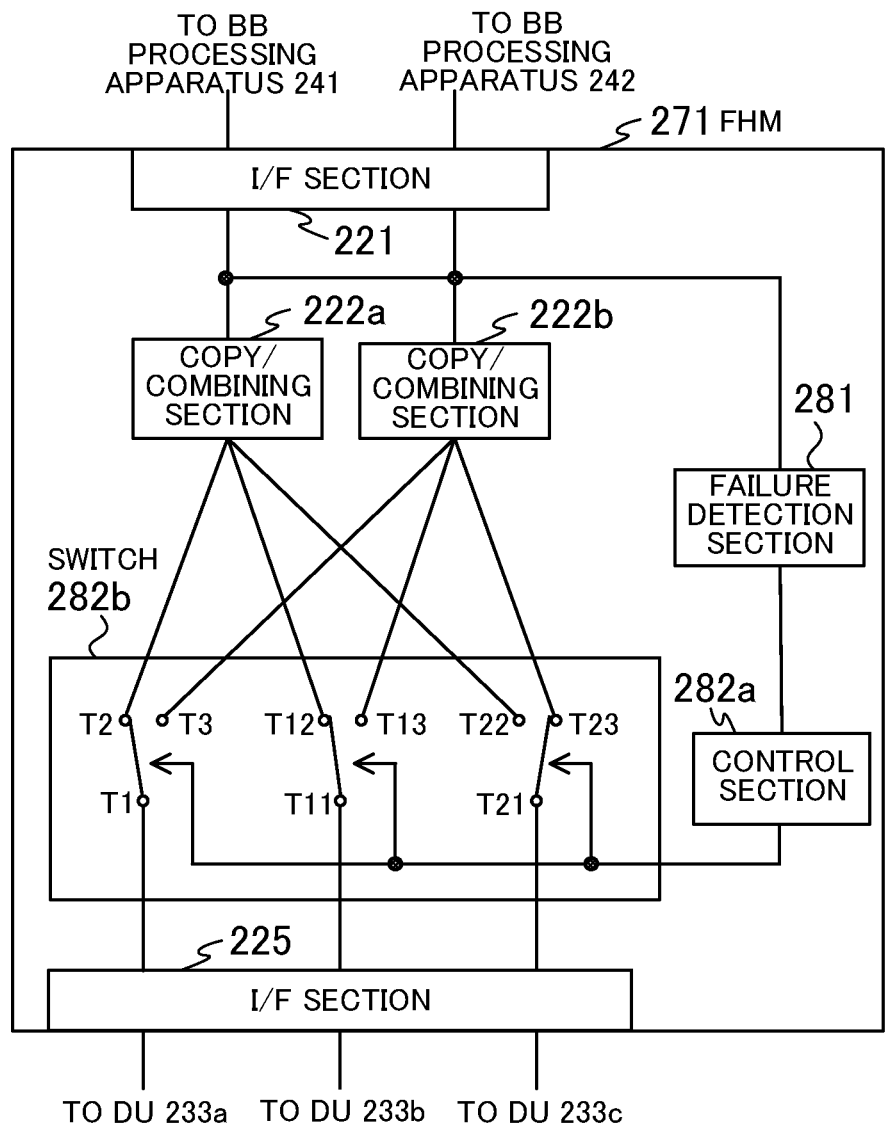
FIG. 30 illustrates an exemplary block configuration of an FHM according to Embodiment 5.

FIG. 30 illustrates an exemplary block configuration of FHM 271 according to Embodiment 5. In FIG. 30, the same components as those in FIG. 24 are denoted by the same reference signs. As illustrated in FIG. 30, FHM 271 includes failure detection section 281, control section 282a, and switch 282b. I/F section 221 of FHM 271 is connected to BB processing apparatuses 241 and 242 illustrated in FIG. 21, and I/F section 225 is connected to DUs 233a to 233c illustrated in FIG. 21.

Failure detection section 281 detects failure in BB processing apparatuses 241 and 242. For example, failure detection section 281 detects the failure in BB processing apparatuses 241 and 242 by monitoring the presence or absence of a DL signal transmitted from BB processing apparatus 241 and 242. Alternatively, failure detection section 281 may detect the failure in BB processing apparatuses 241 and 242, for example, by receiving failure diagnosis information from BB processing apparatuses 241 and 242 having a failure diagnosis function.

Failure detection section 281 transmits, to BB processing apparatuses 241 and 242, connection information of DUs 233a to 233c connected to BB processing apparatuses 241 and 242 when BB processing apparatuses 241 and 242 are not failed (when BB processing apparatuses 241 and 242 function normally). When switch 282b is in a state illustrated in FIG. 30, for example, DUs 233a and 233b are connected to BB processing apparatus 241, and DU 233c is connected to BB processing apparatus 242. Failure detection section 281 thus transmits, to BB processing apparatuses 241 and 242, the connection information indicating that DUs 233a and 233b are connected to BB processing apparatus 241, and DU 233c is connected to BB processing apparatus 242.

When detecting failure of either BB processing apparatus 241 or 242, failure detection section 281 transmits failure information indicating that either BB processing apparatus 241 or 242 has failed to non-failed BB processing apparatus 241 or 242. For example, BB processing apparatus 241 is assumed to have failed. In this case, failure detection section 281 transmits the failure information indicating that BB processing apparatus 241 has failed to non-failed BB processing apparatus 242. Failure detection section 281 also outputs information of the detected failure to control section 282a.

After failure detection section 281 transmits the failure information to BB processing apparatus 241 or 242, control section 282a controls switch 282b and connects DUs 233a to 233c that have been connected to failed BB processing apparatus 241 or 242 to non-failed BB processing apparatus 241 or 242. For example, BB processing apparatus 241 is assumed to have failed in the switching state illustrated in FIG. 30. In this case, control section 282a connects terminal T1 to terminal T3, and connects terminal T11 to terminal T13. This allows DUs 233a and 233b that have been connected to failed BB processing apparatus 241 to be connected to normal BB processing apparatus 242.

An operation of FHM 271 will be described.

Figure 31:
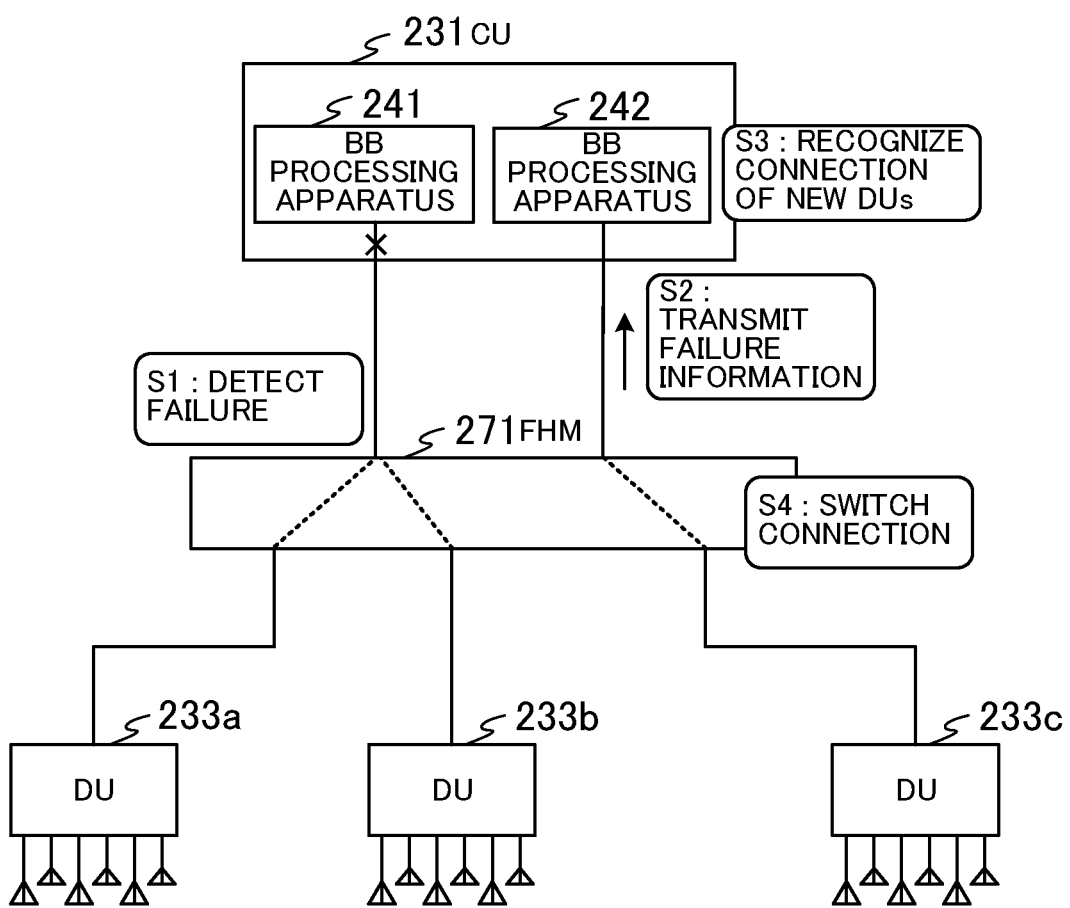
FIG. 31 illustrates an exemplary operation of a radio base station when either one of BB processing apparatuses fails.

FIG. 31 illustrates an exemplary operation of the radio base station when either one of BB processing apparatuses 241 and 242 fails. FIG. 31 illustrates FHM 271 described in FIG. 30, BB processing apparatuses 241 and 242 and DUs 233a to 233c connected to FHM 271.

Switch 282b of FHM 271 is assumed to be in the state illustrated in FIG. 30. That is, it is assumed that DUs 233a and 233b are connected to BB processing apparatus 241, and DU 233c is connected to BB processing apparatus 242. It is also assumed that failure detection section 281 has transmitted, to BB processing apparatuses 241 and 242, the connection information of BB processing apparatuses 241 and 242, i.e., information indicating that DUs 233a and 233b are connected to BB processing apparatus 241 and DU 233c is connected to BB processing apparatus 242.

BB processing apparatus 241 is assumed to have failed. In this case, failure detection section 281 detects the failure in BB processing apparatus 241 (S1 in FIG. 31).

When detecting the failure in BB processing apparatus 241, failure detection section 281 transmits failure information indicating that BB processing apparatus 241 has failed, to non-failed BB processing apparatus 242. (S2 in FIG. 31).

BB processing apparatus 242 recognizes the DUs to newly manage based on the failure information received from FHM 232. For example, BB processing apparatus 242 has received the connection information of BB processing apparatus 241, which is the information indicating that BB processing apparatus 241 is connected to DUs 233a and 233b, in advance (before BB processing apparatus 241 fails). BB processing apparatus 242 can thus recognize that DUs 233a and 233b, which have been connected to failed BB processing apparatus 241, are newly connected, when receiving the failure information indicating that BB processing apparatus 241 has failed (S3 in FIG. 31). This allows BB processing apparatus 242 to schedule user terminals belonging to DUs 233a and 233b, for example.

Control section 282a of FHM 271 switches switch 282b so that DUs 233a and 233b, which have been connected to failed BB processing apparatus 241, are connected to BB processing apparatus 242, based on the failure information of failure detection section 281 (S4 in FIG. 31). This enables the user terminals belonging to DUs 233a and 233b to perform radio communication with BB processing apparatus 242.

As described above, FHM 271 includes failure detection section 281 that detects failure in BB processing apparatuses 241 and 242. Control section 282a determines to connect DUs 233a to 233c that have been connected to failed BB processing apparatus 241 or 242 to non-failed BB processing apparatus 241 or 242, based on the failure detection result of failure detection section 281. This allows user terminals that have communicated with failed BB processing apparatus 241 or 242 to communicate with the other non-failed BB processing apparatus 241 or 242, even when BB processing apparatus 241 or 242 with which the user terminals have communicated fails.

Further, FHM 271 can save the user terminals that can no longer perform radio communication, by a simple configuration and processing even when BB processing apparatus 241 or 242 fails. For example, when BB processing apparatuses 241 and 242 and DUs 233a to 233c are directly connected to each other, the connections need to be meshed to save the user terminals that can no longer perform radio communication, and this makes the wiring complicated. In addition, BB processing apparatuses 241 and 242 and DUs 233a to 233c need to have algorithms for saving the user terminals. The radio base station including FHM 271, however, can save the user terminals that can no longer perform radio communication, by a simple configuration and processing.

Note that failure detection section 281 may transmit the BMIs processed (managed) by failed BB processing apparatus 241 or 242 to non-failed BB processing apparatus 241, instead of the failure information or together with the failure information. Non-failed BB processing apparatus 242 can recognize newly connected DUs 233a to 233c by referring to the beam information based on the received BMIs.

Embodiment 6

As described in the above embodiments, the FHM is connected to DU subordinates forming a plurality of beams in some cases, and is connected to DU subordinates forming no beams (having no beams) in other cases. In Embodiment 2, a description has been given of the selection of UL signals and noises in the FHM in a case of DUs forming a plurality of beams. In Embodiment 6, a description will be given of the selection of UL signals and noises in the FHM in a case of DUs having no beams.

Hereinafter, a description will be given of portions different from Embodiment 2. Note that, in Embodiment 6, functions of control section 92 are different from those of the one in the blocks of FMH 90 illustrated in FIG. 12. In Embodiment 6, copy section 94 of FHM 90 does not copy a DL signal. Combining section 100 of FHM 90 does not combine UL signals. Also, storage section 93 of FHM 90 stores information with different contents. A DU forming a plurality of beams may be referred to as an antenna integrated DU. A DU having no beams may be referred to as an antenna isolated DU.

Figure 32:
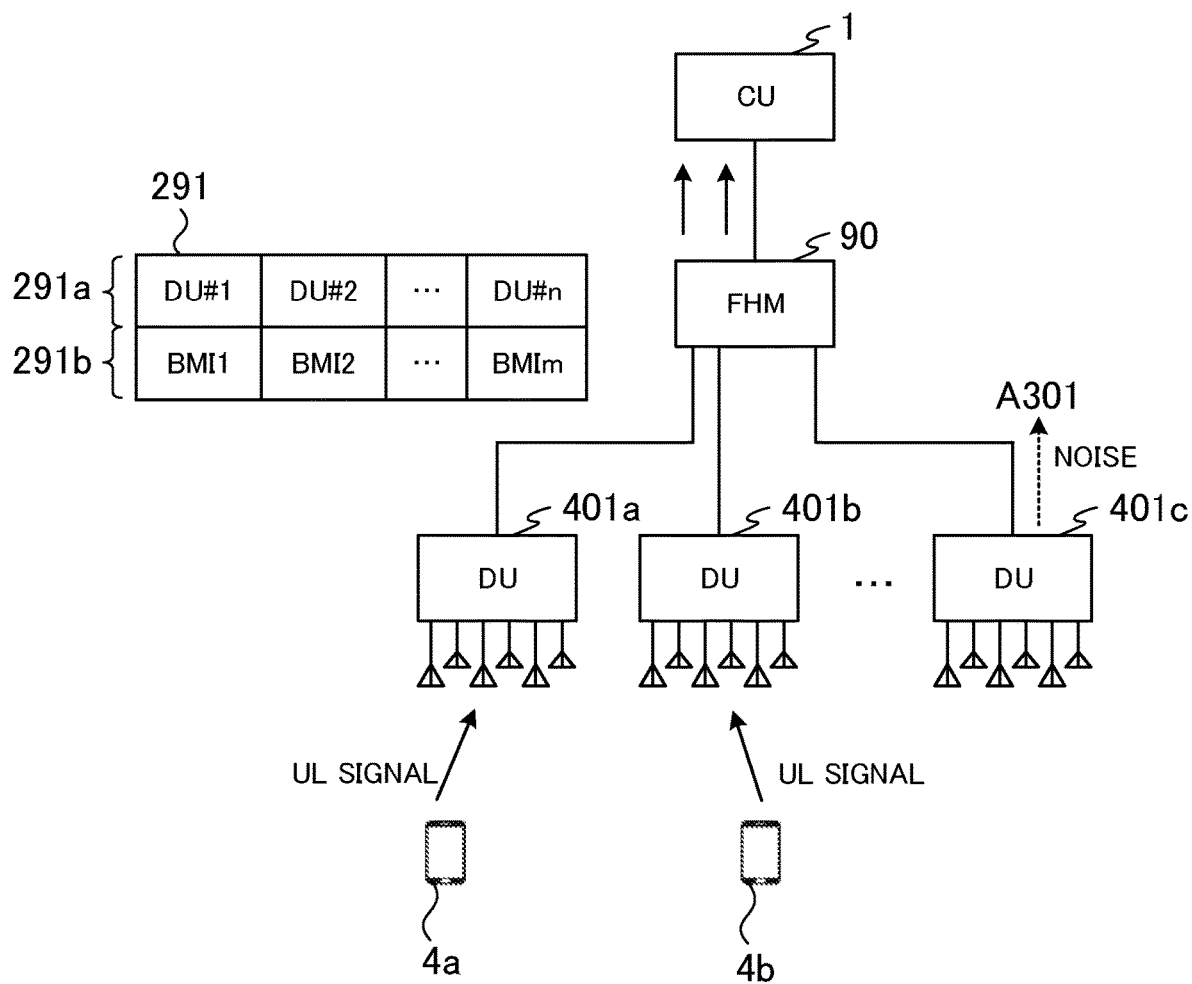
FIG. 32 illustrates an exemplary operation of an FHM according to Embodiment 6.

FIG. 32 illustrates an exemplary operation of FHM 90 according to Embodiment 6. In FIG. 32, the same components as those in FIG. 14 are denoted by the same reference signs. DUs 401a to 401c illustrated in FIG. 32 are antenna isolated DUs.

FIG. 32 illustrates table 291. Table 291 is stored in storage section 93 of FHM 90. Table 291 includes DU identification information 291a and beam identification information 291b.

FHM 90 includes ports respectively connected to DUs 401a to 401c. DU identification information 291a of table 291 is identification information assigned to the ports of FHM 90 respectively connected to DUs 401a to 401c. For example, "DU #1" illustrated in FIG. 32 is an identifier assigned to the port of FHM 90 connected to DU 401a, and "DU #2" is an identifier assigned to the port of FHM 90 connected to DU 401b. Additionally, "DU #n" illustrated in FIG. 32 is, for example, an identifier assigned to the port of FHM 90 connected to DU 401c. In other words, DU identification information 291a can be regarded as identification information for identifying the plurality of DUs 401a to 401c.

Beam identification information 291b is identification information for identifying beams associated with DUs 401a to 401c. Although DUs 401a to 401c are antenna isolated DUs having no beams, beam identification information 291b is formally assigned. As described below, CU 1 can communicate with FHM 90 without distinguishing whether DUs 401a to 401c connected subordinate to FHM 90 are the antenna integrated DUs or the antenna isolated DUs, by assigning beam identification information 291b to antenna isolated DUs 401a to 401c. To be more specific, even when DUs 401a to 401c connected subordinate to FHM 90 are the antenna isolated DUs, CU 1 can communicate with FHM 90 as in a case of the antenna integrated DUs.

Note that control section 92 of FHM 90 may determine whether DUs 401a to 401c are the antenna integrated DUs or the antenna isolated DUs, for example, when DUs 401a to 401c are connected to FHM 90. Control section 92 of FHM 90 may generate table 291 and store table 291 in storage section 93 when DUs 401a to 401c are connected to FHM 90 and control section 92 determines connected DUs 401a to 401c as the antenna isolated DUs.

An exemplary operation of FHM 90 will be described. In the following, user terminal 4a is subordinate to DU 401a, and user terminal 4b is subordinate to DU 401b. User terminal 4a communicates with FHM 90 via DU 401a when it is subordinate to DU 401a. Control section 92 of FHM 90 refers to table 291 in communicating with user terminal 4a via DU 401a and acquires BMI1 corresponding to the port connected to DU 401a. FHM 90 transmits acquired BMI1 and identification information of user terminal 4a to CU 1. A Random Access preamble ID (RAPID) transmitted from user terminal 4a on a Random Access Channel (RACH) may be used as the identification information of user terminal 4a.

Further, user terminal 4b communicates with FHM 90 via DU 401b when it is subordinate to DU 401b. Control section 92 of FHM 90 refers to table 291 in communicating with user terminal 4b via DU 401b and acquires BMI2 corresponding to the port connected to DU 401b. FHM 90 transmits acquired BMI2 and identification information of user terminal 4b to CU 1. A RAPID transmitted from user terminal 4b on a RACH may be used as the identification information of user terminal 4b.

An operation in DL will be described. CU 1 transmits packets (DL signals) to user terminals 4a and 4b. At this time, CU 1 transmits the packet for user terminal 4a by including BMI1 in a header area of the packet that configures the BMI. CU 1 also transmits the packet for user terminal 4b by including BMI2 in a header area of the packet that configures the BMI. Note that CU 1 can include BMI1 in the header area of the packet for user terminal 4a based on the identification information of user terminal 4a and BMI1 transmitted from FHM 90. Likewise, CU 1 can include BMI2 in the header area of the packet for user terminal 4b based on the identification information of user terminal 4b and BMI2 transmitted from FHM 90.

Reception section 91 of FHM 90 receives the packets for user terminals 4a and 4b transmitted from CU 1. Control section 92 of FHM 90 acquires DU identification information "DU #1" corresponding to BMI1 by referring to table 291 based on BMI1 included in the header area of the packet for user terminal 4a transmitted from CU 1. Control section 92 of FHM 90 transmits the packet for user terminal 4a to DU 401a corresponding to acquired DU identification information "DU #1". At this time, control section 92 of FHM 90 rewrites the header area, in which the BMI is configured, of the packet for user terminal 4a to information indicating the absence of the beams, and transmits the packet for user terminal 4a to DU 401a. DU 401a transmits, from antennas, the packet for user terminal 4a transmitted from FHM 90. User terminal 4a receives the packet for user terminal 4a transmitted from antennas of DU 401a.

Control section 92 of FHM 90 acquires DU identification information "DU #2" corresponding to BMI2 by referring to table 291 based on BMI2 included in the header area of the packet for user terminal 4b transmitted from CU 1. Control section 92 of FHM 90 transmits the packet for user terminal 4b to DU 401b corresponding to acquired DU identification information "DU #2". At this time, control section 92 of FHM 90 rewrites the header area, in which the BMI is configured, of the packet for user terminal 4b to information indicating the absence of the beams, and transmits the packet for user terminal 4b to DU 401b. DU 401b transmits, from antennas, the packet for user terminal 4b transmitted from FHM 90. User terminal 4b receives the packet for user terminal 4b transmitted from antennas of DU 401b.

Control section 92 of FHM 90 rewrites the header area, in which the BMI is configured, of the packet transmitted from CU 1 to the information indicating the absence of the beams, and transmits the packet to DUs 401a to 401c. This processing enables CU 1 to transmit the packet regarding DUs 401a to 401c connected subordinate to FHM 90 as the antenna integrated DUs (including the BMI in the header area, in which the BMI is configured, of the packet), even when the DUs are the antenna isolated DUs. That is, CU 1 can communicate with FHM 90 without distinguishing whether DUs 401a to 401c connected subordinate to FHM 90 are the antenna integrated DUs or the antenna isolated DUs.

An operation in UL will be described. UL scheduling information includes information of a UL radio resource allocated to user terminal 4a, and BMI1. The UL scheduling information also includes information of a UL radio resource allocated to user terminal 4b, and BMI2. The UL radio resources are allocated to user terminals 4a and 4b in certain time domain T.

User terminals 4a and 4b respectively transmit packets (UL signals) to DUs 401a and 401b in certain time domain T based on the UL scheduling information. DU 401a receives the packet transmitted from user terminal 4a, and transmit the packet to FHM 90. DU 401b receives the packet transmitted from user terminal 4b, and transmit the packet to FHM 90.

Reception section 97 of FHM 90 receives the UL packets of user terminal 4a from DU 401a. Control section 92 of FHM 90 refers to table 291 and acquires BMI1 corresponding to DU 401a (DU identification information "DU #1") that has transmitted the packet of user terminal 4a. Control section 92 of FHM 90 rewrites the header area, in which the BMI is configured, of the packet of user terminal 4a received from DU 401a, to acquired BMI1.

Reception section 97 of FHM 90 also receives the UL packets of user terminal 4b from DU 401b. Control section 92 of FHM 90 refers to table 291 and acquires BMI2 corresponding to DU 401b (DU identification information "DU #2") that has transmitted the packet of user terminal 4b. Control section 92 of FHM 90 rewrites the header area, in which the BMI is configured, of the packet of user terminal 4b received from DU 401b, to acquired BMI2.

Control section 92 of FHM 90 acquires DU identification information "DU #1" and "DU #2" respectively corresponding to BMI1 and BMI2 by referring to table 291 based on BMI1 and BMI2 included in the UL scheduling information received from CU 1. Control section 92 of FHM 90 specifies DUs 401*a* and 401*b* respectively having user terminal subordinates 4*a* and 4*b*, from acquired DU identification information "DU #1" and "DU #2". This allows control section 92 of FHM 90 to specify that packets are transmitted from DUs 401*a* and 401*b* in certain time domain T and no packet is transmitted from DU 401*c* in certain time domain T.

Transmission section 102 of FHM 90 transmits, to CU 1, the packets transmitted from DUs 401*a* and 401*b* specified by control section 92 (the above-mentioned packets, the header areas of which are rewritten). When reception section 97 of FHM 90 receives a packet transmitted from DU 401*c* in certain time domain T (e.g., a noise packet indicated by arrow A301), for example, transmission section 102 does not transmit the packet transmitted from DU 401*c* to CU 1, and transmits the packets transmitted from DUs 401*a* and 401*b* in certain time domain T (the above-mentioned packets, the header areas of which are rewritten) to CU 1. This processing enables FHM 90 to reduce the noise transmitted to CU 1.

As described above, storage section 93 of FHM 90 that relays the communication between CU 1 and DUs 401*a* to 401*c* stores table 291 in which DU identification information 291*a* and beam identification information 291*b* assigned to each of DUs 401*a* to 401*c* are associated with each other. Reception section 91 receives, from CU 1, scheduling information for user terminals 4*a* and 4*b* that perform radio communication with DUs 401*a* to 401*c*. Control section 92 acquires, from table 291 in storage section 93, DU identification information 291*a* corresponding to uplink beam identification information 291*b* included in the scheduling information, and specifies DUs 401*a* to 401*c* that have user terminal subordinates 4*a* and 4*b* from acquired DU identification information 291*a*. Transmission section 102 transmits, to CU 1, the packets transmitted from specified DUs 401*a* to 401*c*. This enables FHM 90 to reduce the noise transmitted to CU 1. This further enables FHM 90 to prevent degeneration of a UL area even when DUs 3*a* to 3*c* increase.

Note that, in the above description, control section 92 of FHM 90 transmits the DL packet received from CU 1 to one of DUs 401*a* to 401*c* based on the BMI, but the present disclosure is not limited thereto. FHM 90 may copy the DL packet received from CU 1 in copy section 94 and transmit the DL packet to each of DUs 401*a* to 401*c*. For example, copy section 94 of FHM 90 may copy the DL packet for user terminal 4*a* and transmit the DL packet to each of DUs 401*a* to 401*c*.

Each embodiment has been described, thus far. Note that FHMs 2 and 90 described in Embodiment 1 and Embodiment 2 may have a switching function for a DL signal. For example, FHMs 2 and 90 may switch the DL signal and transmit the DL signal to predetermined DUs 3*a* to 3*c*. Further, FHM 90 receives beam information 51 in Embodiment 2, but beam information 51 may be stored in storage section 93.

(Hardware Configuration)

Note that, the block diagrams used to describe the above embodiment illustrate blocks on the basis of functions. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or wirelessly), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmitting unit" or "transmitter." The methods for implementing the functions are not limited specifically as described above.

Figure 33:
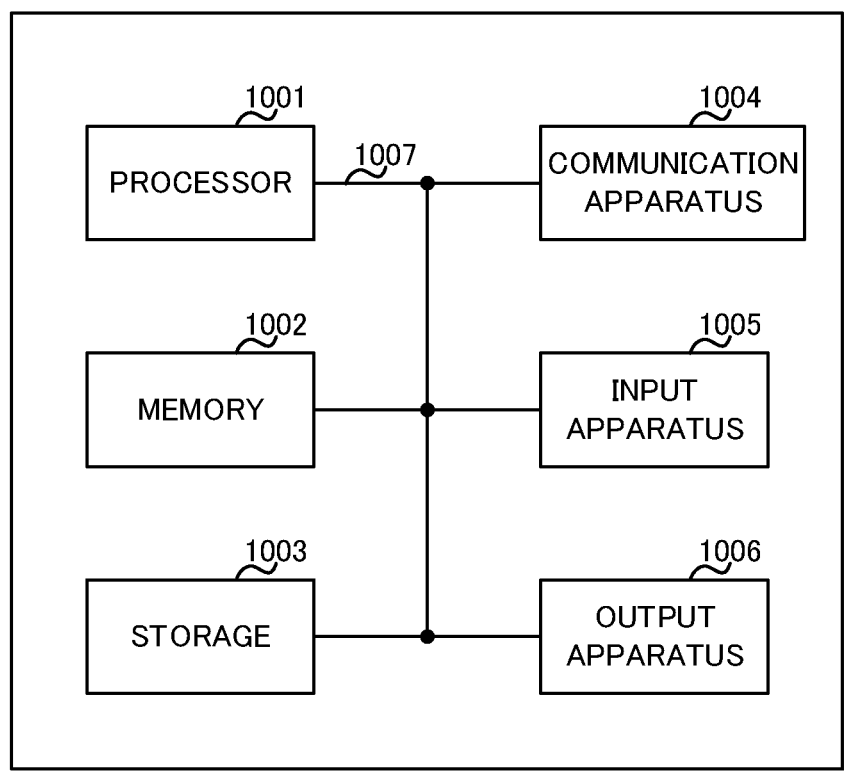
FIG. 33 illustrates an exemplary hardware configuration of the radio base station and the user terminal according to an embodiment of the present invention.

For example, the radio base station (CU, FHM, and DU), the user terminal, and the like according to an embodiment of the present disclosure may function as a computer that executes processing of a radio communication method of the present disclosure. FIG. 33 illustrates one example of hardware configurations of the radio base station and of the user terminal according to one embodiment of the present disclosure. The radio base station and the user terminal described above may be physically constituted as a computer apparatus including processor 1001, memory 1002, storage 1003, communication apparatus 1004, input apparatus 1005, output apparatus 1006, bus 1007, and the like.

Note that, the term "apparatus" in the following description can be replaced with a circuit, a device, a unit, or the like. The hardware configurations of the radio base station and of the user terminal may include one apparatus or a plurality of apparatuses illustrated in the figures, or may not include part of the apparatuses.

The functions of the radio base station and the user terminal are implemented by predetermined software (program) loaded into hardware such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control sections 31, 62, 92, 223*a*, 254, 262*a*, and 282*a*, transmission signal generation section 34, coding/modulation section 35, mapping section 36, demapping section 39, channel estimation section 40, demodulation/decoding section 41, communication quality acquisition section 42, digital BF sections 63 and 68, IFFT/CP section 64, FFT/CP section 67, copy section 94, delay offset sections 95 and 99, IFFT section 98, combining section 100, FFT section 101, copy/combining sections 222*a* and 222*b*, BB processing section 252, measurement section 256, and failure detection section 281 as described above may be implemented by processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiment is used. For example, the user terminal may be implemented by a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented by one or more chips. Note that, the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present disclosure.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be, for example, a database, a server or other appropriate media including at least one of memory 1002 and storage 1003. Storage sections 32, 93, and 255 may be implemented by, for example, either one of memory 1002 or storage 1003, or both of memory 1002 and storage 1003.

Communication apparatus 1004 is hardware (transmission and reception device) for communication between computers through at least one of wired and radio networks and is also called, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, I/F sections 33, 221, 225, 251, and 253, transmission sections 37, 69, 96, and 102, reception sections 38, 61, 91, 97, 224, and 261, and radio sections 65 and 66 as described above may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which makes outputs to the outside. Note that, input apparatus 1005 and output apparatus 1006 may be integrated (for example, a touch panel).

The apparatuses, such as processor 1001, memory 1002 and the like, are connected by bus 1007 for communication of information. Bus 1007 may be configured using a single bus or using buses different between each pair of the apparatuses.

Furthermore, the radio base station and the user terminal may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented using at least one of these pieces of hardware.

(Notification and Signaling of Information)

The notification of information is not limited to the aspects or embodiment described in the present disclosure, and the information may be notified by another method. For example, the notification of information may be carried out by one or a combination of physical layer signaling (for example, DCI (Downlink Control Information) and UCI (Uplink Control Information)), upper layer signaling (for example, RRC (Radio Resource Control) signaling, MAC (Medium Access Control) signaling, notification information (MIB (Master Information Block) and SIB (System Information Block))), and other signals. The RRC signaling may be called an RRC message and may be, for example, an RRC connection setup message, an RRC connection reconfiguration message, or the like.

(Application System)

The aspects and embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UMB (Ultra-WideBand), Bluetooth (registered trademark), or other appropriate systems and a next-generation system extended based on the above systems. Additionally or alternatively, a combination of two or more of the systems (e.g., a combination of at least one of LTE and LTE-A and 5G) may be applied.

(Processing Procedure and the Like)

The orders of the processing procedures, the sequences, the flow charts, and the like of the aspects and embodiment described in the present disclosure may be changed as long as there is no contradiction. For example, elements of various steps are presented in exemplary orders in the methods described in the present disclosure, and the methods are not limited to the presented specific orders.

(Operation of Base Station)

Specific operations which are described in the present disclosure as being performed by the base station may sometimes be performed by an upper node depending on the situation. Various operations performed for communication with a terminal in a network constituted by one network node or a plurality of network nodes including a base station can be obviously performed by at least one of the base station and a network node other than the base station (examples include, but not limited to, MME and S-GW). Although there is one network node in addition to the base station in the case illustrated above, a plurality of other network nodes may be combined (for example, MME and S-GW).

(Direction of Input and Output)

The information or the like (see the item of "Information and Signals") can be output from a higher layer (or a lower layer) to a lower layer (or a higher layer). The information or the like may be input and output through a plurality of network nodes.

(Handling of Input and Output Information and the Like)

The input and output information and the like may be saved in a specific place (for example, memory) or may be managed using a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a wireless technique (e.g., an infrared ray and a microwave), the at least one of the wired technique and the wireless technique is included in the definition of the transmission medium.

(Information and Signals)

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that, the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

("System" and "Network")

The terms "system" and "network" used in the present disclosure can be interchangeably used.

(Names of Parameters and Channels)

The information, the parameters, and the like described in the present disclosure may be expressed using absolute values, using values relative to predetermined values, or using other corresponding information. For example, radio resources may be indicated by indices.)

The names used for the parameters are not limitative in any respect. Furthermore, the numerical formulas and the like using the parameters may be different from the ones explicitly disclosed in the present disclosure. Various channels (for example, PUCCH and PDCCH) and information elements can be identified by any suitable names, and various names allocated to these various channels and information elements are not limitative in any respect.

(Base Station (Radio Base Station))

The terms "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", and "component carrier" may be used interchangeably in the present disclosure. The base station may be called a macro cell, a small cell, a femtocell, or a pico cell.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor (RRH: Remote Radio Head)). The term "cell" or "sector" denotes part or all of the coverage area of at least one of the base station and the base station subsystem that perform the communication service in the coverage.

(Terminal)

The terms "Mobile Station (MS)", "user terminal", "User Equipment (UE)", and "terminal" may be used interchangeably in the present disclosure.

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

(Base Station/Mobile Station)

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be IoT (Internet of Things) equipment such as a sensor.

The base station in the present disclosure may also be replaced with the user terminal. For example, the aspects and embodiment of the present disclosure may find application in a configuration that results from replacing communication between the base station and the user terminal with communication between multiple user terminals (such communication may, e.g., be referred to as D2D (Device-to-Device), V2X (Vehicle-to-Everything), or the like). In this case, terminal 20 may be configured to have the functions that base station 10 described above has. The wordings "uplink" and "downlink" may be replaced with a corresponding wording for inter-terminal communication (for example, "side"). For example, an uplink channel, a downlink channel, and the like may be replaced with a side channel.

Similarly, the terminal in the present disclosure may be replaced with the base station. In this case, base station 10 is configured to have the functions that terminal described above has.

(Meaning and Interpretation of Terms)

As used herein, the term "determining" may encompass a wide variety of actions. For example, "determining" may be regarded as judging, calculating, computing, processing, deriving, investigating, looking up, searching (or, search or inquiry) (e.g., looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming", "expecting", "considering", and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed". When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

The reference signal can also be abbreviated to an RS and may also be called a pilot depending on the applied standard.

The description "based on" used in the present disclosure does not mean "based only on," unless otherwise specified. In other words, the description "based on" means both of "based only on" and "based at least on".

Any reference to elements by using the terms "first", "second" and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

The "means" in the configuration of each apparatus described above may be replaced with "section", "circuit", "device", or the like.

In a case where terms "include", "including", and their modifications are used in the present disclosure, these terms are intended to be inclusive like the term "comprising". Further, the term "or" used in the present disclosure is not intended to be an exclusive or.

The radio frame may be constituted by one frame or a plurality of frames in the time domain. The one frame or each of the plurality of frames may be called a subframe in the time domain.

The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology indicates, for example, at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., OFDM (Orthogonal Frequency Division Multiplexing) symbol, SC-FDMA (Single Carrier-Frequency Division Multiple Access) symbol, or the like) in the time domain. The slot may also be a time unit based on the numerology.

The slot may include a plurality of mini-slots. Each of the mini slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini-slot, and the symbol indicate time units in transmitting signals. The radio frame, the subframe, the slot, the mini-slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms. Note that, a unit that represents the TTI may be referred to as a slot, a mini-slot or the like instead of a subframe.

Here, the TTI, for example, refers to a minimum time unit for scheduling in radio communication. For example, in an LTE system, the base station performs scheduling for allocating a radio resource (a frequency bandwidth, a transmit power, and the like that can be used in each user terminal) on the basis of TTI to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword or the like is actually mapped may be shorter than the TTI.

Note that, in a case where one slot or one mini-slot is referred to as the TTI, one or more TTIs (that is, one or more slots or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that, the long TTI (for example, the usual TTI, the subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain.

The number of subcarriers that are included in the RB may be identical regardless of the numerology, and may be 12, for example. The number of subcarriers that are included in the RB may be determined based on the numerology.

In addition, the time domain of the RB may include one symbol or a plurality of symbols in the time domain, and may have a length of one slot, one mini-slot, one subframe, or one TTI. One TTI and one subframe may be constituted by one resource block or a plurality of resource blocks.

Note that, one or more RBs may be referred to as a Physical Resource Block (PRB: Physical RB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common RBs (common resource blocks) for certain numerology in a certain carrier. Here, the common RBs may be identified by RB indices that use a common reference point of the carrier as a reference. The PRB may be defined by a certain BWP and may be numbered within the BWP.

The BWP may include a BWP for UL (UL BWP) and a BWP for DL (DL BWP). An UE may be configured with one or more BWPs within one carrier.

At least one of the configured BWPs may be active, and the UE does not have to assume transmission/reception of a predetermined signal or channel outside the active BWP. Note that, "cell", "carrier" and the like in the present disclosure may be replaced with "BWP".

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

"The maximum transmit power" described in the present disclosure may mean a maximum value of the transmit power, the nominal UE maximum transmit power, or the rated UE maximum transmit power.

In a case where articles, such as "a," "an," and "the" in English, for example, are added in the present disclosure by translation, nouns following these articles may have the same meaning as used in the plural.

In the present disclosure, the expression "A and B are different" may mean that "A and B are different from each other". Note that, the expression may also mean that "A and B are different from C". The expressions "separated" and "coupled" may also be interpreted in the same manner as the expression "A and B are different".

(Variations and the Like of Aspects)

The aspects and embodiment described in the present disclosure may be independently used, may be used in combination, or may be switched and used along the execution. Further, notification of predetermined information (for example, notification indicating "it is X") is not limited to explicit notification, and may be performed implicitly (for example, by not notifying the predetermined information).

While the present disclosure has been described in detailed, it is obvious to those skilled in the art that the present disclosure is not limited to the embodiment described in the present disclosure. Modifications and variations of the aspects of the present disclosure can be made without departing from the spirit and the scope of the present disclosure defined by the description of the appended claims. Therefore, the description in the present disclosure is intended for exemplary description and does not limit the present disclosure in any sense.

INDUSTRIAL APPLICABILITY

One aspect of the present disclosure is useful for mobile communication systems.

REFERENCE SIGNS LIST 1, 201, 231 CU
2, 90, 202, 232, 271 FHM
3a to 3c, 203a to 203c, 233a to 233c, 401a to 401c DU
4a to 4c, 204a to 204h User terminal
31, 62, 92, 223a, 254, 262a, 282a Control section
32, 93, 255 Storage section
33, 221, 225, 251, 253 I/F section
34 Transmission signal generation section
35 Coding/modulation section
36 Mapping section
37, 69, 96, 102 Transmission section
38, 61, 91, 97, 224, 261 Reception section
39 Demapping section
40 Channel estimation section
41 Demodulation/decoding section
42 Communication quality acquisition section
51, 255a to 255d, 291 Beam information
51a, 255aa, 291a DU identification information
51b, 255ab, 291b Beam identification information
63, 68 Digital BF section
64 IFFT/CP section
65, 66 Radio section
67 FFT/CP section
94 Copy section
95, 99 Delay offset section
98 IFFT section
100 Combining section
101 FFT section
205 Reception apparatus
206 Network
211, 212, 241, 242 BB processing apparatus
222a, 222b Copy/Combining section
223b, 262b, 282b Switch
252 BB Processing section
256 Measurement section
281 Failure detection section
C1, C2 Cell

The invention claimed is:

1. A fronthaul multiplexer that communicates with each of a plurality of first units each performing radio communication with a terminal accommodated by the first unit as a subordinate, and that communicates with a second unit, the fronthaul multiplexer comprising:
a processor that combines data included in signals received from the plurality of first units each being different from another and accommodating the terminal; and
a transmitter that transmits a signal including the combined data to the second unit, wherein the processor does not combine data of a signal received from at least one of the plurality of first units that does not accommodate a terminal with data of a signal received from at least one of the plurality of first units that accommodates the terminal.

2. A signal combining method for a fronthaul multiplexer that communicates with each of a plurality of first units each performing radio communication with a terminal accommodated by the first unit as a subordinate, and that communicates with a second unit, the signal combining method comprising:

combining data included in signals received from the plurality of first units each being different from another and accommodating the terminal; and transmitting a signal including the combined data to the second unit, wherein the fronthaul multiplexer does not combine data of a signal received from at least one of the plurality of first units that does not accommodate a terminal with data of a signal received from at least one of the plurality of first units that accommodates the terminal.

* * * * *